(12) United States Patent
Hojo et al.

(10) Patent No.: US 6,493,350 B2
(45) Date of Patent: *Dec. 10, 2002

(54) TRANSMISSION CONTROL METHOD IN A NETWORK SYSTEM FOR INTERACTIVELY TRANSMITTING A SIGNAL BETWEEN NODE DEVICES AND NETWORK SYSTEM USING THE SAME

(75) Inventors: Kazuhiko Hojo, Kawasaki (JP); Mitsuru Yamamoto, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/802,695

(22) Filed: Feb. 19, 1997

(65) Prior Publication Data

US 2001/0017847 A1 Aug. 30, 2001

(30) Foreign Application Priority Data

| Feb. 19, 1996 | (JP) | ............................................. 8-030908 |
| Feb. 19, 1996 | (JP) | ............................................. 8-030909 |
| Feb. 19, 1996 | (JP) | ............................................. 8-030910 |
| Feb. 19, 1996 | (JP) | ............................................. 8-030911 |
| Feb. 17, 1997 | (JP) | ............................................. 9-032368 |

(51) Int. Cl.$^7$ .............................. H04L 12/28; H04J 4/00
(52) U.S. Cl. ....................... 370/420; 370/431; 359/123
(58) Field of Search ............................. 359/123, 124, 359/125, 127; 370/419, 420, 463, 428, 375, 376, 431, 464

(56) References Cited

U.S. PATENT DOCUMENTS

| 5,438,445 A | * | 8/1995 | Nakano | 359/124 |
| 5,777,762 A | * | 7/1998 | Yamamoto | 359/123 |
| 5,801,859 A | * | 9/1998 | Yamamoto | 359/125 |
| 5,848,059 A | * | 12/1998 | Yamamoto | 370/463 |
| 5,930,014 A | * | 7/1999 | Yamamoto | 359/124 |

FOREIGN PATENT DOCUMENTS

JP  08237306  9/1996

OTHER PUBLICATIONS

"WDM–Based Local Lightwave Networks Part II: Multihop Systems", Network–The Magazine of Computer Communications, vol. 6, No. 4, pp. 20–32.

* cited by examiner

*Primary Examiner*—Chau Nguyen
*Assistant Examiner*—Andy Lee
(74) *Attorney, Agent, or Firm*—Fitzpatrick, Cella, Harper & Scinto

(57) ABSTRACT

The present invention discloses a network system for an interactive transmission in first and second directions. The network system includes a plurality of node devices, and a first node device of the node devices can selectively output a signal in the first direction or perform the returning output of a signal. A second node device adjacent to the first node device outputs a signal to the first node device through a channel which is used by the first node device for the returning output, hence the first and second node device are controlled such that those first and second node devices do not use the returning channel of the first node device concurrently.

19 Claims, 44 Drawing Sheets

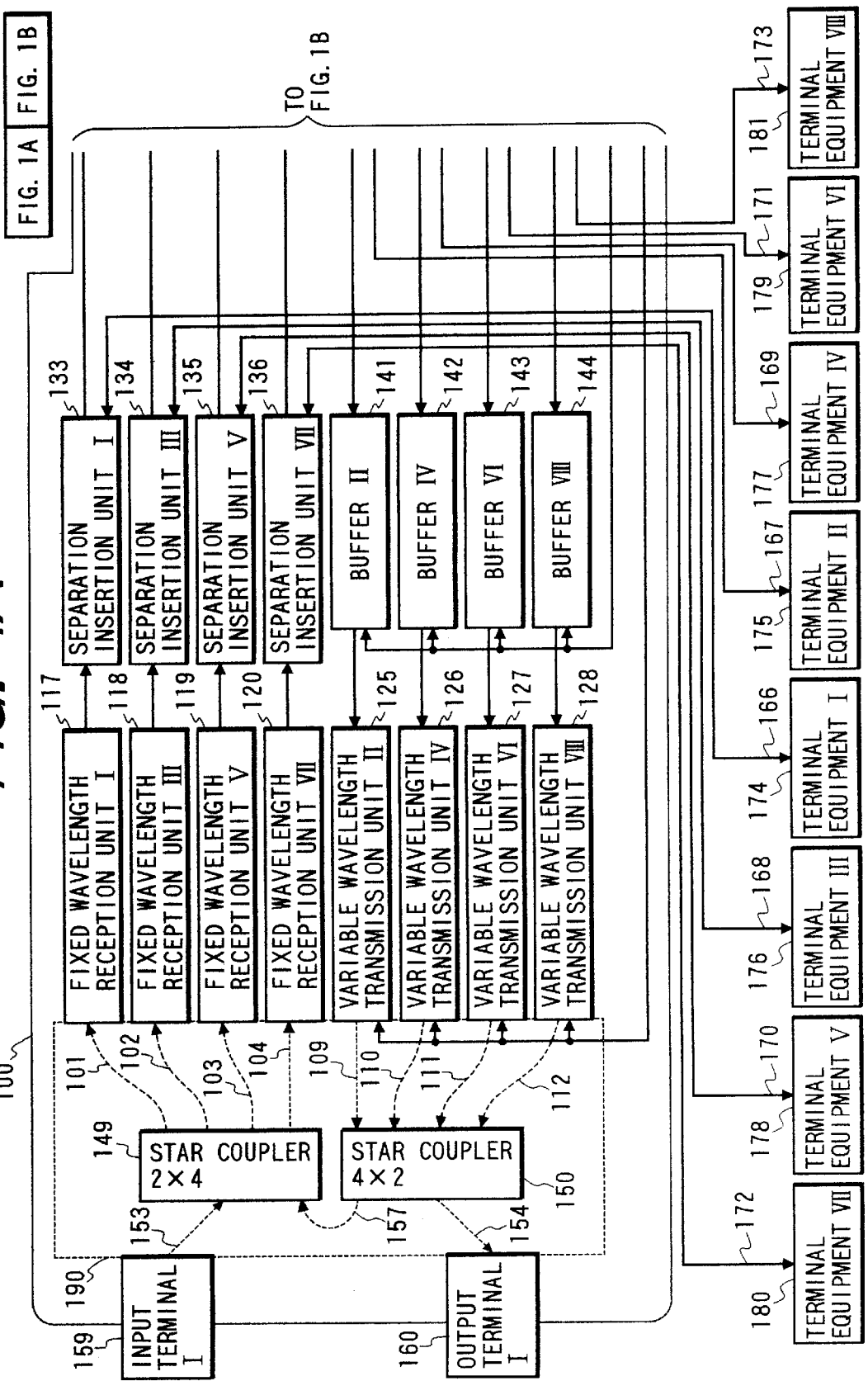

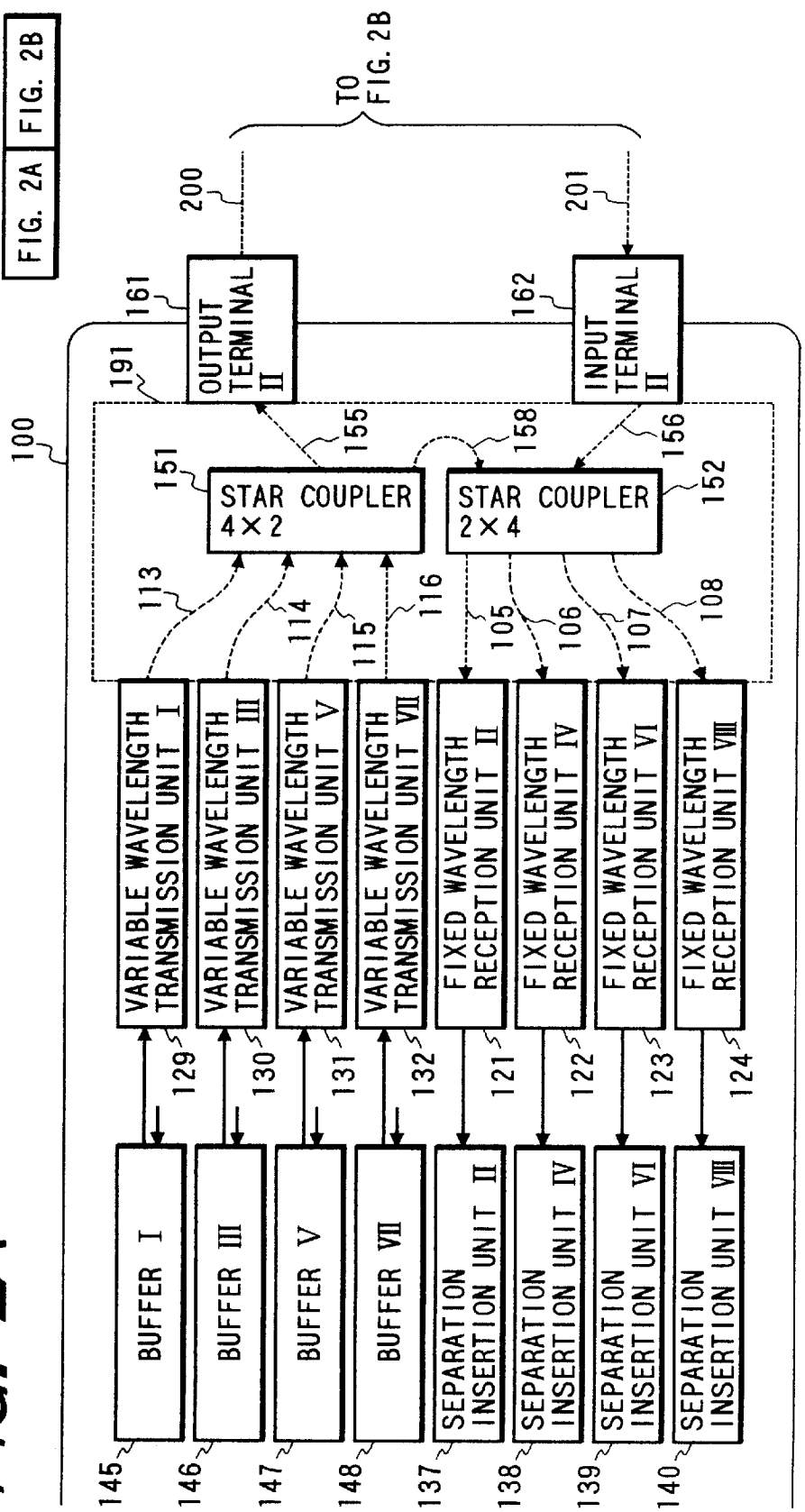

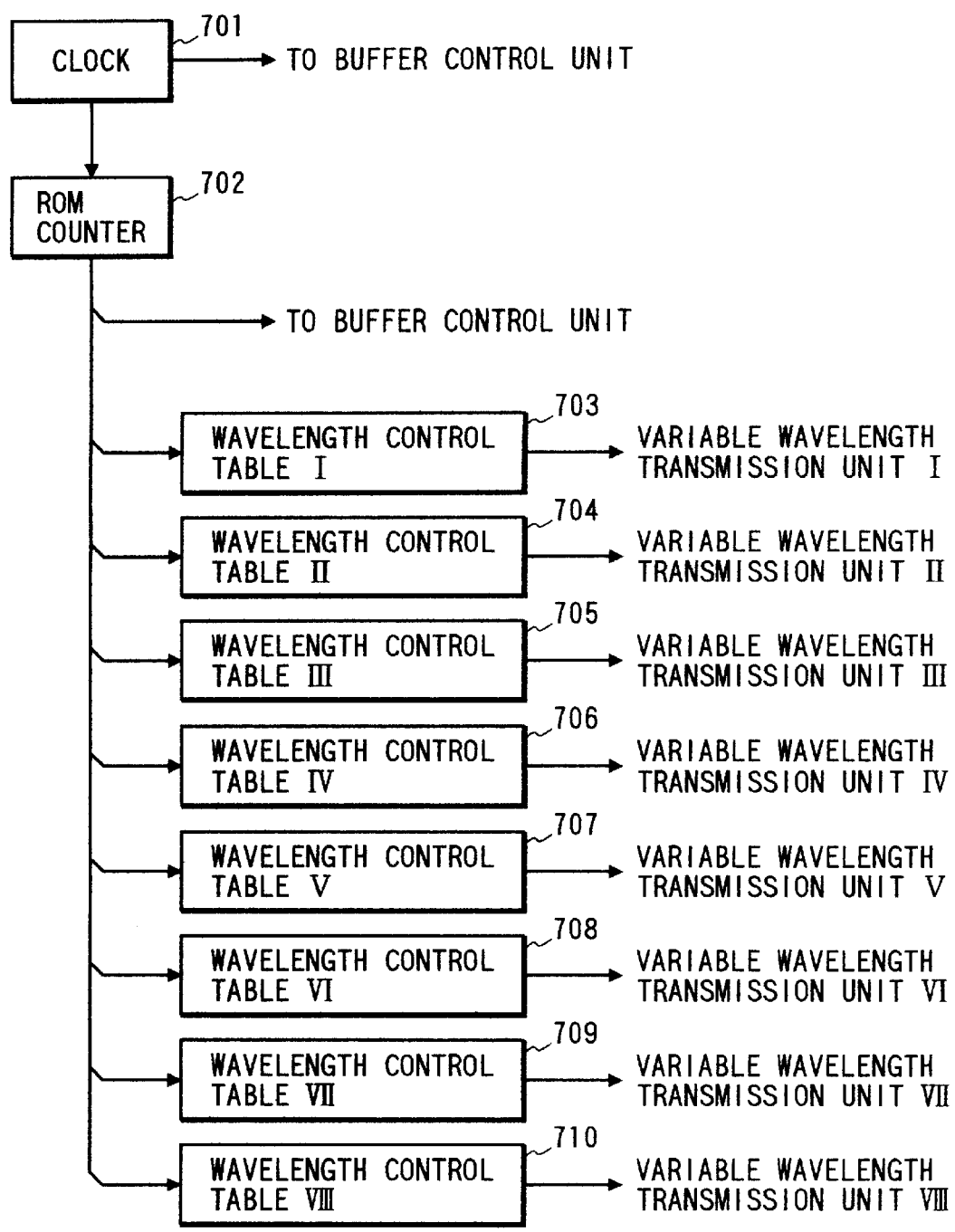

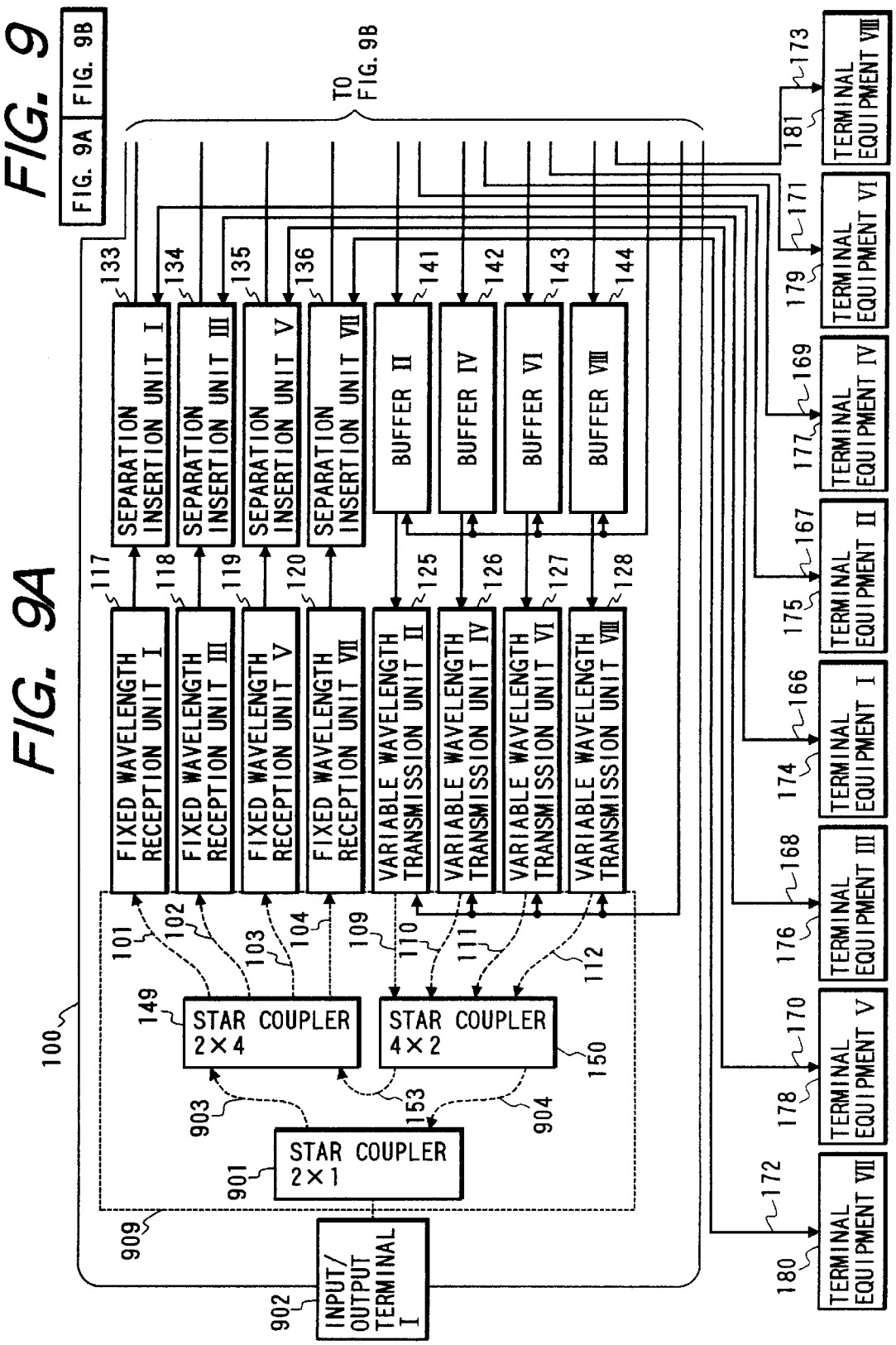

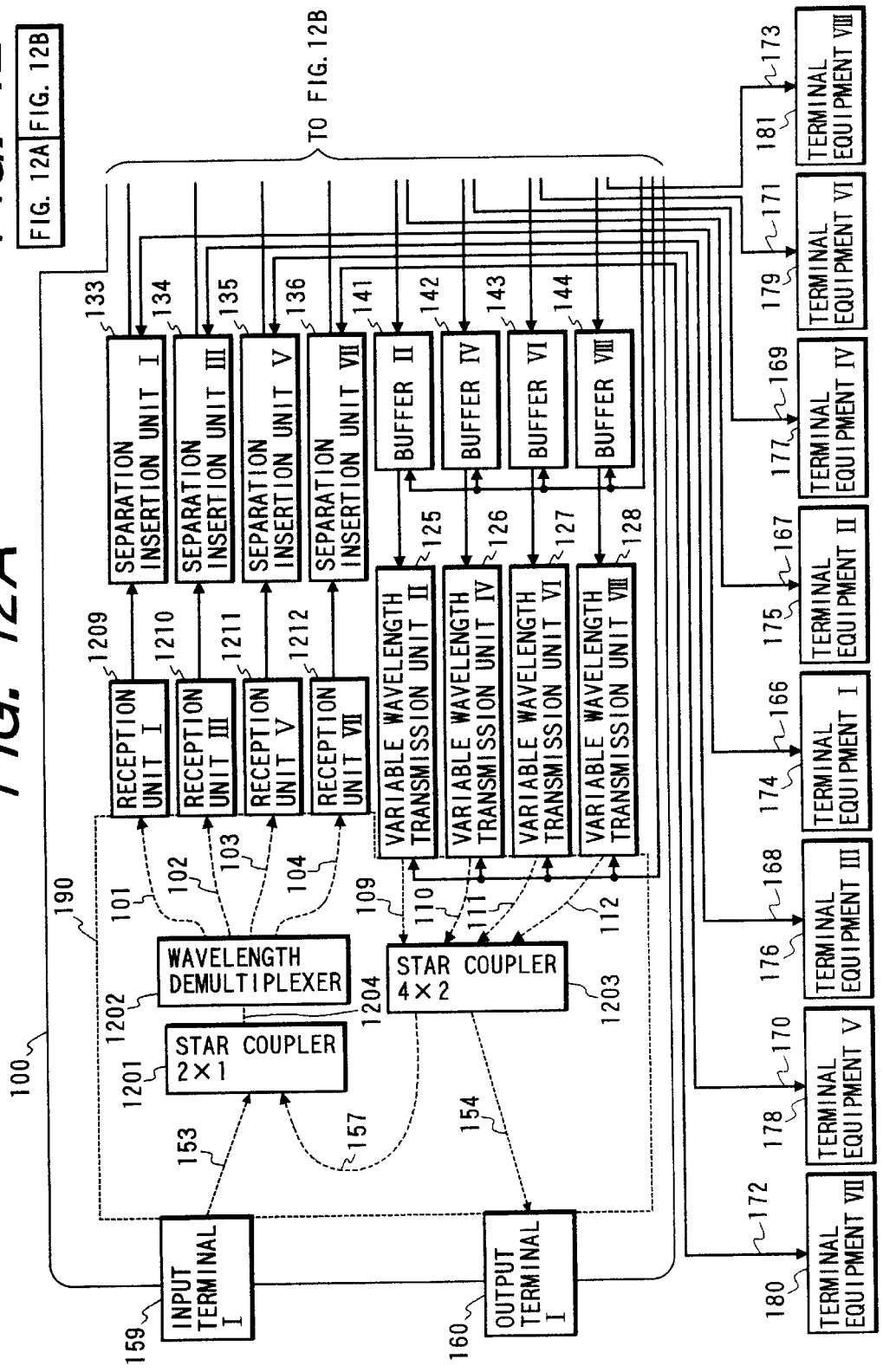

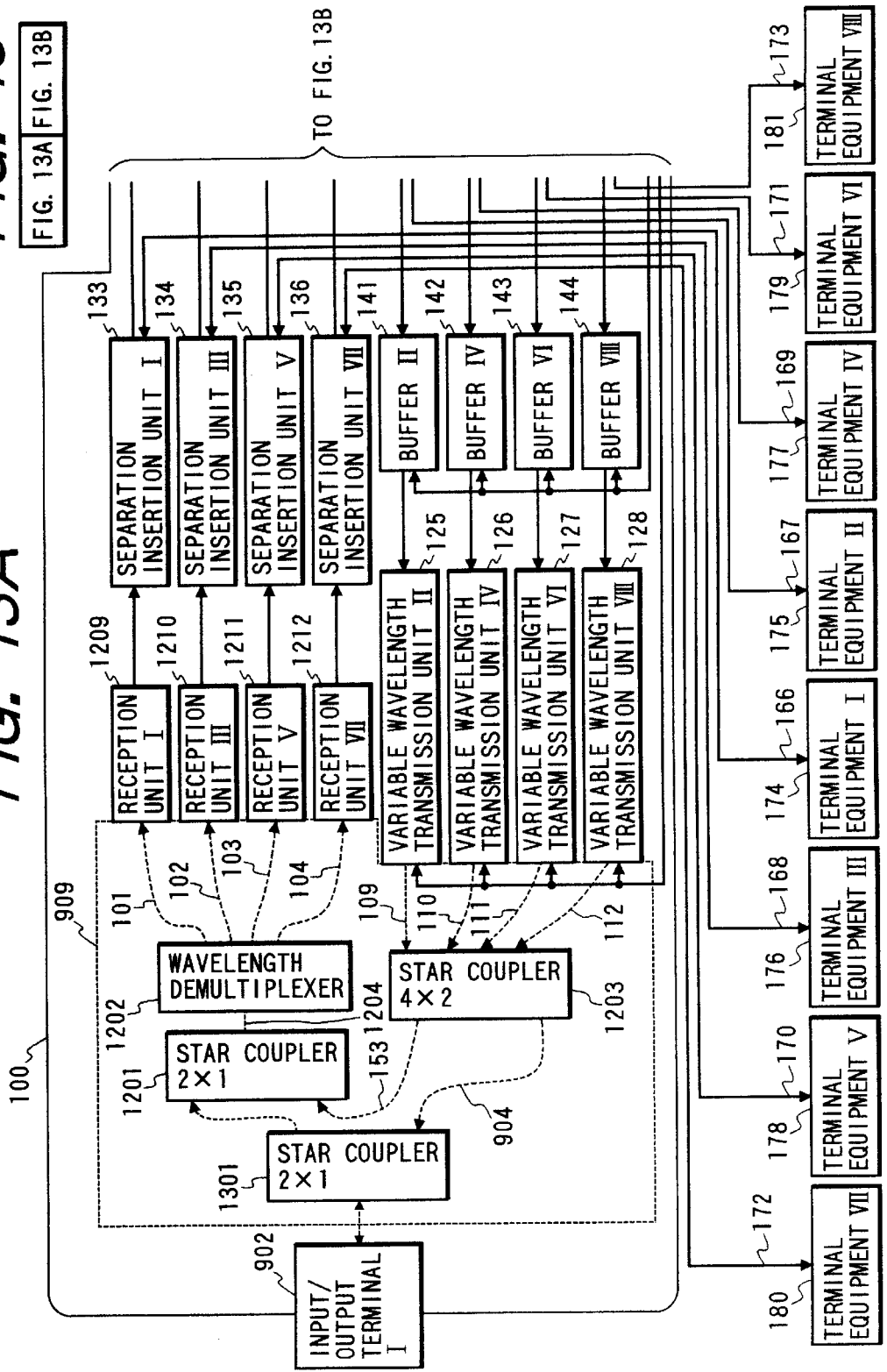

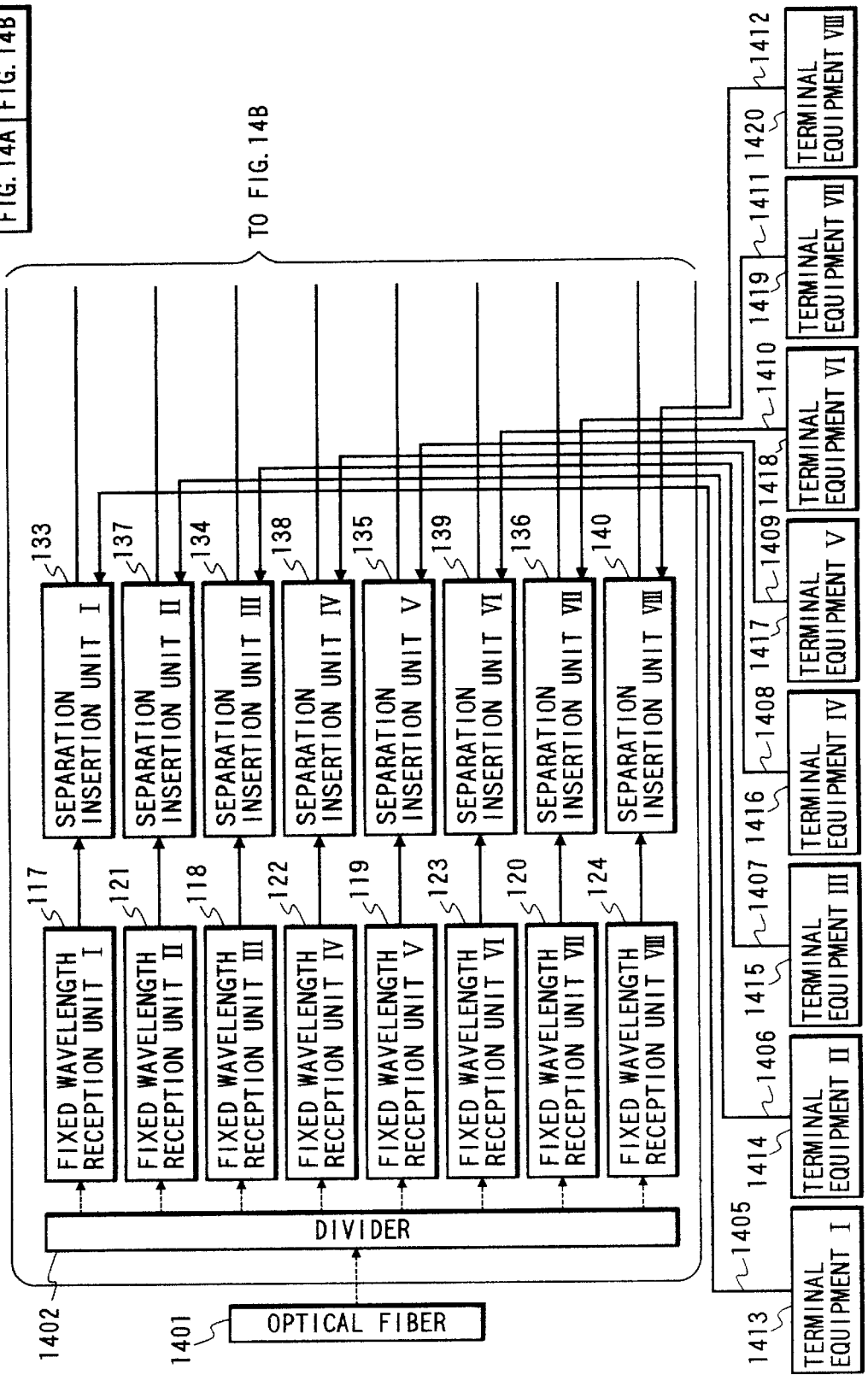

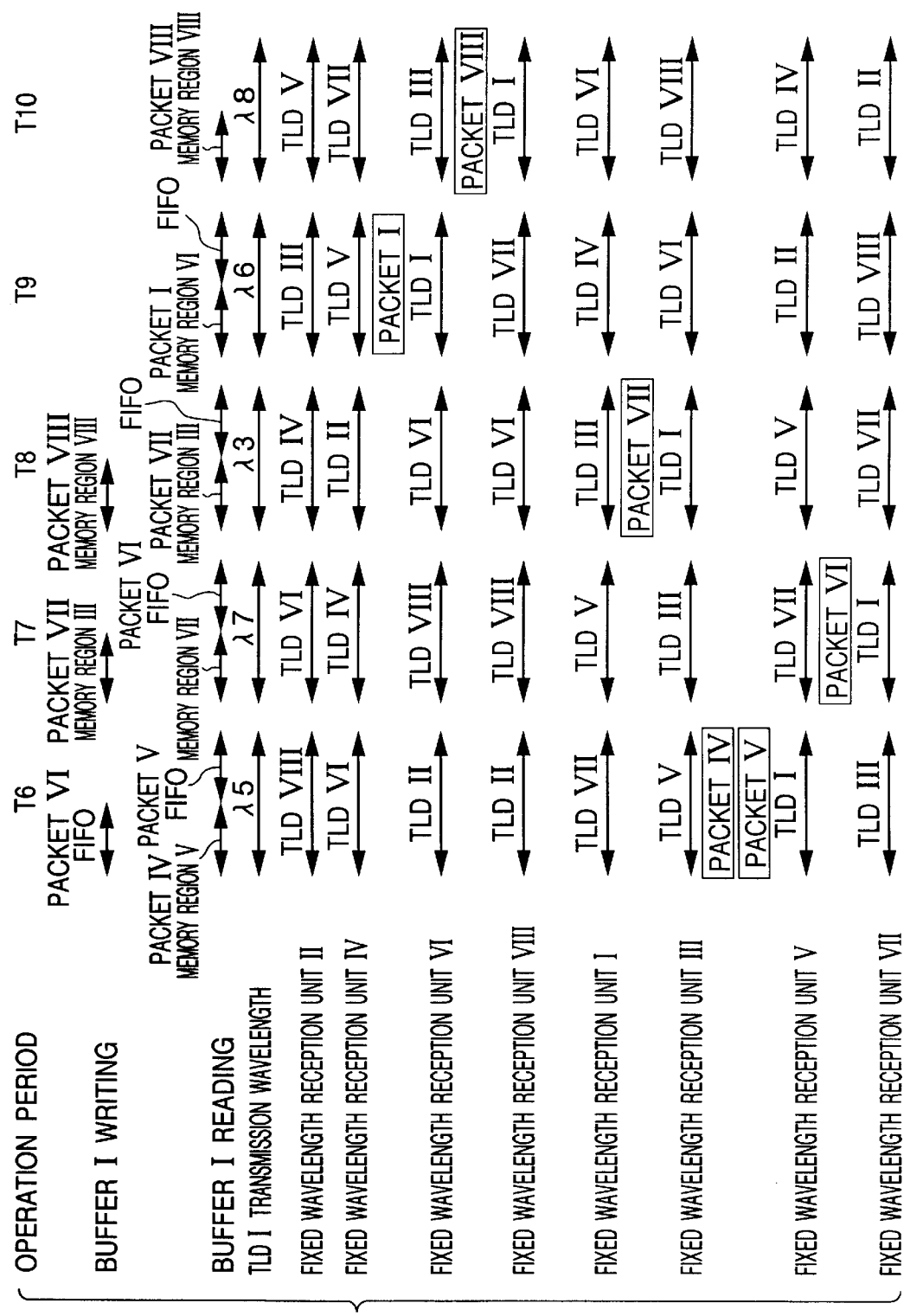

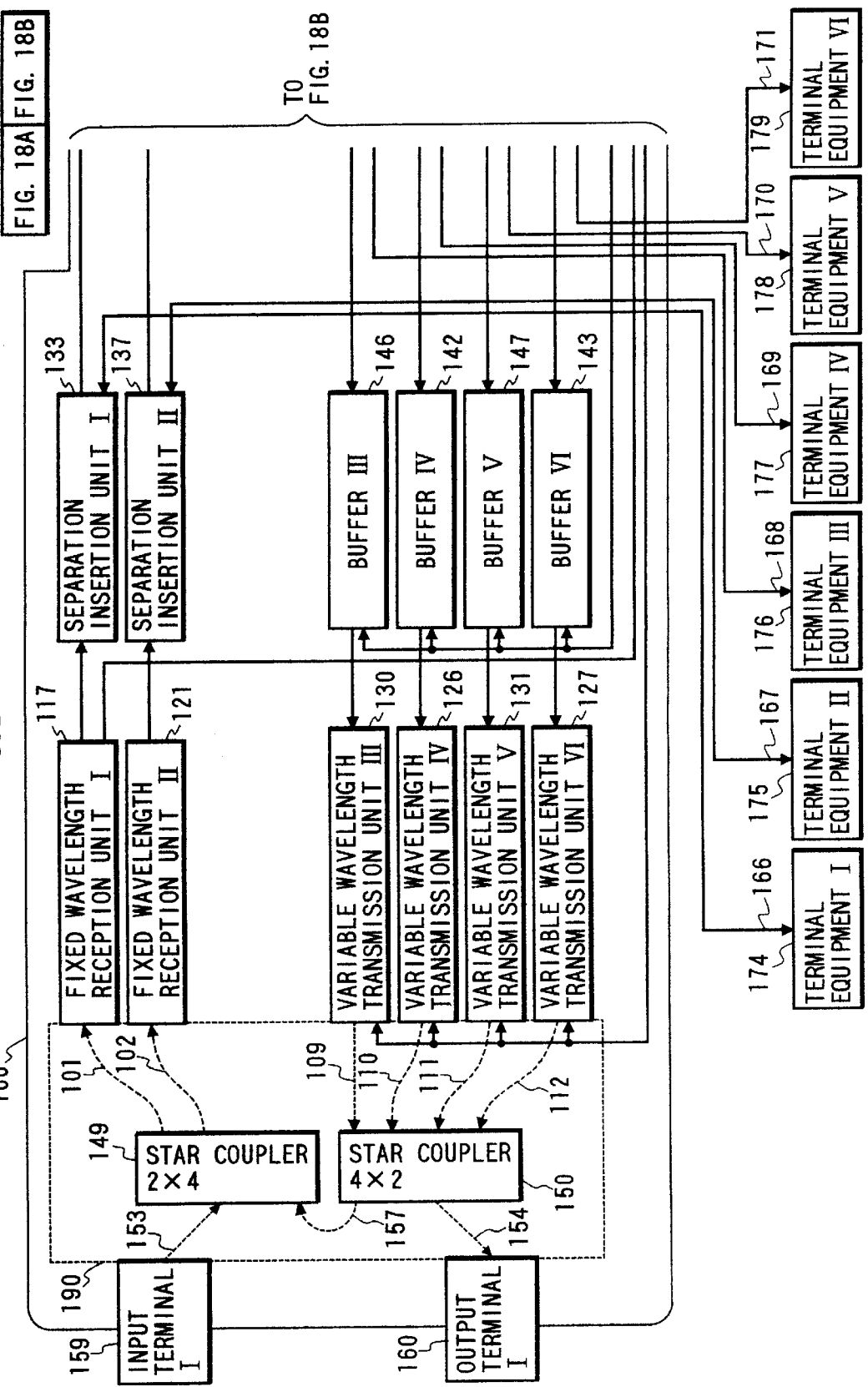

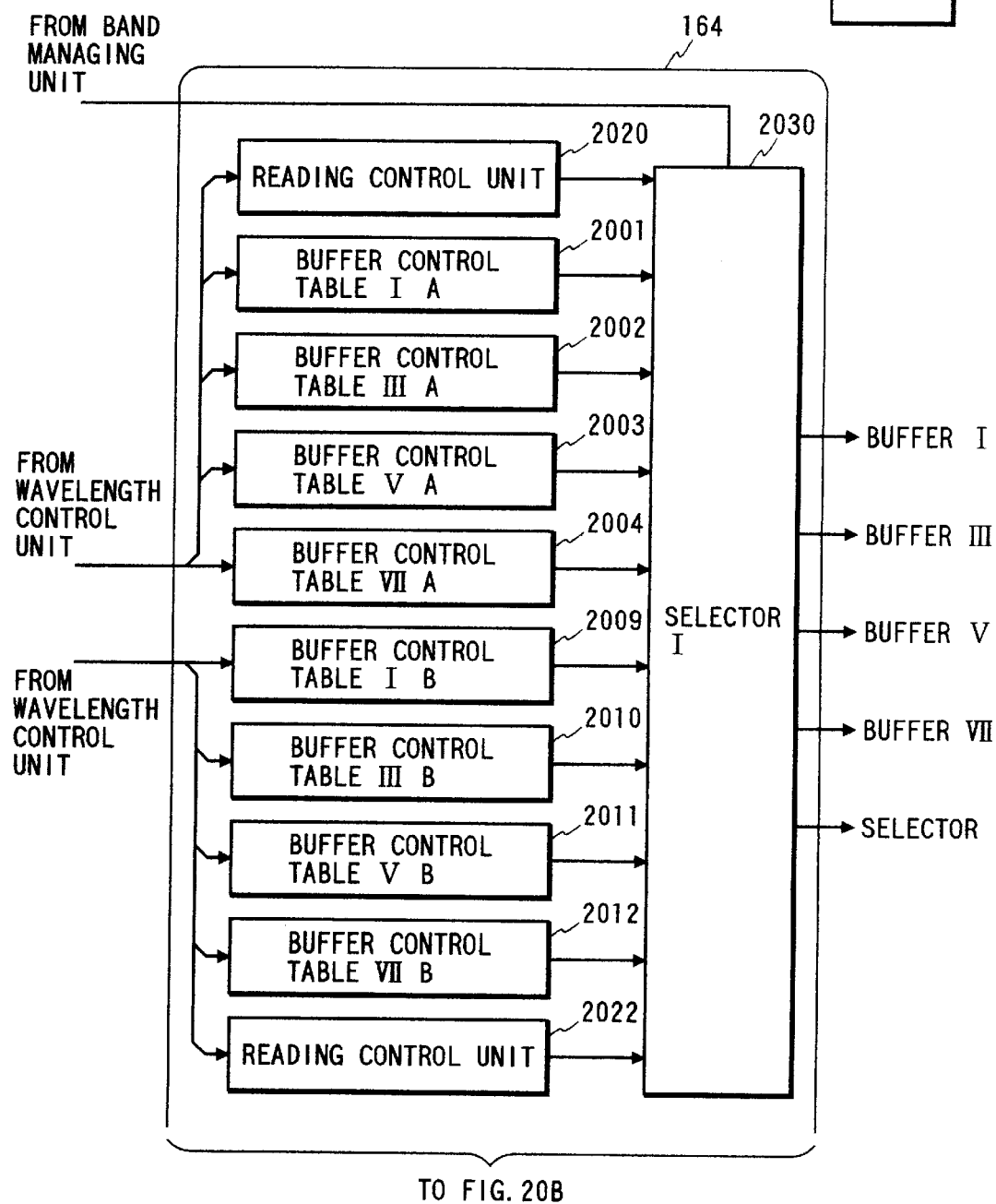

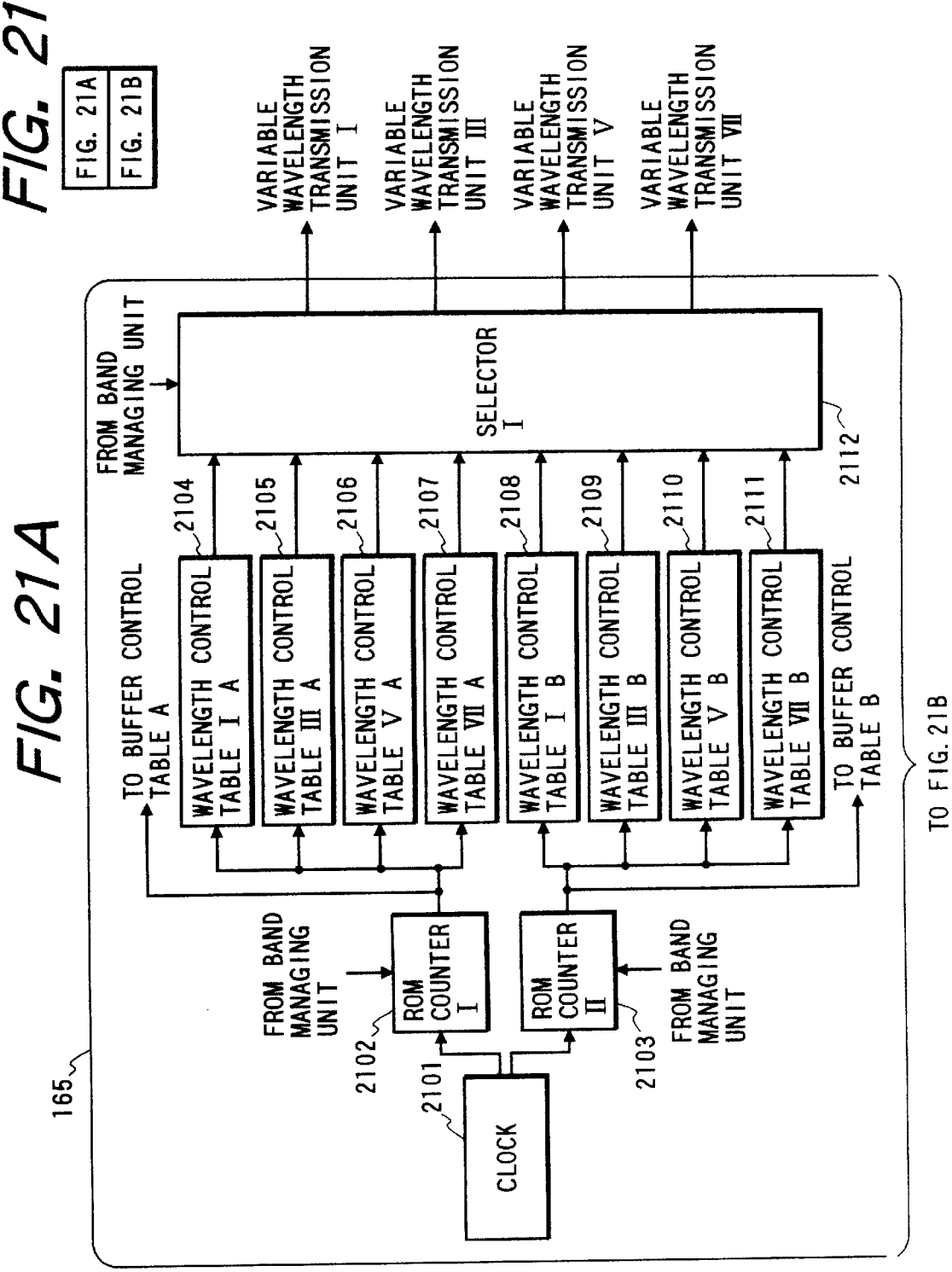

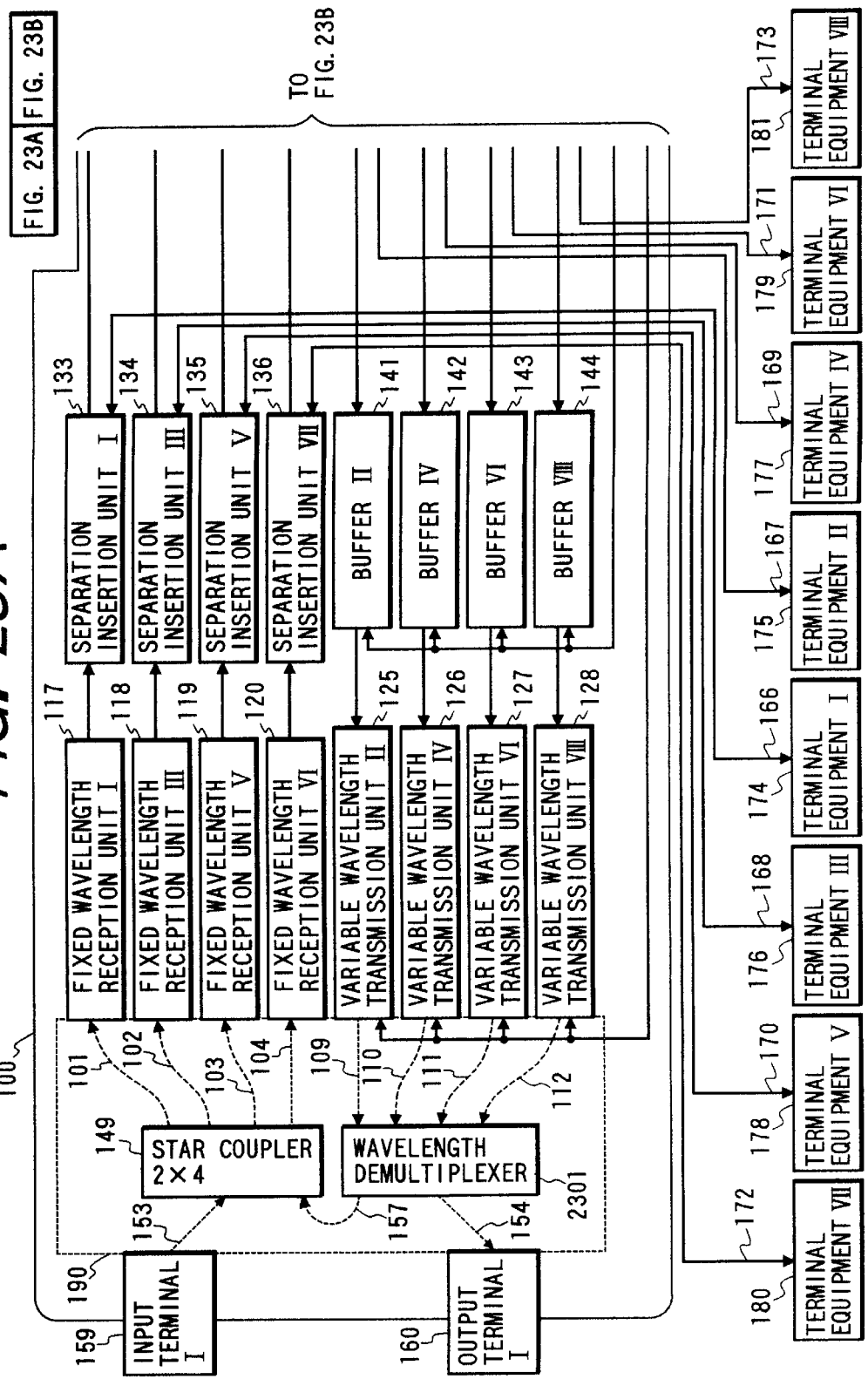

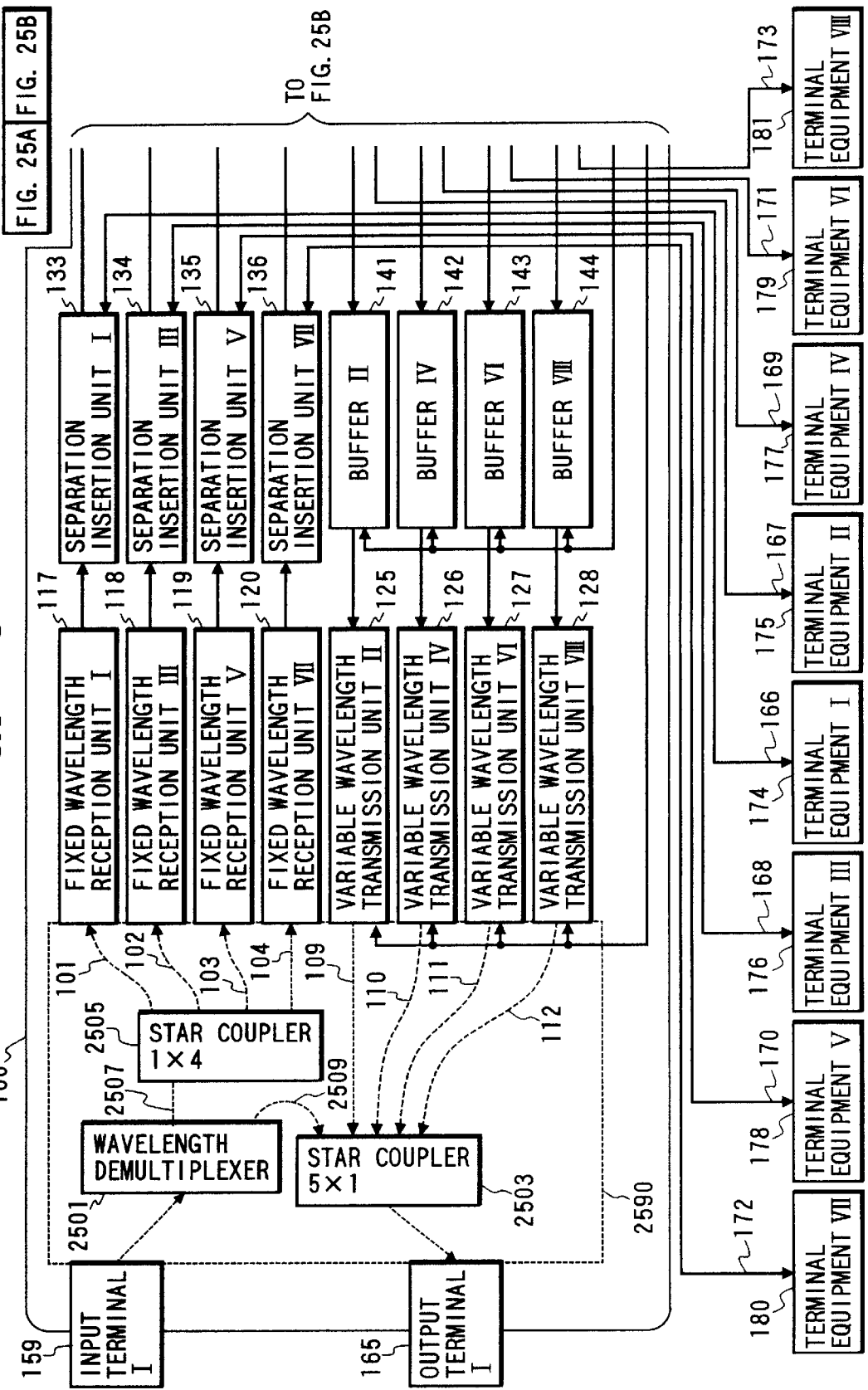

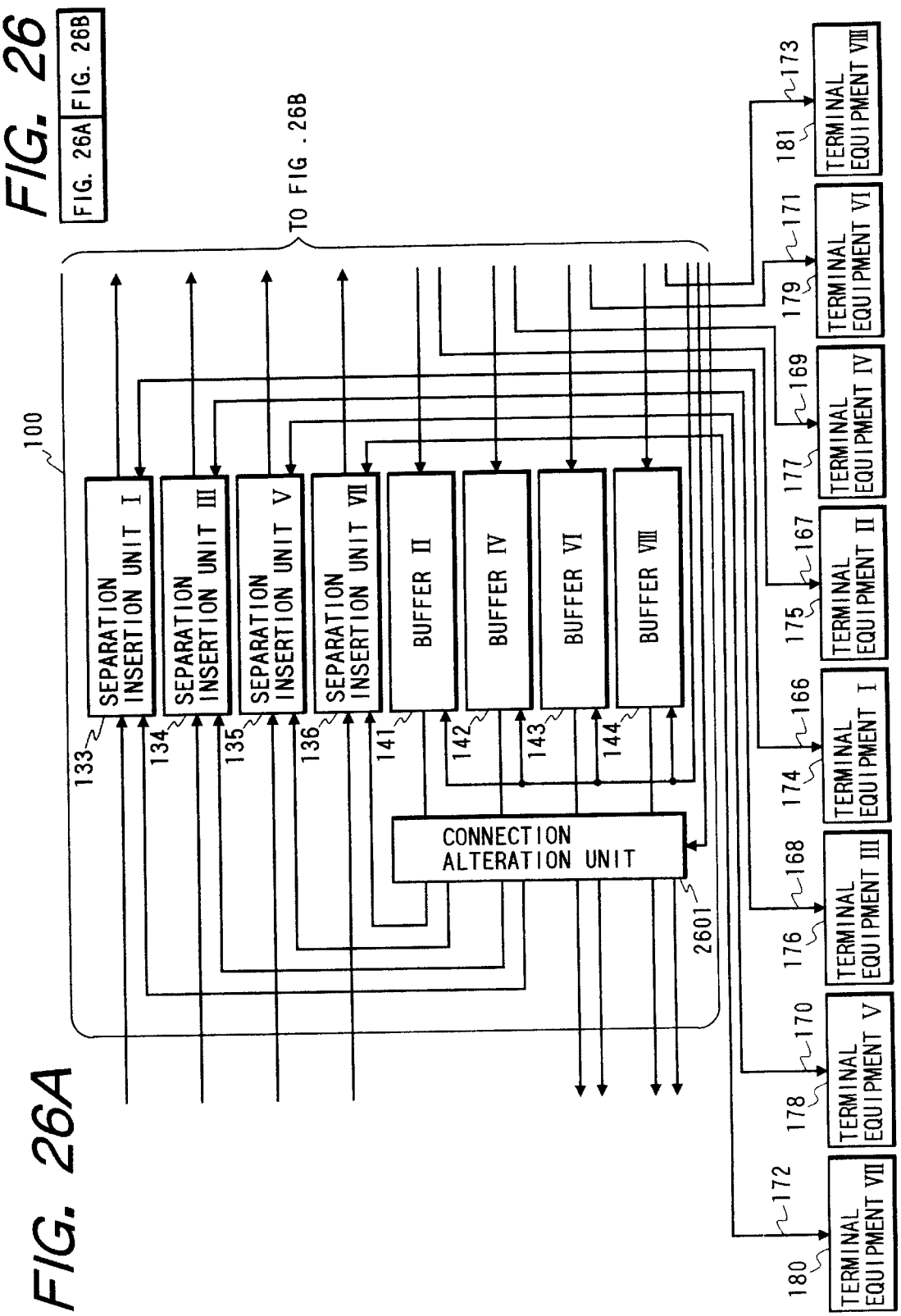

TRANSMISSION CONTROL METHOD IN A NETWORK SYSTEM FOR INTERACTIVELY TRANSMITTING A SIGNAL BETWEEN NODE DEVICES AND NETWORK SYSTEM USING THE SAME

BACKGROUND OF THE INVENTION

1. Field of the Invention

The present invention generally relates to a network system for transmitting a signal using a plurality of channels, and a transmission method of the signal therein. More particularly, the present invention relates to a network system which transmits a signal through a plurality of channels and includes a node device for connecting a terminal equipment and the like to the plural channels and in which an interactive transmission is performed between the node devices.

2. Related Background Art

In recent years, study and development have been made with respect to network systems each of which employs a plurality of channels for transmission of a signal, since a high-speed network system, which includes terminal equipments connected thereto, is required, following an increase in speed of processing in each terminal equipment. As the plural channels, channels using different wavelengths are known, for example. As one of them, there has been proposed a multihop type in which transmitted data is relayed and transmitted in a node device interposed on the way from a signal transmitting terminal to a signal receiving or addressed terminal. Such a system is described in Biswanath Mukherjee, "WDM-Based Local Lightwave Networks Part II: Multihop Systems", IEEE Network July (1992), p. 20–32.

SUMMARY OF THE INVENTION

An object of the present invention is, therefore, is to provide a new network system which performs communication using a plurality of channels.

Prior to the description of the present invention, a reference example will be described to facilitate understanding of the present invention. The following reference example is based on the technology described in Japanese Patent Application No. 6-327496 filed Dec. 28, 1994, and Japanese Patent Application No. 7-325632 filed Dec. 14, 1995 as a Japanese domestic priority-claim declared application based on this Japanese Patent Application No. 6-327496.

FIG. 14, which consists of FIGS. 14A and 14B, illustrates a schematic diagram of a node device connected to a network system. The node device detects an optical signal at a predetermined wavelength which is transmitted on a ring-type wavelength division multiplexed transmission line, transmits a packet to its terminal equipment when the signal is the packet addressed to the terminal equipment connected to this node device concerned, and transmits other packets a packet from its terminal equipment to a next-stage node device by variable wavelength transmission means of a wavelength-circulating type which transmits signals at respective wavelengths. The node device of FIGS. 14A and 14B includes a control unit 149 which contains a buffer control unit 164 and a wavelength control unit 165. The buffer control unit 164 controls the read-out of buffers such that when a packet stored in buffers 141–148 is addressed to a sub-transmission line connected to an adjacent node device, the read-out of the packet stored in the buffer is not performed until a transmission wavelength of the variable wavelength transmission unit for transmitting the packet coincides with a reception wavelength of a fixed wavelength reception unit for outputting the packet to a separation-insertion unit connected to the addressed sub-transmission line in the adjacent node device. The wavelength control unit 165 controls the transmission wavelengths of variable wavelength transmission units in accordance with a pattern of a predetermined transmission wavelength control table which will be described later. An optical fiber 1401 is used as an optical wavelength multiplexed transmission line. The optical fiber 1401 serves as a transmission line between a coupler in an upstream adjacent node device and a divider in an adjacent node device on the downstream side. The power divider 1402 divides an optical signal transmitted on the optical fiber 1401 into eight portions and output them to eight fixed wavelength reception units.

The fixed wavelength reception units I 117, III 118, V 119 and VII 120 respectively include a fixed-wavelength filter and a photodiode and serve as fixed wavelength reception means. Similarly, the fixed wavelength reception units II 121, IV 122, VI 123 and VIII 124 respectively include a fixed-wavelength filter and a photodiode and serve as fixed wavelength reception means. The fixed wavelength reception units I to VIII each receive only a packet which is transmitted as one of optical signals having wavelengths $\lambda 1$ to $\lambda 8$. When the photodiode itself has characteristics that this is sensitive only to a predetermined wavelength, no fixed-wavelength filter is needed.

Separation-insertion units I 133, III 134, V 135 and VII 136 serve as separation-insertion means, each of which is operative to separate a packet, which is to be transmitted to a sub-transmission line, and a packet, which is to be transmitted to one of the buffer 145 to 148, out of a packet stream from each of the fixed wavelength reception units 117 to 120, while it is operative to add a packet from the sub-transmission line to the packet stream from the fixed wavelength reception unit 117 to 120 to the buffers 145 to 148. Similarly, separation-insertion units II 137, IV 138, VI 139 and VIII 140 serve as separation-insertion means.

Buffers II 141, IV 142, VI 143 and VIII 144 serve as buffer means to temporarily store the packets from the separation-insertion units 137 to 140 in memory regions corresponding to the respective transmission wavelengths of the variable wavelength transmission units. Similarly, buffers I 145, III 146, V 147 and VII 148 serve as buffer means.

Variable wavelength transmission units II 125, IV 126, VI 127 and VIII 128 are variable wavelength transmission means, such as tunable laser diodes (TLDs), which convert, under the control of the wavelength control unit 165, the packets from the buffers into optical signals each having a predetermined wavelength out of wavelengths $\lambda 1$ to $\lambda 8$ and send them through the coupler 1403 to the optical fiber 1404 used as the optical wavelength division multiplexed transmission line. Similarly, variable wavelength transmission units I 129, III 130, V 131 and VII 132 are variable wavelength transmission means, such as tunable laser diodes (TLDs).

In this reference example, the fixed wavelength reception unit I 117, the separation-insertion unit I 133, the buffer I 145 and the variable wavelength transmission unit I 129 constitute a set, and a packet received by the fixed wavelength reception unit I 117 is treated in this set but not in other sets. Similarly, the fixed wavelength reception unit II 121, the separation-insertion unit II 137, the buffer II 141 and the variable wavelength transmission unit II 125 constitute another set, and the other fixed wavelength reception units, the other separation-insertion units, the other buffers and the other variable wavelength transmission units respectively constitute other sets.

The coupler 1403 multiplexes the optical signals of wavelengths $\lambda 1$ to $\lambda 8$ which are sent from the eight variable wavelength transmission units, and supplies them to the optical fiber 1404.

The optical fiber 1404 serves as the transmission line between the coupler in this node device concerned and the divider in a downstream adjacent node device.

Sub-transmission lines I 1405 to VIII 1412 serve as packet transmission lines between the separation-insertion units and terminal equipments. The terminal equipments I 1413 to VIII 1420 are connected to the sub-transmission lines I to VIII, respectively. Each of the terminal equipments receives a packet output from each of the corresponding separation-insertion units, while it generates a packet to be transmitted to another terminal equipment and sends it through each of the sub-transmission lines to each of the separation-insertion units.

FIG. 3 is a block diagram of a network system in which five node devices of FIGS. 14A and 14B are connected by optical fibers. Node devices 301 to 305 shown in FIGS. 14A and 14B are respectively connected to eight terminal equipments through eight sub-transmission lines. Optical fibers 306 to 310 are each used as an optical wavelength multiplexed transmission line.

FIG. 4 shows the internal structure of each of buffers I to VIII which are utilized in this node device. The same internal structure is applied to all of the buffers I to VIII and the description will be made with respect to only one buffer.

In FIG. 4, a decoder 401 reads an address portion in a header section of a packet, which consists of this header section and a transmission data section, and determines whether or not a destination of the packet is the terminal equipment connected to an adjacent node device. If not, the decoder 401 instructs a demultiplexer 404 to set its output destination to a FIFO 406. On the other hand, if it is the sub-transmission line connected to the adjacent node device, the decoder 401 instructs the demultiplexer 404 to set its destination to a dual port memory 405, and at the same time instructs a writing address counter 402 to set a writing start address value of the memory region, into which the packet to be written.

A writing address counter 402 starts with the writing start address value, which is output from the decoder 401, and outputs discrimination signals of the memory regions, in which the packet is to be written, to a dual port memory 405 in due order. The memory region in the dual port memory 405, in which the packet is to be stored, is determined from a channel (a wavelength) connected to the terminal equipment to which the packet is addressed.

For example, when the packet is addressed to the terminal equipment II 1414 connected to the adjacent node device, the packet needs to be input, as an optical signal of a wavelength $\lambda 2$, into the fixed wavelength reception unit II 121 connected to the separation-insertion unit II 137 in the node device so that the packet can reach the terminal equipment II 1414, since the terminal equipment II 1414 is connected to the separation-insertion unit II 137 in the node device. In order to convert the packet into the optical signal of the wavelength $\lambda 2$, the packet needs to be stored into the memory region II in the dual port memory 405 corresponding to the wavelength $\lambda 2$, i.e., the memory region which stores the packet which is to be read from this buffer when the packet can be output at the wavelength $\lambda 2$.

Similarly, a reading address counter 403 starts with an offset value as a reading start address, which is output from the buffer control table, and outputs address signals for reading the packet from the dual port memory 405 in due order.

The demultiplexer 404 outputs the input packet to the dual port memory 405 or the FIFO 406 in accordance with instructions from the decoder 401. The dual port memory 405 is operative to perform reading and writing of the packet data independently.

Memory regions of the dual port memory 405, as shown in a memory map of FIG. 5, are established corresponding to variable wavelengths which can be modulated.

For example, the packet stored in the memory region IV is read only when the transmission wavelength of the variable wavelength transmission unit is set to the wavelength $\lambda 4$, and transmitted from the variable wavelength transmission unit as the optical signal of the wavelength $\lambda 4$. The packet stored in each memory region is converted into the optical signal of a wavelength corresponding to each memory region and output from the node device. A start of address in each of the memory regions I to VIII is A1, A2, A3, A4, A5, A6, A7 or A8.

The FIFO (First In First Out) 406 temporarily stores the packets input thereinto and outputs them to a selector in order of input. The selector 407 selects, in accordance with instructions from a reading control unit 609, either of outputs; one is from the dual port memory 405 and the other is from the FIFO 406, and outputs it to the variable wavelength transmission unit.

FIG. 6 shows the internal structure of the buffer control unit 164. In FIG. 6, buffer control tables I to VIII are read out in order in response to the address value which is output from a ROM counter 702 in the wavelength control unit 151. Then, predetermined offset values are respectively output to the reading address counters 403 in the buffers I to VIII. These tables are incorporated in a read-only memory (ROM). The contents of the buffer control tables I to VIII will be described later.

The reading control unit 609 counts clock signals which are output from the wavelength control unit, so that the reading control signal for reading the packet of the dual port memory 405 or the FIFO 406 can be output to the selector in each of the buffers I to VIII.

FIG. 7 shows the internal structure of the wavelength control unit 165. In FIG. 7, wavelength control tables I 703 to VIII 710 are read out in order in response to the address value which is output from the ROM counter 702. Then, predetermined wavelength control signals are respectively output to respective drive units in the variable wavelength transmission units. These tables are also incorporated in the read-only memory (ROM). The contents of the wavelength control tables I to VIII will be also described later.

A clock generating unit 701 generates a predetermined clock signal, supplies it to the buffer control unit and further frequency-demultiplies it and outputs the frequency-demultiplied one to the ROM counter.

The contents of the above wavelength control tables I to VIII show the wavelength transition of the optical signals transmitted from the variable wavelength transmission units, and are set as shown in Table 1, for example.

TABLE 1

| Table name | \multicolumn{8}{c}{Address} | | | | | | | |
|---|---|---|---|---|---|---|---|---|
| | 0 | 1 | 2 | 3 | 4 | 5 | 6 | 7 |
| Wavelength control table I | 1 | 3 | 5 | 7 | 8 | 6 | 4 | 2 |
| Wavelength control table II | 3 | 5 | 7 | 8 | 6 | 4 | 2 | 1 |
| Wavelength control table III | 5 | 7 | 8 | 6 | 4 | 2 | 1 | 3 |
| Wavelength control table IV | 7 | 8 | 6 | 4 | 2 | 1 | 3 | 5 |
| Wavelength control table V | 8 | 6 | 4 | 2 | 1 | 3 | 5 | 7 |
| Wavelength control table VI | 6 | 4 | 2 | 1 | 3 | 5 | 7 | 8 |
| Wavelength control table VII | 4 | 2 | 1 | 3 | 5 | 7 | 8 | 6 |
| Wavelength control tabel VIII | 2 | 1 | 3 | 5 | 7 | 8 | 6 | 4 |

Further, the offset values of the above buffer control tables I to VIII are set as illustrated in Table 2.

TABLE 2

| Table name | Address | | | | | | | |
|---|---|---|---|---|---|---|---|---|
| | 0 | 1 | 2 | 3 | 4 | 5 | 6 | 7 |
| Buffer control table I | A1 | A3 | A5 | A7 | A8 | A6 | A4 | A2 |
| Buffer control table II | A3 | A5 | A7 | A8 | A6 | A4 | A2 | A1 |
| Buffer control table III | A5 | A7 | A8 | A6 | A4 | A2 | A1 | A3 |
| Buffer control table IV | A7 | A8 | A6 | A4 | A2 | A1 | A3 | A5 |
| Buffer control table V | A8 | A6 | A4 | A2 | A1 | A3 | A5 | A7 |
| Buffer control table VI | A6 | A4 | A2 | A1 | A3 | A5 | A7 | A8 |
| Buffer control table VII | A4 | A2 | A1 | A3 | A5 | A7 | A8 | A6 |
| Buffer control tabel VIII | A2 | A1 | A3 | A5 | A7 | A8 | A6 | A4 |

Those sixteen tables are all read out synchronously by the ROM counter 702. Thus, the transmission wavelengths of the respective tunable laser diodes (TLDs) are shifted and circulated in the order of $\lambda1, \lambda3, \lambda5, \lambda7, \lambda8, \lambda6, \lambda4, \lambda2$ and $\lambda1$, and the offset value for reading the memory regions in the dual port memory of the buffer connected to each tunable laser diode (TLD) is circulated in the order A1, A3, A5, A7, A8, A6, A4, A2 and A1, which is synchronous with the transition of the variable wavelength of each variable wavelength transmission unit. Therefore, in accordance with the wavelength control tables and the buffer control tables, the packets in the memory regions corresponding to the shifted and circulated wavelength of variable wavelength transmission units are converted into optical signals at transmission wavelengths of the respective variable wavelength transmission units at respective times and output therefrom. Further, circulations of the transmission wavelengths of the respective tunable laser diodes (TLDs) are shifted from each other in phase such that the plural tunable laser diodes (TLDs) do not perform transmissions at the same wavelength at each time. The transmission wavelengths of the variable wavelength transmission units are thus controlled by the above-discussed wavelength control tables I to VIII.

[Operation of This Example]

Now, description will be made as to the transmission control method of this network system with reference to FIGS. 3, 4, 5, 6, 7, 14A and 14B and Tables 1 and 2.

[Transmitted Object of This Example]

To describe the transmission control method, an example of the packet transmission will be described referring to a case where a transmitting terminal equipment is the terminal equipment connected to the sub-transmission line I 1405 of the node device I 301 and an addressed terminal equipment is the terminal equipment II 1414 connected to the sub-transmission II 1406 of the node device II 302. Hereinafter, the packet to be transmitted is called a packet A. Also, the same elements in different node devices are represented by common reference numerals used in FIGS. 4, 5, 6 and 7 for convenience' sake.

[Operation in the Transmitting Node Device]

Initially, the communication operation of the terminal equipment I 1413 connected to the node device I 301 will be described. The transmitting terminal equipment I 1413 connected to the sub-transmission line I 1405 of the node device I 301 composes the packet A of both a data portion to be transmitted to the receiving terminal equipment II 1414 connected to the node device II 302 through the sub-transmission line II 1406, and an address portion to exhibit the address of the receiving terminal equipment II 1414, and the packet A is output to the separation-insertion unit I 133 of the node device I 301 through the sub-transmission line I 1405.

The separation-insertion unit I 133 of the node device I 301 finds a break in the packet stream received by the fixed wavelength reception unit I 117, inserts into this break the packet A input through the sub-transmission line I 1405 and outputs it to the buffer I 145. In the buffer I 145, the decoder 401 reads the address portion of the input packet A. In this case, since the destination for receiving the packet A is the terminal equipment II 1414 connected to the adjacent node device II 302, the decoder 401 sets such that the demultiplexer 404 outputs to the dual port memory 405 and outputs the predetermined writing start address value A2 of the packet A to the writing address counter 402. The writing address counter 402 thus starts with the writing start address value of the packet A and outputs discrimination signals of the memory regions, in which the packets are to be written, to the dual port memory in order. The packet A is stored in the memory region II in the dual port memory 405 because the packet A is to be transmitted to the terminal equipment II 1414 connected to the node device II 302. Since the terminal equipment II 1414 is connected to the separation-insertion unit II 137 in the node device II 302, the packet A needs to be converted into the optical signal of the wavelength $\lambda 2$ and input into the fixed wavelength reception unit II 121 connected to the separation-insertion unit II 137 in the node device II 302, so that the packet can reach the terminal equipment II 1414. The packet stored in the memory region II of the dual port memory 405 is read only when the transmission wavelength of the variable wavelength transmission unit is controlled to be set to the wavelength $\lambda 2$. As a result, the packet A is converted into the optical signal at the wavelength $\lambda 2$ and output to the node device II 302, when the transmission wavelength of the variable wavelength transmission unit is $\lambda 2$.

However, when the destination address of the input packet read by the decoder 401 in each node device is not the address of the terminal equipment connected to the adjacent node device, the decoder 401 sets the output of the demultiplexer 404 to be connected to the FIFO 406 and the received packet is stored in the FIFO 406.

The ROM counter 702 of the wavelength control unit 165 in the node device I 301 simultaneously outputs the reading address value to the wavelength control tables I to VIII and the buffer control tables I to VIII, on the basis of the clock signal of the clock 701. In accordance with the address value, the contents of the wavelength control tables and the buffer control tables are output to the respective variable wavelength transmission units and buffers. For example, when the reading address value 6 is output from the ROM counter 702 to the respective wavelength control tables and buffer control tables, the contents to be read is as follows, as shown in Table 1: The control signal corresponding to the wavelength $\lambda 4$ is read from the wavelength control table I, and the control signals corresponding to the wavelength $\lambda 2$, the wavelength $\lambda 1$, the wavelength $\lambda 3$, the wavelength $\lambda 5$, the wavelength $\lambda 7$, the wavelength $\lambda 8$ and the wavelength $\lambda 6$ are respectively read from the wavelength control tables II, III, IV, V, VI, VII and VIII. Those control signals are respectively input into the variable wavelength transmission units connected to the respective wavelength control tables. Each variable wavelength transmission unit transmits the optical signal at a predetermined wavelength on the basis of the control signal.

Further, the reading address value 6 is also output from the ROM counter 702 in the wavelength control unit 165 to the respective buffer control tables in the buffer control unit 164. The contents of the buffer control tables I to VIII are read in accordance with the address value. The contents to be read is as follows, as shown in Table 2: The offset value A4 corresponding to the memory region IV is read from the buffer control table I, and the offset values A2, A1, A3, A5, A7, A8 and A6 corresponding to the memory regions II, I, III, V, VII, VIII and VI are respectively read from the buffer control tables II, III, IV, V, VI, VII and VIII. Those offset values are respectively input into the reading address counters 403 of the respective buffers I to VIII.

Further, on the basis of the clock signal output from the wavelength control unit, the reading control unit 609 in the buffer control unit 164 outputs to the selector 407 a control signal of reading permission of the dual port memory and reading prohibition of the FIFO, during a dual port memory reading period Td. Then, the reading control unit 609 outputs to the selector 407 a control signal of reading permission of the FIFO and reading prohibition of the dual port memory, during a predetermined FIFO reading period Tf. Those outputs are changed over alternately. Thus, the input terminal of the selector 407 is selectively connected to the FIFO 406 or the dual port memory 405. The reading control unit 609 controls output time periods of respective reading permission control signals such that the total time period of the reading period Td of the dual port memory and the reading period Tf of the FIFO coincides with a period during which the variable wavelength transmission unit transmits the optical signal at a wavelength.

During the reading period Td of the dual port memory, the reading address counter 403 in the buffer I 145 performs loading thereinto the offset value A4 from the buffer control table I 601, and generates an address for reading the packet written in the memory region IV by performing an increment of the counter in due order to supply it to the dual port memory 405. The reading address permits the dual port memory 405 to read out and output the packet to the variable wavelength transmission unit I 129. Since the packet A is not stored in the memory region IV in the buffer I 145, the packet A is not output to the variable wavelength transmission unit I 129.

During the reading period Tf of the FIFO, the reading control unit 609 in the buffer control unit 164 outputs to the selector 407 the control signal of reading permission of the FIFO and reading prohibition of the dual port memory, and the selector 407 outputs the packet stored in the FIFO 406 to the variable wavelength transmission unit I 129.

Then, the ROM counter 702 of the wavelength control unit 165 counts the clock signal of the clock 701, and simultaneously outputs the reading address value 7 to the wavelength control tables I to VII and the buffer control tables I to VII. The contents to be read from the wavelength control table I 703 is the control signal corresponding to the wavelength $\lambda 2$ as shown in Table 1. The control signal corresponding to the wavelength $\lambda 2$ is input into the variable wavelength transmission unit I 129 connected to the wavelength control table I 703. The variable wavelength transmission unit I 129 transmits the optical signal of the wavelength $\lambda 2$ in accordance with the control signal.

Further, the reading address value 7 is also output from the ROM counter 702 in the wavelength control unit 165 to the respective buffer control tables I to VIII in the buffer control unit 164. The contents of the buffer control tables I to VIII are read in accordance with the address value. The contents to be read from the buffer control table I is the offset value A2 corresponding to the memory region II as shown in Table 2.

In synchronization with the output of the reading address value to each table, on the basis of the clock signal output from the wavelength control unit, the reading control unit 609 in the buffer control unit 150 outputs to the selector 407 the control signal of reading permission of the dual port memory and reading prohibition of the FIFO. During the reading period Td of the dual port memory, the reading address counter 403 in the buffer I 145 performs loading thereinto the offset value A2 from the buffer control table I 601, and generates the address for reading the packet A written in the memory region II by performing an increment of the counter in due order to supply it to the dual port memory 405. The reading address permits the dual port memory 405 to read out and output the packet A to the variable wavelength transmission unit I 129. The packet A is converted into the optical signal of the wavelength $\lambda 2$ by the variable wavelength transmission unit I 129, and output to the coupler 1403. The respective variable wavelength transmission units II to VIII convert the packets output from the buffers II to VIII into optical signals of predetermined wavelengths on the basis of the wavelength control signal from the wavelength control unit 151, and output them to the coupler 1403. As described above, wavelengths of the optical signals transmitted from the variable wavelength transmission units II 125, III 130, IV 126, V 131, VI 127, VII 132 and VIII 128 at this time are $\lambda 1, \lambda 3, \lambda 5, \lambda 7, \lambda 8, \lambda 6$ and $\lambda 4$. Thus, the wavelengths of the optical signals emitted from the eight variable wavelength transmission units are made different from each other by the control of the wavelength control unit 151, so that those are multiplexed by the coupler 1403 without being affected by each other. The optical signals of all the wavelengths are thus input into the optical fiber 1404 and transmitted to the adjacent node device downstream of this node device.

The packet A transmitted through the optical fiber 1404 is only received by the fixed wavelength reception unit II 121 in the node device II 302.

The received packet A is separated from the packet to be transmitted to the buffer II 141, by the separation-insertion unit II 137, and transmitted to the addressed terminal equipment II 1414.

The above-discussed example, however, has the following technical disadvantage.

In the network system and the transmission control method of the above example, where the transmitting terminal equipment and the addressed receiving terminal equipment are connected to different separation-insertion units in the same node device, for example, the packet output from the variable wavelength transmission unit is relayed and transmitted by all the node devices, arranged in a loop form, but this node device concerned, received by the fixed wavelength reception unit which outputs the packet to the separation-insertion unit connected to the addressed terminal equipment, output to the sub-transmission line through the separation-insertion unit and received by the addressed terminal equipment. Thus, where the transmitting terminal equipment and the addressed receiving terminal equipment are connected to the different separation-insertion units in the same node device, the transmitted packet circulates through the network and reaches the addressed terminal equipment.

In view of the above-discussed example, the present invention features interactive or bi-directional transmission of a signal. In the present invention, not only sequential transmission of a signal in a predetermined direction but also reverse transmission of a signal can be executed. In the sequential transmission, the signal is transmitted from a first node device to a second node device and from the second node device to a third node device, for example. In the reverse transmission, the signal is transmitted from the second node device to the first node device, for example.

A transmission control method of the present invention is as follows:

The transmission control method to be performed in a network system, which has a plurality of node devices and in which a signal is interactively transmitted between the node devices, includes a step of temporarily storing a signal to be output, in a first node device which is one of the plural node devices, and a step of outputting the temporarily-stored signal in the first node device selectively to a second node device, which is adjacent to the first node device, through a first channel, or to a second channel which is used when the second node device outputs a signal to the first node device. In the outputting step, the first node device is controlled such that when the second node device is not transmitting a signal to the second channel, the first node device can output the signal to the second channel to which no signal is output.

In this transmission control method, the first node device can handle a signal, which is output to the first channel in a first direction and reaches the second node device, and a signal which is output to the second channel in a second direction from the second node device and input into the first node device. Further, since the first node device can output a signal to the second channel such that this signal does not collide with a signal input from the second node device, the first node device can transmit a signal without passing the all the node devices on the network even when the first node device outputs a signal to a sub-transmission line connected to this node device concerned. Further, the transmission direction can be reversed by outputting a signal using the second channel.

Various configurations can be adopted as the channel. For example, there are a configuration which uses light of different wavelengths for discriminating the different channels from each other and a configuration which uses different transmission lines. This can be readily understood by considering that whether the channels are the same or not is decided by judging whether the channels are input into the same device or not. For example, the channels are decided to be the same when the channels are input from different transmission units to the same reception unit, and the collision between signals can be prevented by not outputting the signals thereto at the same time.

The output of the signal is preferably performed by changing the channel connected to a storing unit which temporarily stores the signal to be output and reading the signal from the storing unit when the storing unit is connected to a channel to which the signal is to be output. Specifically, when the alteration of the channel connected to the storing unit is executed pursuant to a pattern, there is no need to decide the channel, to which a signal is to be output, on the basis of the address of the signal and to change the connected channel pursuant to the decision, so that a load at the time of the signal output can be notably lightened.

Various patterns can be used as the pattern. For example, there are a pattern which sets such that the first channel and the second channel can be evenly selected and a pattern which sets such that time used by one of the first channel and the second channel is set longer than time used by the other. Specifically, in a network in which a need of the reversal is small, time used by the first channel can be set longer than time used by the second channel.

On the other hand, in the second node device, the following is performed:

A signal to be output is temporarily stored in the second node device; and

A signal is output to the first node device from the second node device using the second channel while the first node device is selecting the first channel pursuant to the pattern.

At this time, also in the second node device, when the output of the signal is performed by changing the channel connected to a storing unit, which temporarily stores the signal to be output, pursuant to the pattern and reading the signal from the storing unit when the storing unit is connected to a channel to which the signal is to be output, the patterns used by the first node device and the second node device have the same time length and those patterns are set such that different channels can be selected at the same time, a load of the control can be reduced, similar to the first node device. Here, in the first and second node devices, it is preferable that the timing of the channel alteration is adjusted and that the pattern in the first node device is used at the same timing as the pattern in the second node device.

An example of a way for deciding the pattern will be described. Numbers of the first channel and the second channel are the same, and the pattern in the first node device is a pattern in which after a first channel selection pattern for selecting the first channel is selected n1 (an integer) times, a second channel selection pattern for selecting the second channel is selected n2 (an integer) times.

Here, the collision between the signals can be prevented by the following operation of the second node device.

A signal to be output is temporarily stored in the second node device; and

A signal is output to the first node device from the second node device using the second channel while the first node device is selecting the first channel pursuant to the pattern.

Furthermore, the pattern used in the second node device can be decided as follows:

The second node device outputs the temporarily-stored signal in the second node device selectively to the first node device through the second channel, or to the first channel which is used when the first node device outputs the signal to the second node device. Here, the output of the signal through the selected channel is performed by changing the channel connected to the storing unit which temporarily stores the signal to be output in the second node device and reading the signal from the storing unit when the storing unit, is connected to the channel to which the signal is to be output. The pattern in the second node device is a pattern in which after the second channel selection pattern for selecting the second channel is selected n1 (an integer) times, the first channel selection pattern for selecting the first channel is selected n2 (an integer) times. In the first and second node devices, the pattern in the first node device is used with the same timing as the pattern in the second node device.

Further, another way for deciding the pattern may be the following method:

Further, another way for deciding the pattern may be the following method:

The number of the first channels is N1 and the number of the second channels is N2 (N1>N2), and the pattern in the first node device is a pattern in which after the first channel selection pattern for selecting the first channel is selected n1 times, the second channel is selected N2·CM2/N1 times among nn2 second channel selection pattern for selecting the second channel, where the larger of common multiples between N1 and N2 is CM1, the smaller thereof is CM2, a value obtained by dividing CM1 by N1 is n1, a value obtained by dividing CM1 by N2 is n2, a value obtained by dividing CM2 by N1 is nn1 and a value obtained by dividing CM2 by N2 is nn2.

Here, similar to the above, the collision between the signals can be readily prevented by the following operation of the second node device.

A signal to be output is temporarily stored in the second node device; and

A signal is output to the first node device from the second node device using the second channel while the first node device is selecting the first channel pursuant to the pattern.

Furthermore, the pattern used in the second node device can also be decided as follows:

The second node device outputs the temporarily-stored signal in the second node device selectively to the first node device through the second channel, or to the first channel which is used when the first node device outputs the signal to the second node device. Here, the output of the signal through the selected channel is performed by changing the channel connected to the storing unit which temporarily stores the signal to be output in the second node device and reading the signal from the storing unit when the storing unit is connected to the channel to which the signal is to be output. The pattern in the second node device is a pattern in which after the second channel selection pattern for selecting the second channel is selected n2 times, the first channel selection pattern for selecting the first channel is selected nn1 times. In the first and second node devices, the pattern in the first node device is used with the same timing as the pattern in the second node device.

Further, when the pattern is to be set, the pattern can also be decided such that a ratio in the pattern between time, during which the first channel is selected, and time, during which the second channel is selected, is approximately the same as a ratio between time, which is needed to output the signal to be output to the first channel, and time, which is needed to output the signal to be output to the second channel.

Furthermore, when the pattern is altered pursuant to the situation, the pattern can be set according to the traffic of the network system.

An example of the pattern alteration is as follows:

The pattern is altered such that the first ratio in the pattern between time, during which the first channel is selected, and time, during which the second channel is selected, becomes closer to the second ratio between time, which is needed to output the signal to be output to the first channel, and time, which is needed to output the signal to be output to the second channel. An example of the signal used in the present invention is packet signals which respectively have address data. The packet signal may be a signal having a fixed length, such as a cell in ATM communications, or a signal having a variable length whose length is not fixed. For example, where the fixed-length signal is treated, the above second ratio between time, which is needed to output the signal to be output to the first channel, and time, which is needed to output the signal to be output to the second channel, can be known by monitoring the number of the signals to be output through the first channel and the number of signals to be output through the second channel and obtaining a ratio between those numbers. Therefore, the pattern may be altered such that the above first ratio approaches the above second ratio. The signals may be monitored by this node device concerned or another node device.

Such pattern alteration may be performed as follows: The pattern is composed of the first channel selection pattern for selecting the first channel and the second channel selection pattern for selecting the second channel, and the pattern is altered by changing the number of the first channel selection patterns and the number of the second channel selection patterns. The reason therefor is that the pattern can be altered by the combination of sub-patterns without making again the entire pattern from the beginning each time the alteration is desired.

Further, in the first node device, when the signals are input thereinto from another node device through a plurality of channels, the storing unit stores the signals in a divided form per each input channel and the storing unit outputs the respective signals from its different output portions, the channels of the signals transmitted from another node device can be interchanged in the first node device. A specific structure of the storing unit may be a structure in which buffers are respectively provided for the input channels. Outputs from the respective buffers can be considered as outputs from the respective different output portions.

Specific constructions may be as follows: The first node device includes variable channel transmission units corresponding to the respective output portions, and the channels connected to the storing unit are altered by changing the transmission channels of the respective variable channel transmission units. The first node device includes a connection alteration unit provided with input terminals corresponding to the respective output portions and output terminals corresponding to the respective channels, and the channels connected to the storing unit are altered by changing the relationship between the input terminals and the output terminals of the connection alteration unit.

Furthermore, where the following control is performed in addition to the above-discussed control, communication can also be performed with a third node device which is further another node device adjacent to the first node device.

The signals are stored in the first node device with the following signals being discriminated from each other: A first kind of signals is a signal which is output selectively to the adjacent second node device through the first channel, or to the second channel which is used when the second node device outputs the signal to the first node device, and a second kind of signals is a signal which is output selectively to the adjacent third node device through a third channel, or to a fourth channel which is used when the third node device outputs the signal to the first node device. Here, the first node device is controlled such that when the third node device is not transmitting the signal to the fourth channel, the first node device can output the signal to be output to the fourth channel, out of the signals which are selectively output through the third channel or the fourth channel, to the fourth channel to which no signal is output.

When such control is performed, the above-discussed controls of the first node device and the second node device can also be applied to controls of the first node device and the third node device. As will be described in the following embodiments, when the structure of a loop-type network is adopted, the first and fourth channels serve as channels for transmitting in a first direction and the second and third channels serve as channels for transmitting in a direction opposite to the first direction.

In the present invention, the first node device outputs the signal to be output to the sub-transmission line connected to this node device, out of the signals stored in the first storing unit, to the second channel, and outputs the signal to be output to the sub-transmission line connected to this node device, out of the signals stored in the second storing unit, to the fourth channel. Thus, the signal to be separated from the second channel to the addressed sub-transmission line, out of the signals stored in the first storing unit, is separated and reaches the addressed destination after output through the second channel, while the signal to be separated from the first channel to the addressed sub-transmission line, out of the signals stored in the first storing unit, is once again temporarily stored in the second storing unit after output through the second channel and output through the first channel to reach the addressed destination. The signals from the second storing unit are also dealt with in the same manner.

Further, in order to prevent unnecessary reversal of the transmission, the first node device only needs to be controlled such that it does not output the signal, whose output channel need not be designated, out of the temporarily-stored signals, when the signal can be output to the second and fourth channels.

Further, where the first, second and third node devices are arranged, the first node device only needs to be controlled such that the signal output to the fourth channel is input into the first storing unit of the first node device and that the signal output to the second channel is input into the second storing unit of the first node device.

Further, the node device is preferably constructed such that it is connected to the terminal equipment and the like through the sub-transmission line and that the signal to be output to the sub-transmission line connected to this node device, out of the input signals, is separated from other signals and output to this sub-transmission line.

Further, when the storing unit is constructed such that it stores the signals in a divided form for different channels to which those signals are to be output, control for reading the signals is facilitated and speedy reading can be attained.

Further, in the node device, since all the signals need not be transmitted with their channels being designated, it is preferable that the storing unit stores the signal, whose output channel is to be designated, and the signal, whose output channel is not to be designated, in a separate form from each other.

Furthermore, a network system of the present invention is constructed in the following manner.

The network system, which includes a plurality of node devices and performs an interactive or bi-directional transmission of a signal between the node devices, includes a first node device which is a node device of the plural node devices and have the following units. Those are a storing unit for temporarily storing the signal to be output, and a connection unit for connecting the storing unit to a first channel for outputting to an adjacent second node device or a second channel for outputting from the second node device to the first node device. The connection unit connects the storing unit to the second channel, to which no signal is output, when the second node device is not outputting the signal to the second channel.

The present invention further includes network systems for performing the above-discussed transmission controls.

In particular, as a specific structure, the transmission unit for performing the optical transmission may be a structure using a tunable laser and devices for combining or multiplexing, dividing and demultiplexing the optical signal are used. Further, another structure for altering channels may be a structure using a switch.

BRIEF DESCRIPTION OF DRAWINGS

By way of example and to make the description more clear, reference is made to the accompanying drawings in which:

FIG. 7 is a block diagram of a wavelength control unit illustrating the first embodiment according to the present invention;

FIG. 17A and FIG. 17B are time charts illustrating a fourth embodiment according to the present invention;

DETAILED DESCRIPTION OF THE PREFERRED EMBODIMENTS

First Embodiment

Figure 1B:
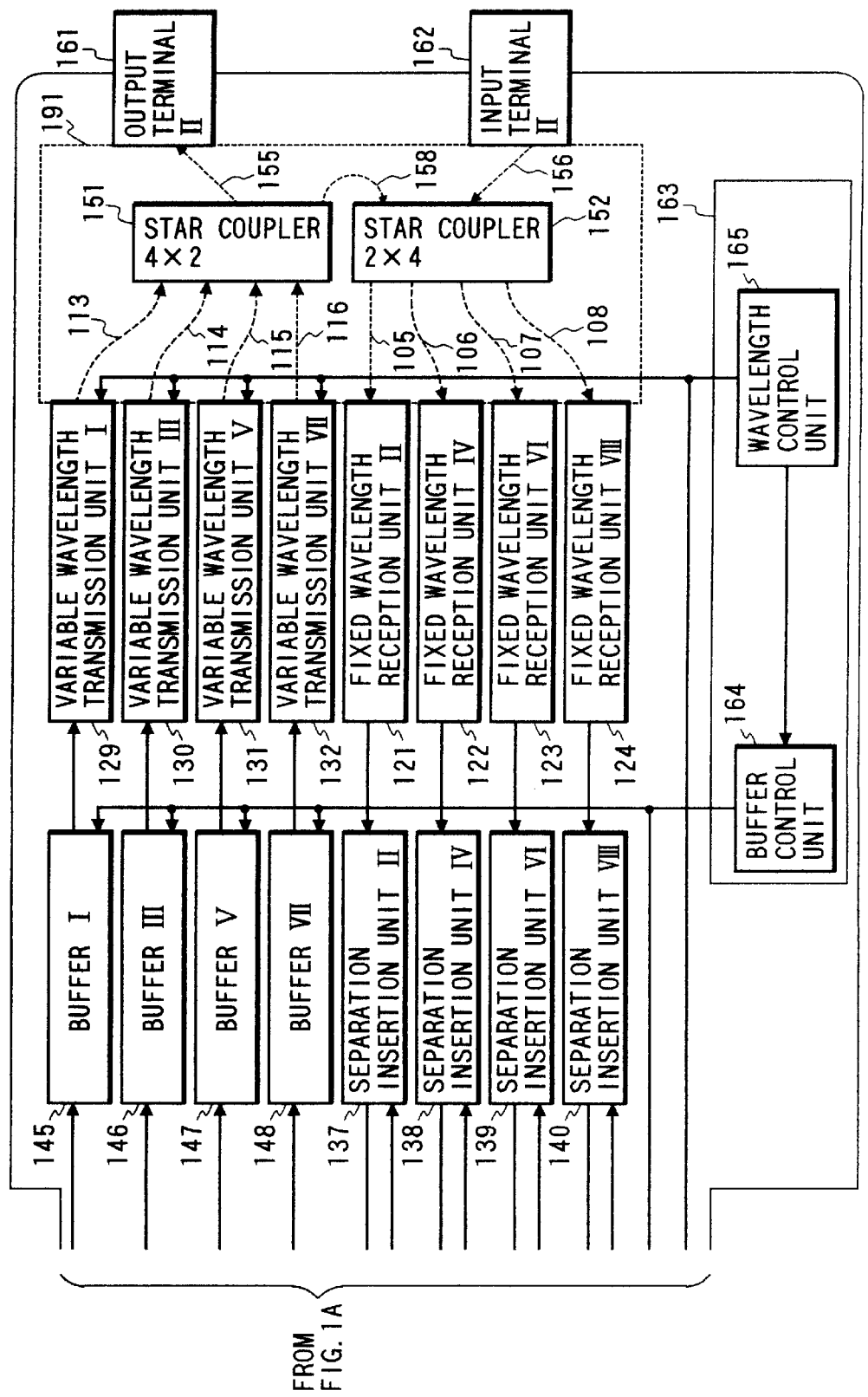
FIG. 1, which consists of FIG. 1A and FIG. 1B, is a schematic diagram of a node device illustrating a first embodiment according to the present invention.

FIGS. 1A and 1B show the structure of a node device of the present invention. In this node device, the arrangement of fixed wavelength reception units, separation-insertion units, buffers and variable wavelength transmission units is different from that in the node device of the above-discussed reference example. Operation functions of the fixed wavelength reception units, separation-insertion units, buffers, variable wavelength transmission units, buffer control unit and wavelength control unit in the node device of the present invention are fully identical with operation functions thereof used in the node device of the reference example. Therefore, functions of portions in FIGS. 1A and 1B corresponding to those of the reference example will not be described hereinafter.

The node device of the present invention differs from the node device of the reference example in functions which achieve the interactive communication and reverse communication of the packet. Therefore, the structure of the node device of the present invention is divided into two portions for performing communications in mutually-different transmission directions and a portion for reversing transmission of the packet. For convenience' sake, the transmission direction of the packet input into an input terminal I 159 is called a first direction, and the transmission direction of the packet input into an input terminal II 162 is called a second direction. Transmission functions of variable wavelength transmission units I 129, II 125, III 130, IV 126, V 131, VI 127, VII 132 and VIII 128 for outputting optical signals in the respective transmission directions are fully the same with each other. Variable transmission wavelengths are wavelengths of $\lambda 1, \lambda 2, \lambda 3, \lambda 4, \lambda 5, \lambda 6, \lambda 7$ and $\lambda 8$. Here, the wavelength $\lambda 1$ is the shortest of all, and the wavelength becomes longer as the wavelength-discriminative number becomes greater. Fixed wavelength reception units are classified into a group of fixed wavelength reception units II 121, IV 122, VI 123 and VIII 124 for receiving wavelengths whose discriminative numbers are even numbers and a group of fixed wavelength reception units I 117, III 118, V 119 and VII 120 for receiving wavelengths whose discriminative numbers are odd numbers. As is known from FIGS. 1A and 1B, the group of the fixed wavelength reception units arranged for the communication in the first direction consists of the fixed wavelength reception units I 117, III 118, V 119 and VII 120 which respectively receive optical signals of the wavelengths $\lambda 1, \lambda 3, \lambda 5$ and $\lambda 7$. The group of the fixed wavelength reception units arranged for the communication in the second direction consists of the fixed wavelength reception units II 121, IV 122, VI 123 and VIII 124 which respectively receive optical signals of the wavelengths $\lambda 2, \lambda 4, \lambda 6$ and $\lambda 8$.

Reference numeral 190 designates a wavelength multiplexing transmission system for transmitting the wavelength multiplexed optical signals input into the node device of the present invention and optical signals transmitted from the variable wavelength transmission units in this node device, which transmits a portion of the wavelength multiplexed light output from the variable wavelength transmission units II, IV, VI, VIII to an adjacent node device and transmits the remaining wavelength multiplexed light to the fixed wavelength reception units I, III, V and VII arranged on the same side.

Here, it is necessary that channels (here, wavelengths $\lambda 2, \lambda 4, \lambda 6$ and $\lambda 8$), which are output from the channel alteration unit (here, the variable wavelength transmission units II, IV, VI and VIII) for outputting the packet for the node device adjacent to this node device concerned in the second direction and are to be received by the adjacent node device in the second direction, are guided to the adjacent node device in the second direction and that channels (here, channels to be received in this node device concerned, and wavelengths $\lambda 1, \lambda 3, \lambda 5$ and $\lambda 7$), which are to be reversed for the first direction, are guided to the reception units in this node device. In this embodiment, however, since the discrimination of the respective channels is performed by the respective fixed wavelength reception units, output destinations are not discriminated by the channels and instead a star coupler performs distribution as described in the following.

Reference numerals 109, 110, 111 and 112 designate optical fibers for transmitting optical signals output from the variable wavelength transmission units corresponding thereto. Reference numeral 150 designates a 4×2 star coupler (four inputs and two outputs) which combines or multiplexes the optical signals transmitted through the optical fibers 109, 110, 111 and 112 and divides the combined one into optical fibers 154 and 157. Reference numeral 160 designates an output terminal I which outputs the wavelength multiplexed light transmitted through the optical fiber 154. Reference numeral 159 designates an input terminal I for wavelength multiplexed optical signals output from the adjacent node device. Reference numeral 153 designates an optical fiber for transmitting the wavelength multiplexed optical signals input through the input terminal I 159. Reference numeral 149 designates a 2×4 star coupler (two inputs and four outputs) which combines or multiplexes the optical signals transmitted through the optical fibers 153 and 157 and divides the combined one into the optical fibers 101, 102, 103 and 104.

Reference numeral 191 also designates a wavelength multiplexing transmission system having the same structure as the wavelength multiplexing transmission system.

Here, it is necessary that channels (here, wavelengths $\lambda 1$, $\lambda 3$, $\lambda 5$ and $\lambda 7$), which are output from the channel alteration unit (here, the variable wavelength transmission units I, III, V and VII) for outputting the packet for the node device adjacent to this node device concerned in the first direction and are to be received by the adjacent node device in the first direction, are guided to the adjacent node device in the first direction and that channels (here, channels to be received in this node device concerned, and wavelengths $\lambda 2$, $\lambda 4$, $\lambda 6$ and $\lambda 8$), which are to be reversed for the second direction, are guided to the reception units in this node device.

Reference numerals 105, 106, 107 and 108 designate optical fibers corresponding to the optical fibers 101, 102, 103 and 104 in the wavelength multiplexing transmission system 190. Reference numerals 113, 114, 115 and 116 designate optical fibers corresponding to the optical fibers 109, 110, 111 and 112 in the wavelength multiplexing transmission system 190. Reference numeral 151 designates a 4×2 star coupler corresponding to the 4×2 star coupler 150. Reference numeral 152 designates a 2×4 star coupler corresponding to the 2×4 star coupler 149.

Therefore, when the variable wavelength transmission units II 125, IV 126, VII 127 and VIII 128 output optical signals of the wavelengths $\lambda 1$, $\lambda 3$, $\lambda 5$ and $\lambda 7$, the optical signals at the respective wavelengths are divided into the optical fibers 101, 102, 103 and 104 by the 2×4 star coupler 149 after transmitted through the 4×2 star coupler 150 and the optical fiber 157. The divided optical signal of the wavelength $\lambda 1$ is only received by the fixed wavelength reception unit I 117, the divided optical signal of the wavelength $\lambda 3$ is only received by the fixed wavelength reception unit III 118, the divided optical signal of the wavelength $\lambda 5$ is only received by the fixed wavelength reception unit V 119, and the divided optical signal of the wavelength $\lambda 7$ is only received by the fixed wavelength reception unit VII 120. Similarly, when the variable wavelength transmission units I 129, III 130, V 131 and VII 132 output optical signals of the wavelengths $\lambda 2$, $\lambda 4$, $\lambda 6$ and $\lambda 8$, the optical signals at the respective wavelengths are divided into the optical fibers 105, 106, 107 and 108 by the 2×4 star coupler 152 after transmitted through the 4×2 star coupler 151 and the optical fiber 158. The divided optical signal of the wavelength $\lambda 2$ is only received by the fixed wavelength reception unit II 121, the divided optical signal of the wavelength $\lambda 4$ is only received by the fixed wavelength reception unit IV 122, the divided optical signal of the wavelength $\lambda 6$ is only received by the fixed wavelength reception unit VI 123, and the divided optical signal of the wavelength $\lambda 8$ is only received by the fixed wavelength reception unit VIII 124. In other words, the optical signals of the wavelengths $\lambda 1$, $\lambda 3$, $\lambda 5$ and $\lambda 7$ output from the variable wavelength transmission units II 125, IV 126, VI 127 and VIII 128 are received by the fixed wavelength reception units of predetermined wavelengths in this node device concerned, and the optical signals of the wavelengths $\lambda 2$, $\lambda 4$, $\lambda 6$ and $\lambda 8$ output from the variable wavelength transmission units I 129, III 130, V 131 and VII 132 are also received by the fixed wavelength reception units of predetermined wavelengths in this node device concerned. Namely, when the variable wavelength transmission unit outputs the optical signal of the predetermined wavelength, this signal can be received by the fixed wavelength reception unit disposed on the same side in this node device concerned. This means the function of reversing the transmission direction of the optical signal.

Figure 2B:
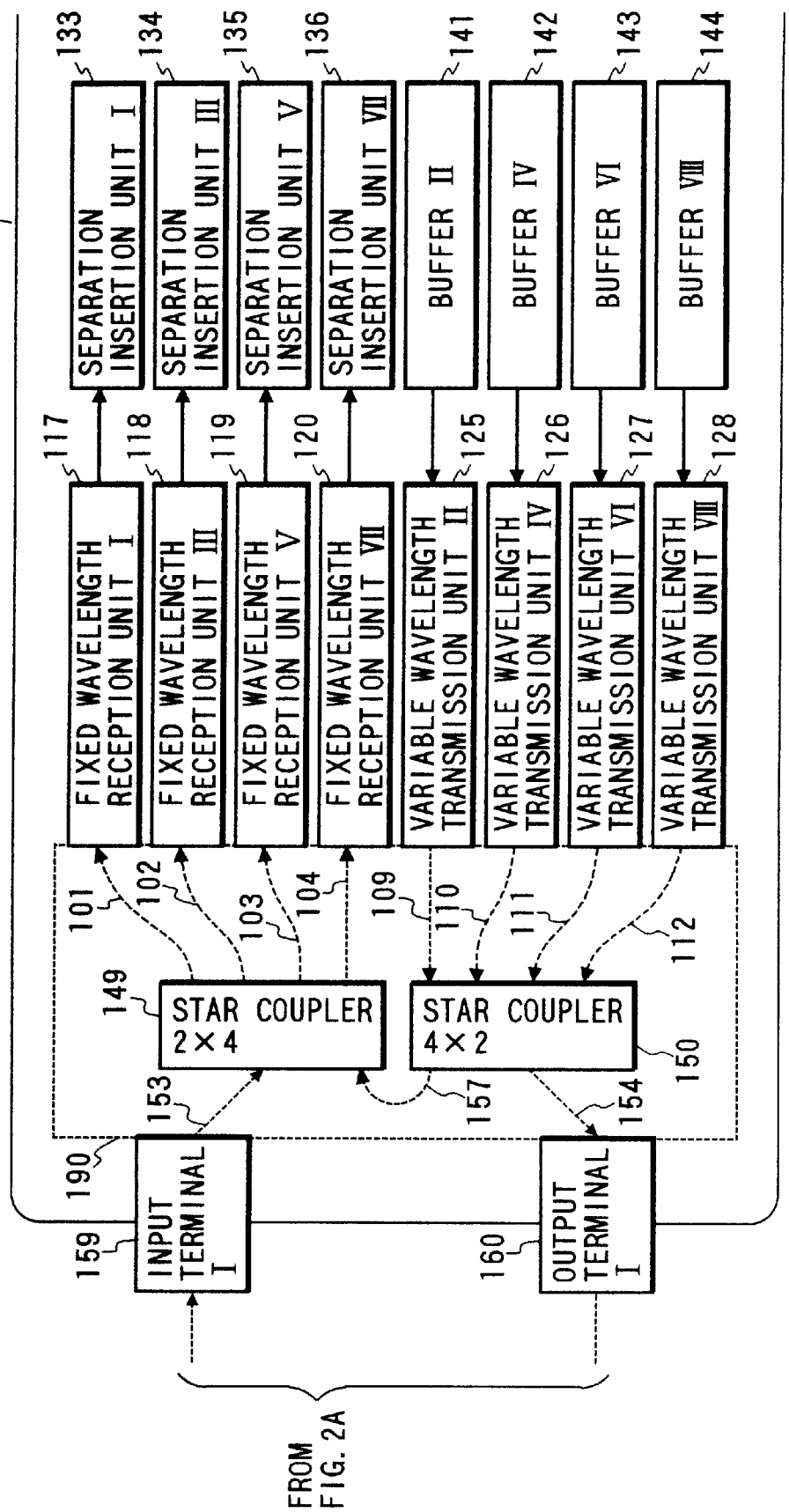
FIG. 2, which consists of FIG. 2A and FIG. 2B, is a schematic diagram of a wavelength division multiplexing transmission system illustrating the first embodiment according to the present invention.

FIGS. 2A and 2B show connection configurations between the node devices of the present invention. In the connection configuration between desired node devices, the output terminal II 161 and the input terminal II 162 in one node device are set to be respectively connected to the input terminal I 159 and the output terminal I 160 in the other node device. The following communication can be executed by that connection configuration. When the variable wavelength transmission units I 129, III 130, V 131 and VII 132 in a node device 100 of FIG. 2A output optical signals of the wavelengths $\lambda 1$, $\lambda 3$, $\lambda 5$ and $\lambda 7$, the optical signals at the respective wavelengths are input into a node device 199 after transmitted through the 4×2 star coupler 151, optical fiber 155 and optical fiber 200, and are divided into the optical fibers 101, 102, 103 and 104 by the 2×4 star coupler 149. The divided optical signal of the wavelength $\lambda 1$ is only received by the fixed wavelength reception unit I 117, the divided optical signal of the wavelength $\lambda 3$ is only received by the fixed wavelength reception unit III 118, the divided optical signal of the wavelength $\lambda 5$ is only received by the fixed wavelength reception unit V 119, and the divided optical signal of the wavelength $\lambda 7$ is only received by the fixed wavelength reception unit VII 120. In other words, where the variable wavelength transmission units I 129, III 130, V 131 and VII 132 intend to transmit the packet to the adjacent node device, the optical signal of any of the wavelengths $\lambda 1$, $\lambda 3$, $\lambda 5$ and $\lambda 7$ is transmitted therefrom. Where the packet is intended to be transmitted to (returned to or reversed to) this node device concerned, the optical signal of any of the wavelengths $\lambda 2$, $\lambda 4$, $\lambda 6$ and $\lambda 8$ is output.

Figure 3:
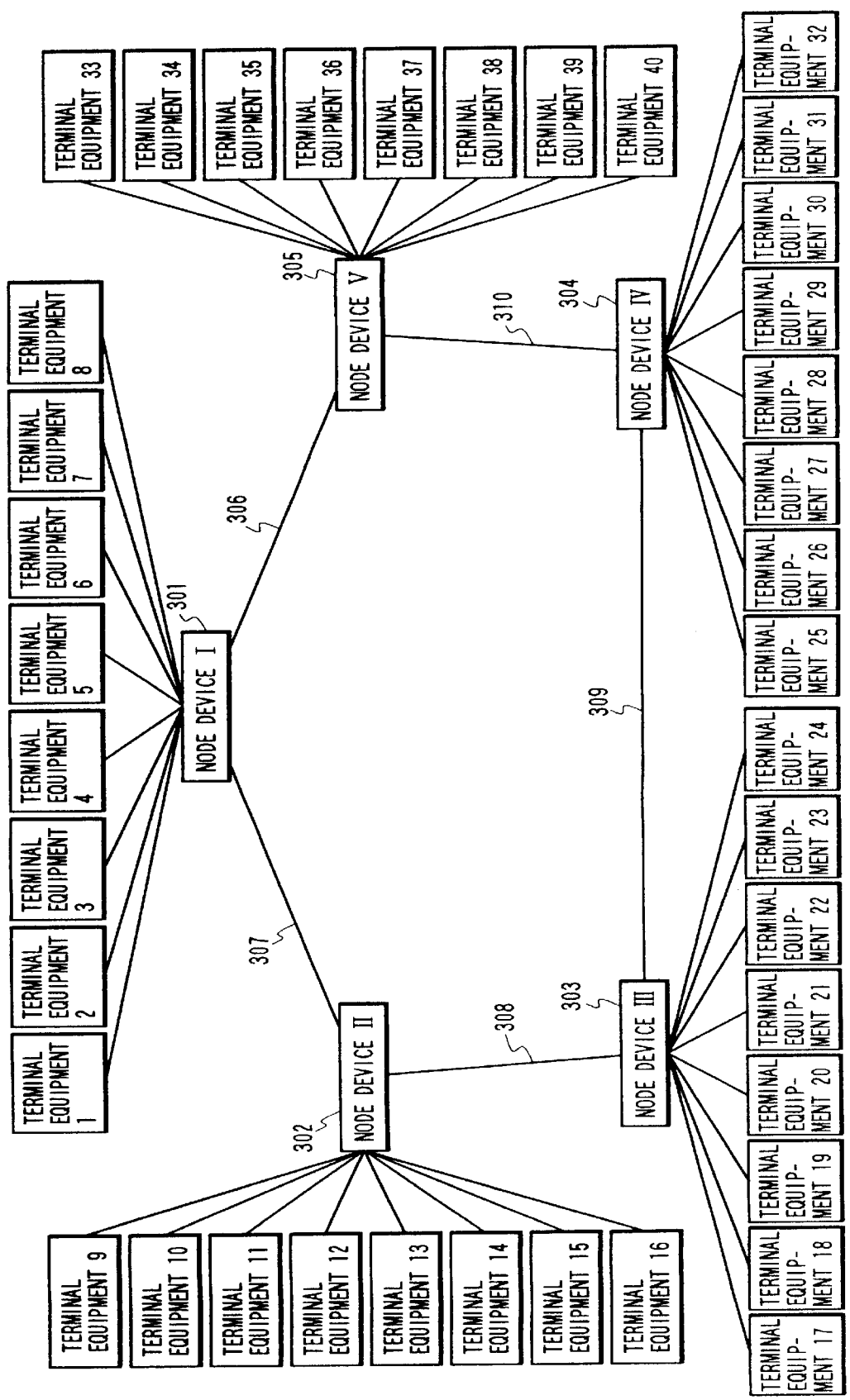
FIG. 3 is a schematic diagram of an optical communication network system illustrating the first embodiment according to the present invention.
Figure 4:
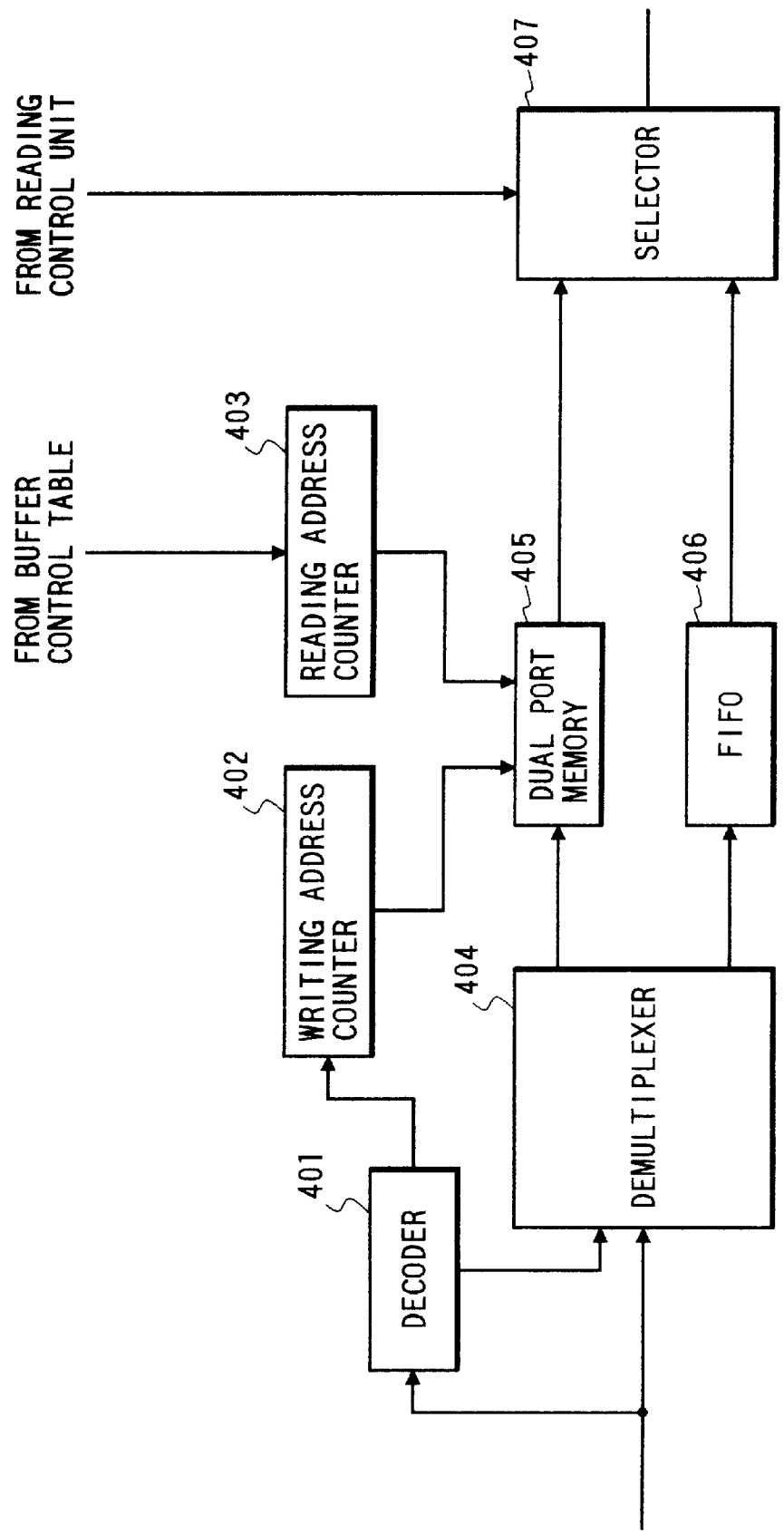
FIG. 4 is a block diagram of a buffer unit illustrating the first embodiment according to the present invention.
Figure 5:
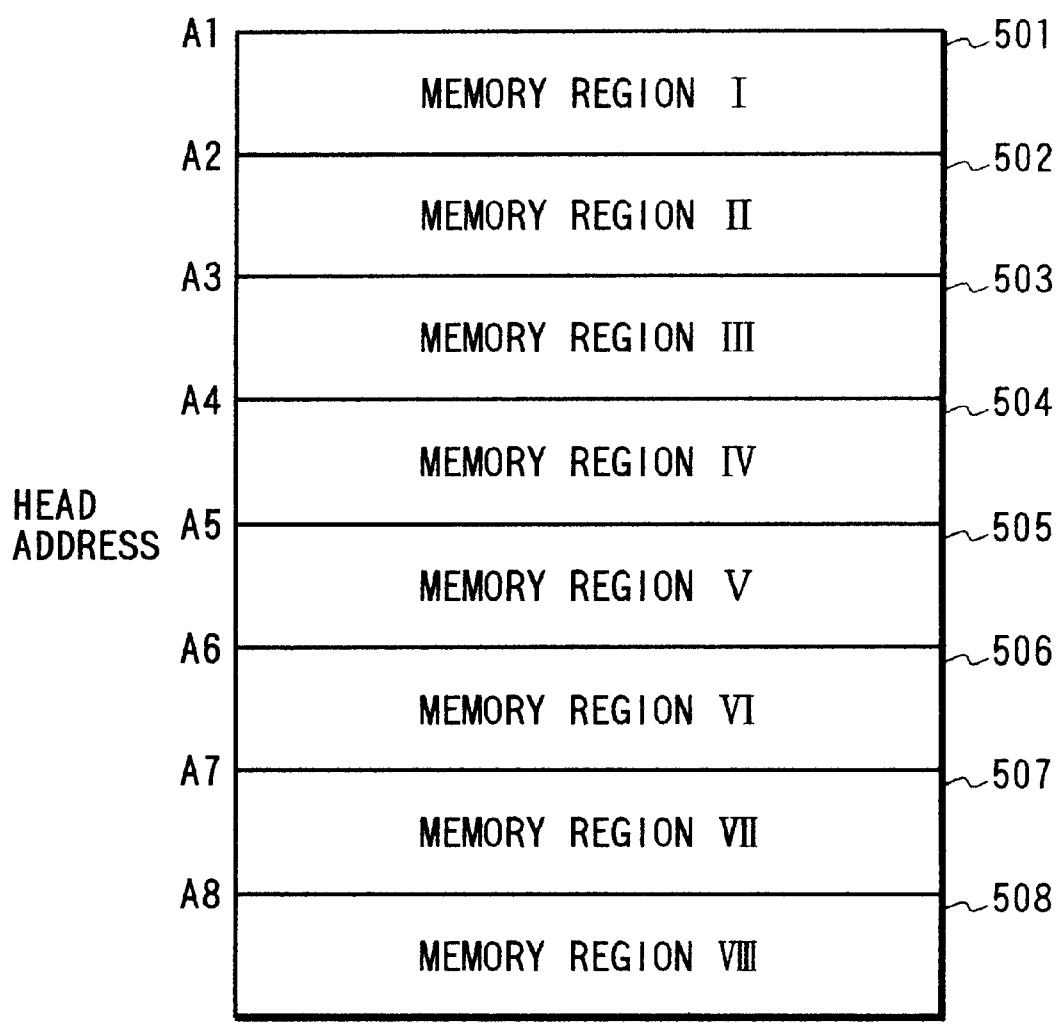
FIG. 5 is a view of a memory map of a dual port memory illustrating the first embodiment according to the present invention.
Figure 6:
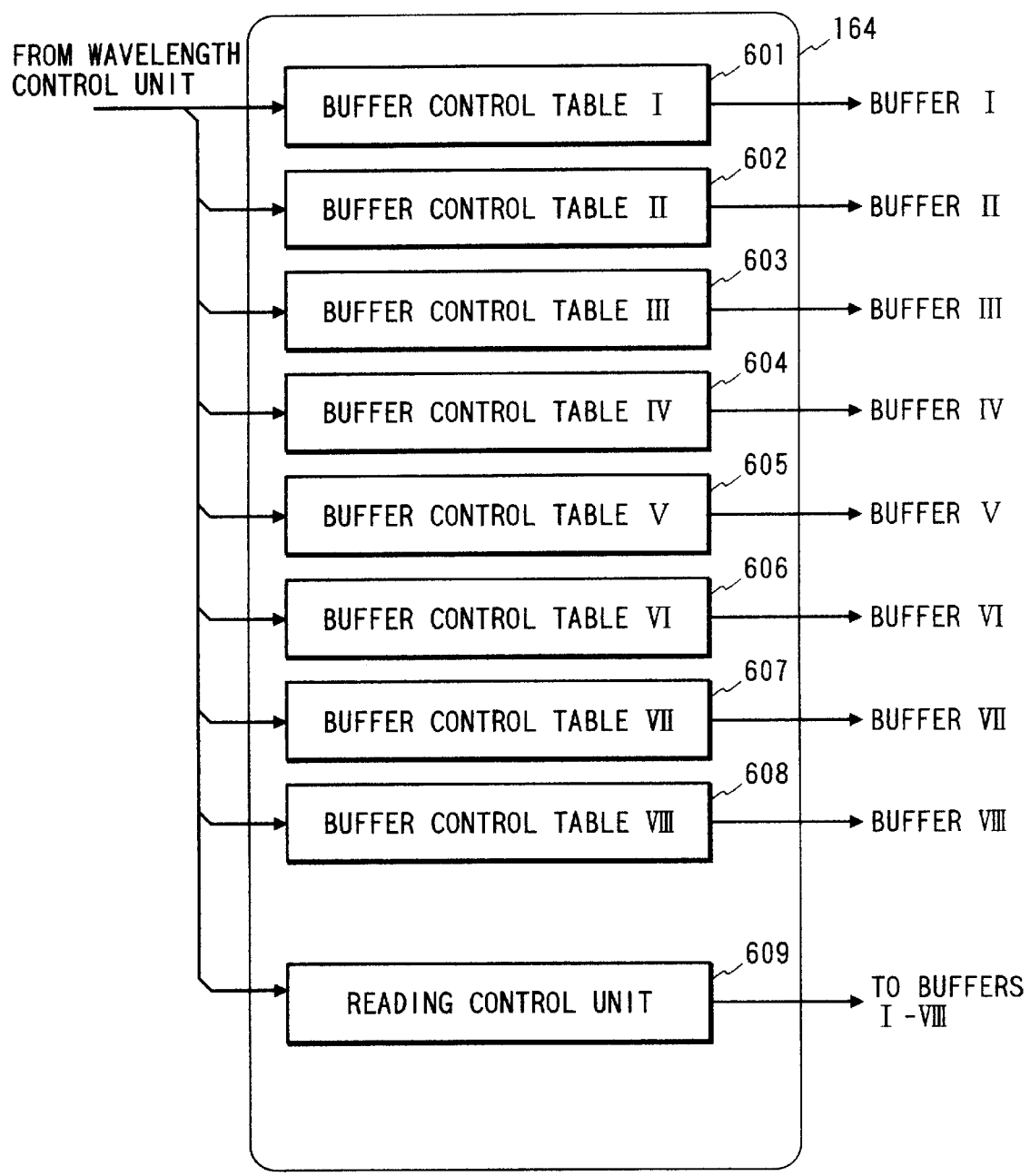
FIG. 6 is a block diagram of a buffer control unit illustrating the first embodiment according to the present invention.

FIG. 3 shows a structural example of a network system constructed by establishing the connection configuration between two node devices. Further, FIG. 5 shows the memory regions and addresses of the dual port memory 405, FIG. 6 shows the structures of the control unit 163 and buffer control unit 164 and FIG. 7 shows the structure of the wavelength control unit 165. Those perform the same operations as described above. Operations of the buffer units 141–144 and 145–148 are different from those of the reference example, and detailed explanation thereof will be made later when the operation of the node device will be described. In wavelength multiplexing transmission lines 306–310 of FIG. 3, there are disposed optical fibers which are two rightward- and leftward-circulating transmission lines.

[Operation of First Embodiment]

The transmission control method of this network system will be described with reference to FIGS. 1A, 1B, 2A, 2B, 3, 4, 5, 6 and 7, Table 1, Table 2 and the time charts of FIGS. 8A and 8B.

In the description of the transmission control method, it is assumed that the node device I 301 is the node device 100 of FIG. 2A and the node device II 302 is the node device 199 of FIG. 2B. Therefore, when the node device 100 outputs the packet to the node device adjacent thereto in the second direction, the packet is received by the node device V 305.

[Transmission Destination of Packet]

The transmission control method of the network system will then be described on the following assumption of two packets' transmission lines. (a) The packet I is to be transmitted from the terminal equipment I 174 connected to the node device I 301 to the terminal equipment II 175 connected to the same node device I 301. (b) The packet II is to be transmitted from the terminal equipment II 175 connected to the node device I 301 to the terminal equipment IV 177 connected to the node device V 305 adjacent thereto in the second direction.

Common constitutional elements in different node devices, such as node devices I 301 and V 305, are designated by the same reference numerals as those in FIGS. 1A, 1B, 2A, 2B, 3, 4, 5, 6 and 7.

Figure 8A:
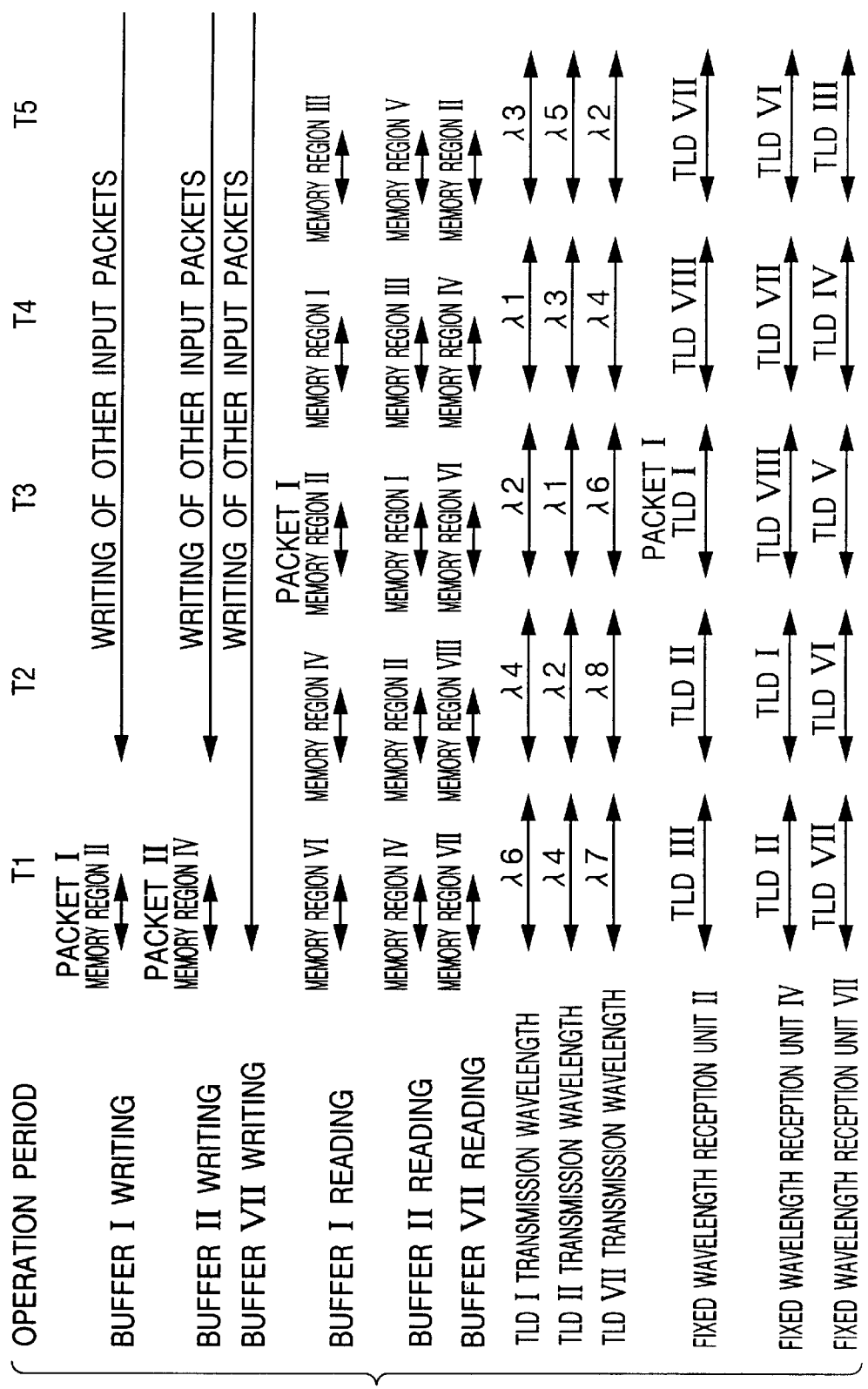
FIG. 8A and FIG. 8B are time charts illustrating the first embodiment according to the present invention.
Figure 8B:
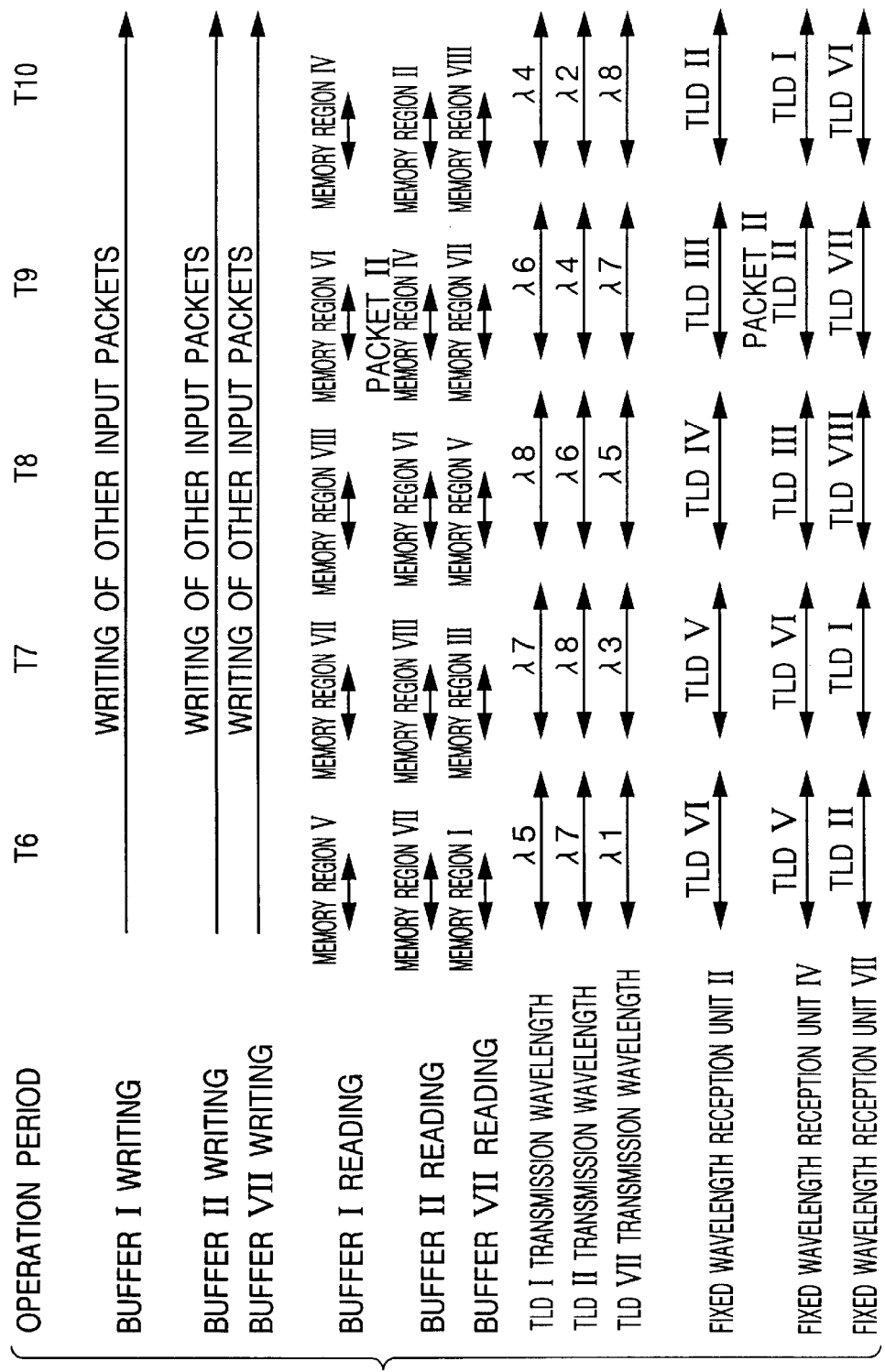

Further, the address value (synchronization signal) from the ROM counter 702 for reading buffer control tables and wavelength control tables in the node device I 301 is assumed to be 5 in the operation period T1 illustrated in FIG. 8A, for the sake of explanation. Therefore, it is assumed that address values from the ROM counter 702 during operation periods T2, T3, . . . , T9 and T10 respectively circulate as 6, 7, 0, 1, 2, 3, 4, 5 and 6.

[Operation of Node Device I 301]

The communication operation of the node device 100 (node device I 301 in FIG. 3) will be described referring to the time chart of FIGS. 8A and 8B hereinafter. In the beginning of the operation period T1, the terminal equipment I 174 connected to the transmitting node device 100 outputs the packet I having the address of the destination and transmission data to the separation-insertion unit I 133 in the node device 100 through the sub-transmission line I 166. The address affixed to the transmission data by the terminal equipment I 174 is the terminal equipment II 175 connected to the addressed node device 100.

During the operation period T1, the separation-insertion unit I 133 of the node device 100 finds a break in the packet stream received by the fixed wavelength reception unit I 117, inserts into this break the packet I input through the sub-transmission line I 166 and outputs it to the buffer I 145. During the operation period T1, the decoder 401 in the buffer I 145 reads the address portion of the input packet I. The destination for receiving the packet I is the terminal equipment II 175 connected to this node device concerned 100, so that the packet I passes the channel alteration unit or variable wavelength transmission unit only one more time until it reaches the destination. Therefore, when this packet is read from this buffer and output from the variable wavelength transmission unit, the packet should be output through the channel (wavelength) connected to the addressed destination. Hence, the decoder 401 sets such that the demultiplexer 404 outputs to the dual port memory 405 and outputs the predetermined writing start address value A2 of the packet I to the writing address counter 402. The writing address counter 402 thus starts with the writing start address value A2 of the packet I and outputs the discrimination signal of the memory region II, in which the packet is to be written, to the dual port memory 405 in order. The predetermined writing start address value of the packet I in the dual port memory 405 is A2 because the packet I is to be transmitted to the terminal equipment II 137 connected to this node device 100. Since the terminal equipment II 175 is connected to the separation-insertion unit II 137 in this node device 100, this packet needs to be converted into the optical signal of the wavelength λ2 and input into the fixed wavelength reception unit II 121 connected to the separation-insertion unit II 137 in this node device 100, so that the packet can reach the terminal equipment II 175. The packet stored in the memory region II of the dual port memory 405 in each buffer is read only when the transmission wavelength of the variable wavelength transmission unit is controlled to be set to the wavelength λ2. As a result, the packet I is converted into the optical signal at the wavelength λ2 and received by the fixed wavelength reception unit II 121 through the reversing or returning means in the wavelength multiplexing transmission system 191, when the transmission wavelength of the variable wavelength transmission unit I 129 is λ2. The transmission of the optical signal of packet I in the wavelength multiplexing transmission system 191 will be described later.

Similarly, in the beginning of the operation period T1, the terminal equipment I 175 outputs the packet II having the address of the destination and transmission data to the separation-insertion unit II 137 in the node device 100 through the sub-transmission line II 167. The address affixed to the transmission data by the terminal equipment II 175 is the terminal equipment IV 177 connected to the addressed node device IV 177.

During the operation period T1, the separation-insertion unit II 137 of the node device 100 finds a break in the packet stream received by the fixed wavelength reception unit II 121, inserts into this break the packet II input through the sub-transmission line II 167 and outputs it to the buffer II 141. During the operation period T1, the decoder 401 in the buffer II 141 reads the address portion of the input packet II. The destination for receiving the packet II is the terminal equipment IV 177 connected to the adjacent node device V 305, so that the packet II passes the channel alteration unit or variable wavelength transmission unit only one more time until it reaches the destination. Therefore, when this packet is read from this buffer and output from the variable wavelength transmission unit, the packet should be output through the channel (wavelength) connected to the addressed destination. Hence, the decoder 401 sets such that the demultiplexer 404 outputs to the dual port memory 405 and outputs the predetermined writing start address value A4 of the packet II to the writing address counter 402. The writing address counter 402 thus starts with the writing start address value A4 of the packet II and outputs the discrimination signal of the memory region IV, in which the packet is to be written, to the dual port memory 405 in order. The predetermined writing start address value of the packet II in the dual port memory 405 is A4 because the packet II is to be transmitted to the terminal equipment IV 177 connected to the adjacent node device V 305. Since the terminal equipment IV 177 is connected to the separation-insertion unit IV 138 in the node device V 305, this packet needs to be converted into the optical signal of the wavelength λ4 and input into the fixed wavelength reception unit IV 122 connected to the separation-insertion unit IV 138 in the node device V 305, so that the packet can reach the terminal equipment IV 177. The packet stored in the memory region IV of the dual port memory 405 in each buffer is read only when the transmission wavelength of the variable wavelength transmission unit is controlled to be set to the wavelength λ4. As a result, the packet II is converted into the optical signal at the wavelength λ4 and received by the fixed wavelength reception unit IV 122 through the wavelength multiplexing transmission system 190, the wavelength multiplexed transmission line 306 (see FIG. 3) and the wavelength multiplexing transmission system 191 in the adjacent node device V 305, when the transmission wavelength of the variable wavelength transmission unit II 125 is $\lambda 4$.

Further, during the operation period T1, the buffer control unit 164 controls the operations of the selectors 407 of the buffers 141–148 in order on the basis of the dual port memory reading period Td and the FIFO reading period Tf. During the dual port memory reading period Td in the operation period T1, the ROM counter 702 of the wavelength control unit 165 simultaneously outputs the reading address value 5 to the wavelength control tables I to VIII. The contents of the respective wavelength control tables are output by this address value. From the wavelength control table I 703, the control signal corresponding to the wavelength $\lambda 6$ is output to the variable wavelength transmission unit I 129, and the transmission wavelength of the variable wavelength transmission unit I 129 is set to the wavelength $\lambda 6$. Likewise, the transmission wavelength of the variable wavelength transmission unit II 125 is set to the wavelength $\lambda 4$ by the control signal from the wavelength control table II 704, which corresponds to the wavelength $\lambda 4$.

Further, during the dual port memory reading period Td in the operation period T1, the reading control unit 609 in the buffer control unit 164 outputs to the selector 407 the control signal of reading permission of the dual port memory 405 and reading prohibition of the FIFO 406. Based thereon, the selector 407 connects the dual port memory 405 to the variable wavelength transmission unit. Further, on the basis of the reading address value 5 of the ROM counter 702 in the wavelength control unit 165, each buffer control table outputs the reading address value in each dual port memory 405 to the reading address counter 403. For example, the buffer control table I 601 outputs the head address A6 of the memory region VI to the reading address counter 403, on the basis of the reading address value 5 of the ROM counter 702 in the wavelength control unit 165. Thus, the dual port memory 405 outputs the packet stored in the memory region VI to the variable wavelength transmission unit I 129.

During the FIFO reading period Tf in the operation period T1, the reading control unit 609 in the buffer control unit 164 outputs to the selector 407 the control signal of reading permission of the FIFO 406 and reading prohibition of the dual port memory 405. Based thereon, the selector 407 outputs the packet stored in the FIFO 406 to the variable wavelength transmission unit. During each operation period T, the transmission wavelength of each variable wavelength transmission unit remains unchanged irrespective of the periods Tf and Td.

Reading of the packet I from the buffer I 145 and transmission thereof during the operation period T3 will be described. The reading address value 7 is simultaneously output to the wavelength control tables I to VIII from the ROM counter 702 in the wavelength control unit 165. The contents of the wavelength control table I 703 is read by this address value 7, and the control signal of the transmission wavelength $\lambda 2$ is output to the variable wavelength transmission unit I 129. Thus, the transmission wavelength of the variable wavelength transmission unit I 129 is controlled to the wavelength $\lambda 2$.

During the reading period Td of the dual port memory in the operation period T3, the reading address counter 403 in the buffer I 145 performs loading thereinto of the offset value A2 from the buffer control table I 601, and generates the address for reading the packet written in the memory region II by performing an increment of the counter in due order to supply it to the dual port memory 405. The reading address permits the dual port memory 405 to read out and output the packet I from its output port to the variable wavelength transmission unit I 129. The packet I is converted into the optical signal of the wavelength $\lambda 2$ by the variable wavelength transmission unit I 129, and output to the wavelength multiplexing transmission system 191.

During the FIFO reading period Tf in the operation period T3, the reading control unit 609 outputs to the selector 407 in each buffer the control signal of reading permission of the FIFO 406 and reading prohibition of the dual port memory 405. Based thereon, the selector 407 outputs the packet stored in the FIFO 406 to the variable wavelength transmission unit. The packet output to each variable wavelength transmission unit is converted to the optical signal having the transmission wavelength of its variable wavelength, and output to the wavelength multiplexing transmission system 191.

The transmission of the packet converted into the optical signal of the wavelength $\lambda 2$ in the wavelength multiplexing transmission system 191 will be described.

The packet I of the optical signal at the wavelength $\lambda 2$ output from the variable wavelength transmission unit I 129 to the wavelength multiplexing transmission system 191 during the operation period T3 is transmitted through the optical fiber 113, and after that, is combined with the optical signals transmitted through other optical fibers 114, 115 and 116 at the 4×2 star coupler 151. Thereafter, the combined one is divided into the optical fibers 158 and 155. As illustrated in FIGS. 2A and 2B, the optical signal of the wavelength $\lambda 2$ divided into the optical fiber 155 is transmitted through the optical fiber 200 and the optical fiber 153 in the node device 199, and output to the optical fibers 101, 102, 103 and 104 connected to the fixed wavelength reception units I 117 to VII 120, at the 2×4 star coupler 149. Since the fixed wavelength reception units I 117 to VII 120 respectively receives only optical signals of the wavelengths $\lambda 1$, $\lambda 3$, $\lambda 5$ and $\lambda 7$, the optical signal at the wavelength $\lambda 2$ can not be received by the fixed wavelength reception units I 117 to VII 120. Therefore, the optical signal of the wavelength $\lambda 2$ output from the first-directional variable wavelength transmission unit in the node device 100 (the node device I 301 in FIG. 3) to the node device 199 (the node device II 302 in FIG. 3) is not received in the node device 199. The optical signal of the wavelength $\lambda 2$ divided into the optical fiber 158 is divided into four portions at the 2×4 star coupler 152 in the node device 100, and the optical signal of the wavelength $\lambda 2$ is only received by the fixed wavelength reception unit II 121 of the respective fixed wavelength reception units connected to the optical fibers 105, 106, 107 and 108. As a result, the optical signal of the wavelength $\lambda 2$ output from the respective variable wavelength transmission unit connected to the wavelength multiplexing transmission system 191 in the node device 100 (the node device I 301 in FIG. 3) is reversed or returned in the wavelength multiplexing transmission system 191 and received by the fixed wavelength reception unit II 121 in this node device concerned 100.

During the operation period T3, the packet I received by the fixed wavelength reception unit II 121 in the node device 100 is separated from the packet supplied to the buffer II 141, by the separation-insertion unit II 137, and output to the addressed destination of the terminal equipment II 175.

Reading and transmission of the packet II stored in the memory region IV 504 in the buffer II 141 during the operation period T9 will be described. The reading address value 5 is simultaneously output to the wavelength control tables I to VIII from the ROM counter 702 in the wavelength control unit 165. The contents of the wavelength control table II 704 is read by this address value 5, and the control signal of the transmission wavelength λ4 is output to the variable wavelength transmission unit II 125. Thus, the transmission wavelength of the variable wavelength transmission unit II 125 is controlled to the wavelength λ4.

During the reading period Td of the dual port memory in the operation period T9, the reading address counter 403 in the buffer II 141 performs loading thereinto of the offset value A4 from the buffer control table II 602, and generates the address for reading the packet written in the memory region IV by performing an increment of the counter in due order to supply it to the dual port memory 405. The reading address permits the dual port memory 405 to read out and output the packet II from its output port to the variable wavelength transmission unit II 125. The packet II is converted into the optical signal of the wavelength λ4 by the variable wavelength transmission unit II 125, and output to the wavelength multiplexing transmission system 190.

The transmission of the packet II converted into the optical signal of the wavelength λ4 in the wavelength multiplexing transmission system 190 will be described. The connection configuration between the node device 100 illustrated in FIGS. 1A and 1B (the node device I 301) and the node device V 305 is the same as that between the node device II 302 and the node device I 301.

The packet II of the optical signal at the wavelength λ4 output from the variable wavelength transmission unit II 125 in the node device 100 during the operation period T9 is transmitted through the optical fiber 109 in the wavelength multiplexing transmission system 190, and after that, is combined with the optical signals transmitted through other optical fibers 110, 111 and 112 at the 4×2 star coupler 150. Thereafter, the combined one is divided into the optical fibers 157 and 154. The optical signal of the wavelength λ4 divided into the optical fiber 157 is divided into four portions at the 2×4 star coupler 149, and the divided four portions are respectively output to the fixed wavelength reception units I 117 to VII 120 connected to the optical fibers 101, 102, 103 and 104. Since the fixed wavelength reception units I 117 to VII 120 respectively receives only optical signals of the wavelengths λ1, λ3, λ5 and λ7, the optical signal at the wavelength λ4 can not be received by the fixed wavelength reception units I 117 to VII 120. Therefore, the optical signal of the wavelength λ4 output from the second-directional variable wavelength transmission unit in the node device 100 (the node device I 301 in FIG. 3) is not received in the node device 100. The optical signal of the wavelength λ4 divided into the optical fiber 154 is transmitted through the wavelength multiplexed transmission line 306 and the optical fiber 156 in the node device V 305, and output to the fixed wavelength reception units II 121 to VIII 124 respectively connected to the optical fibers 105, 106, 107 and 108 at the 2×4 star coupler 152. Since the optical signal of the wavelength λ4 is only received by the fixed wavelength reception unit IV 122 of the respective fixed wavelength reception units II 121 to VIII 124. As a result, the optical signal of the wavelength λ4 output from the second-directional variable wavelength transmission unit in the node device 100 (the node device I 301 in FIG. 3) is transmitted through the wavelength multiplexed transmission line 306, and received by the fixed wavelength reception unit IV 122 in the adjacent node device V 305.

The packet II received by the fixed wavelength reception unit IV 122 in the node device V 305 during the operation period T9 is separated from the packet supplied to the buffer IV 142 by the separation-insertion unit IV 138, and output to the addressed destination of the terminal equipment IV 177.

As described above, where the packet is to be transmitted from any one of the terminal equipments I 174, III 176, V 178 and VII 180 connected to a certain node device to any one of the terminal equipments II 175, IV 177, VI 179 and VIII 181 connected to this node device, the packet output from the terminal equipment only needs to be converted by the variable wavelength transmission unit into the optical signal of a wavelength corresponding to the addressed terminal equipment out of the wavelengths λ2, λ4, λ6 and λ8 and be output to the wavelength multiplexing transmission system 191.

Further, where the packet is to be transmitted from any one of the terminal equipments II 175, IV 177, VI 179 and VIII 181 connected to a certain node device to any one of the terminal equipments I 174, III 176, V 178 and VII 180 connected to this node device, the packet output from the terminal equipment only needs to be converted by the variable wavelength transmission unit into the optical signal of a wavelength corresponding to the addressed terminal equipment out of the wavelengths λ1, λ3, λ5 and λ7 and be output to the wavelength multiplexing transmission system 190.

Further, where the packet is to be transmitted from any one of the terminal equipments I 174, III 176, V 178 and VII 180 connected to a certain node device to one of the terminal equipments I 174, III 176, V 178 and VII 180, other than this terminal equipment concerned, connected to this node device, the packet output from the terminal equipment only needs to be once converted by the variable wavelength transmission unit into the optical signal of a wavelength of the wavelengths λ2, λ4, λ6 and λ8 to be output to the wavelength multiplexing transmission system 191, and be again converted, by any one of the variable wavelength transmission units II, IV, IV and VIII, into the optical signal of a wavelength corresponding to the addressed terminal equipment out of the wavelengths λ1, λ3, λ5 and λ7 to be output to the wavelength multiplexing transmission system 190.

As described above, in the structure of this embodiment, each fixed wavelength reception unit receives signals from the variable wavelength transmission units (the channel alteration units) of other node devices and from the variable wavelength transmission units (the channel alteration units) of this node device concerned. If plural signals simultaneously enter the same fixed wavelength reception unit, collision occurs. Therefore, the adjacent node devices need to be controlled such that no transmitting channels collide with each other.

Specifically, as is known from FIGS. 2A and 2B, the optical signal output from each first-directional variable wavelength transmission unit in the node device 100 reaches the second-directional fixed wavelength reception units in this node device 100 and the first-directional fixed wavelength reception units in the adjacent node device 199, and the optical signal output from each second-directional variable wavelength transmission unit in the node device 199 reaches the first-directional fixed wavelength reception units in this node device 199 and the second-directional fixed wavelength reception units in the adjacent node device 100. Therefore, the wavelength control units 165 in the node devices 100 and 199 perform controls such that all of the first-directional variable wavelength transmission units in the node device 100 and the second-directional variable wavelength transmission units in the node device 199 output optical signals of different wavelengths at the same time.

As a simple structure therefor, such a structure can be adopted, in which common wavelength control tables (connection control tables) are used with the same timing in corresponding wavelength variable transmission units (channel alteration units) in the adjacent node devices.

Specifically, the control is performed in the following manner. In each node device, common wavelength control tables are used, and one variable wavelength transmission unit (for example, the variable wavelength transmission unit I) supplies the discrimination signal, showing the head of the transmission wavelength control pattern, per one period of the transmission wavelength control pattern. When the control signal 1 (address value 0) for setting the transmission wavelength to the wavelength $\lambda 1$ is input into the variable wavelength transmission unit I by the transmission wavelength control pattern, the variable wavelength transmission unit I modulates the bit row (discrimination signal) for showing the head of the transmission wavelength control table to the output light of the wavelength $\lambda 1$, before modulating the transmission data to the output light of the wavelength $\lambda 1$, and notifies the adjacent node device in the first direction of the phase (information of the timing address) of the transmission wavelength control pattern on this node device concerned. The wavelength control unit of the adjacent node device receiving the signal from the above variable wavelength transmission unit analyzes this discrimination signal to obtain the phase of the transmission wavelength control pattern, pursuant to which that variable wavelength transmission unit I in the adjacent node device upstream in the second direction is controlled, therefrom, and matches to the analyzed phase the phase of the transmission wavelength control pattern pursuant to which the variable wavelength transmission unit in this node device concerned (especially, variable wavelength transmission units II, IV, VI and VIII for outputting the signal to the adjacent node device in the second direction) is controlled. Thus, in this embodiment, the common wavelength control tables are synchronously used, so that no plural signals is output to one channel at the same time. One channel in this embodiment means the wavelength to be received by one fixed wavelength reception unit. For example, when the fixed wavelength reception unit I is exemplified, its channel is $\lambda 1$ to which each of the variable wavelength transmission units II, IV, VI and VIII in this node device and the variable wavelength transmission units I, III, V and VII in the adjacent node device in the second direction outputs the signal.

Figure 15:
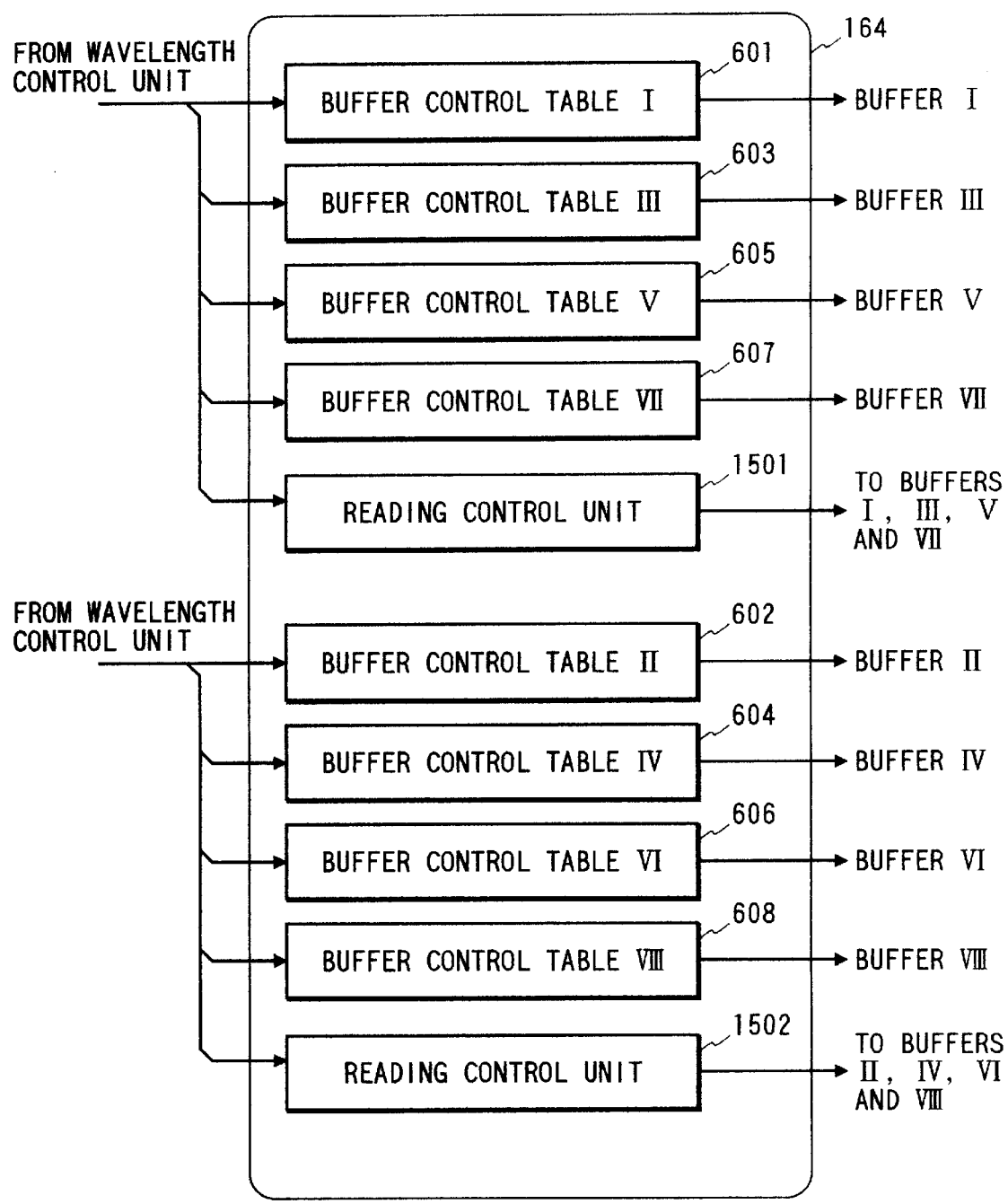
FIG. 15 is a block diagram of a buffer control unit illustrating the first embodiment according to the present invention.
Figure 16:
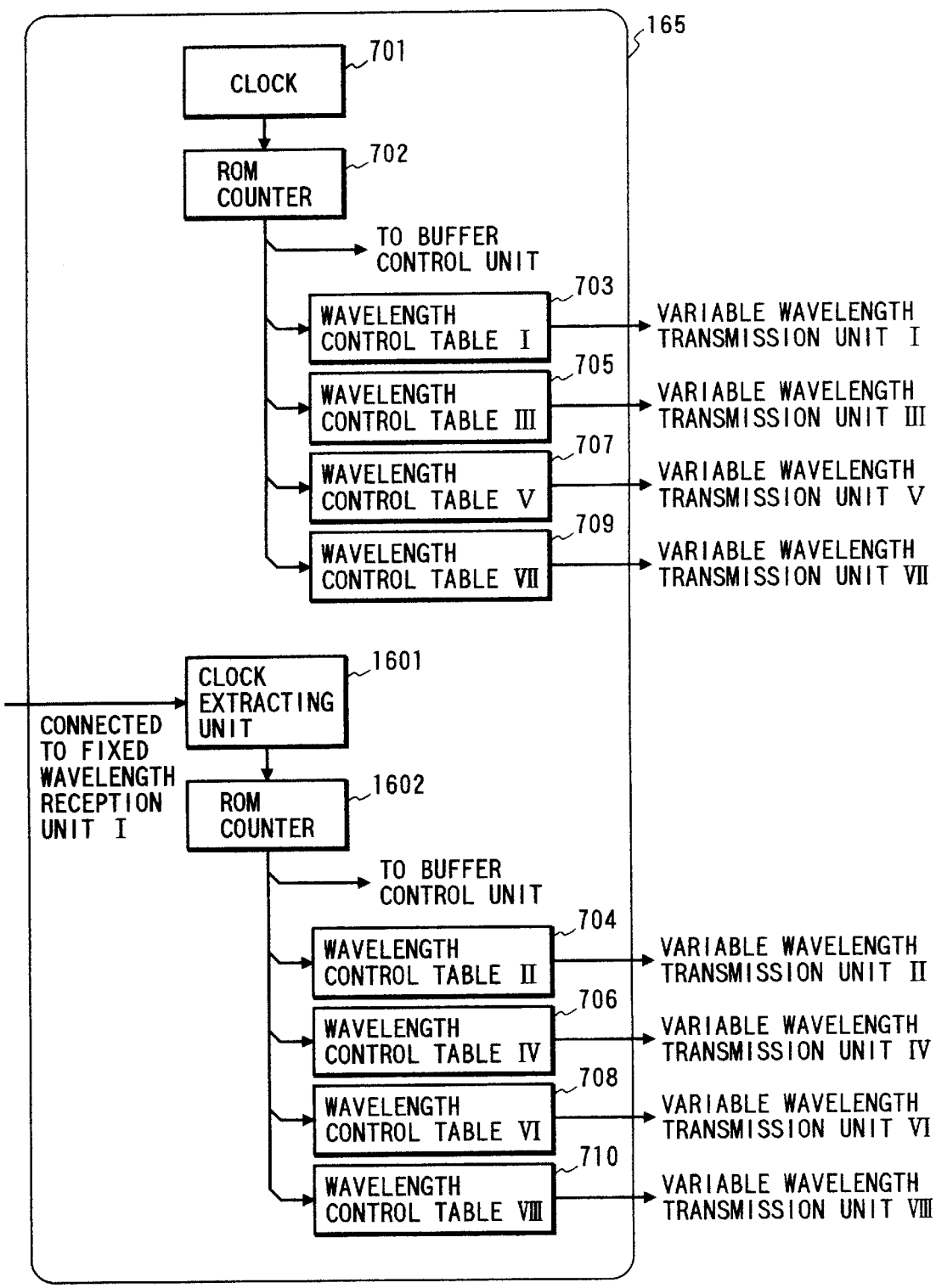
FIG. 16 is a block diagram of a wavelength control unit illustrating the first embodiment according to the present invention.

A preferable structure of the phase synchronization will be described. Here, for the phase synchronization, structures of the wavelength control unit and the buffer control unit in this embodiment are made as shown in FIGS. 15 and 16. The structure of FIG. 16 includes a clock extracting unit 1601 connected to the fixed wavelength reception unit I, which extracts the clock from the signal output from the variable wavelength transmission unit I in the adjacent node device and received by the fixed wavelength reception unit I of this node device. The clock extracting unit 1601 supplies this clock signal to the buffer control unit 164 and frequency-demultiplies this clock signal to output it to the ROM counter 1602. Thus, the wavelength control tables II, IV, VI and VIII of this node device concerned and the wavelength control tables I, III, V and VII of the adjacent node device are synchronized with each other. In this embodiment, since the channel transmitted between the node devices is not transmitted through the node device as it is, the control between the node devices can be performed fully independently from the control between other node devices. Therefore, there is no need to synchronize the wavelength control tables II, IV, VI and VIII in this node device with the wavelength control tables I, III, V and VII in this node device, and reading control units 1501 and 1502 are separately provided in the buffer control unit. Further, although not shown in FIG. 1, a control line can be provided as a transmission system between the separation-insertion unit I and the wavelength control unit such that the control signal can be transmitted between the wavelength control unit and the separation-insertion unit I.

Other than the pattern described in Tables 1 and 2, innumerable patterns can be built depending on the number of channels to be used, as the pattern pursuant to which channels input from another node device are not used simultaneously with reversing or returning channels. Further, the structure for recognizing the phase of that pattern can be various, so that a desired structure can be taken depending on the system structure.

Further, it is possible to separately arrange another system for transmitting information (for example, synchronization signal) for recognizing the channel used by the adjacent node device. In short, corresponding channel alteration units in the mutually-adjacent node devices (variable wavelength transmission units I, III, V and VII in one node device (a first node device, and variable wavelength transmission units II, IV, VI and VIII, which output the packet to the first node device, of the variable wavelength transmission units in the adjacent node device to which the variable wavelength transmission units I, III, V and VII in the first node device output the packet) only need to be controlled such that when the variable wavelength transmission unit in one of the adjacent node devices can output the packet at the wavelength used for the reversing of transmission, the variable wavelength transmission unit in the other node device does not output the signal to another node device using that wavelength.

Second Embodiment

Figure 9B:
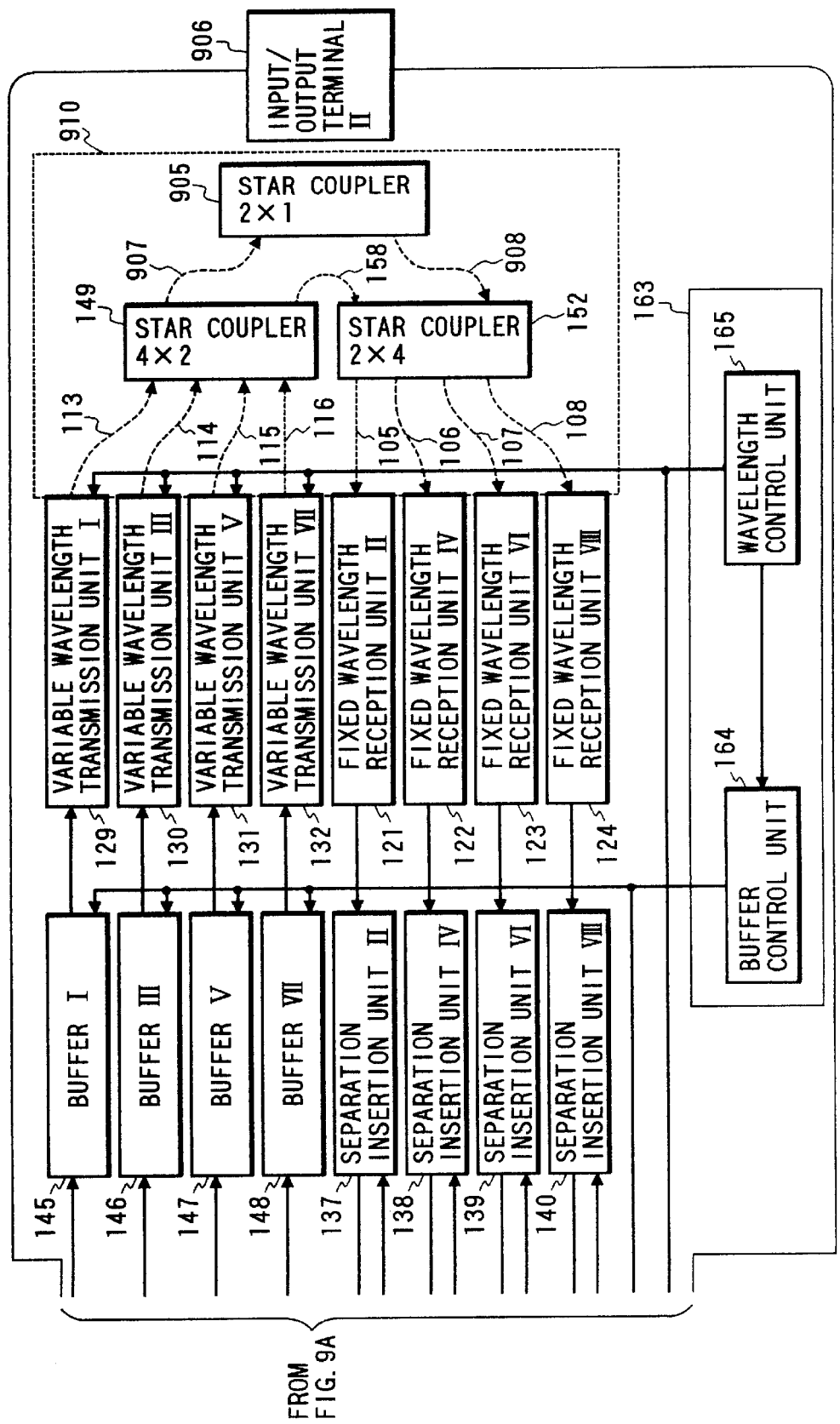
FIG. 9, which consists of FIG. 9A and FIG. 9B, is a schematic diagram of another wavelength division multiplexing transmission system illustrating the first embodiment according to the present invention.

FIGS. 9A and 9B show a second embodiment of the node device of the present invention. In FIGS. 9A and 9B, reference numeral 901 designates a 2×1 star coupler which demultiplexes the wavelength multiplexed optical signals of four wavelengths output from the 4×2 star coupler 150 to output it to the input/output terminal I 902 and divides the wavelength multiplexed optical signal input from the input/output terminal I 902 to output the divided one to the 2×4 star coupler 149.

The connection configuration between desired node devices in this embodiment has the structure in which the input/output terminal I 902 connected to a wavelength multiplexing transmission system 909 in one of those node devices is connected to the input/output terminal II 906 connected to a wavelength multiplexing transmission system 910 in the other of those node devices. In the node device of the present invention, portions other than the wavelength multiplexing transmission systems 909 and 910 are completely the same as those described in the first embodiment.

The path of the optical signal in the wavelength multiplexing transmission system 909 is as follows: For example, the optical signal of the wavelength $\lambda 1$, $\lambda 3$, $\lambda 5$ or $\lambda 7$ output from the variable wavelength transmission units II 125 to VIII 128 in the node device 100 is divided into the optical fibers 153 and 904 at the 4×2 star coupler 150. Since the connection configuration between the node devices has the structure in which the input/output terminal I 902 is connected to the input/output terminal II 906 connected to the wavelength multiplexing transmission system 910 in the other of the node devices, the optical signals of the wavelengths λ1, λ3, λ5 and λ7 branching out to the optical fiber 904 reaches the fixed wavelength reception units II 121 to VIII 124 in the adjacent node device through the 2×1 star coupler 901, the wavelength multiplexed transmission line, such as the optical fiber, and the wavelength multiplexing transmission system 910. However, the optical signals of the wavelengths λ1, λ3, λ5 and λ7 are not received by the fixed wavelength reception units II 121 to VIII 124 which respectively receive only the optical signals λ2, λ4, λ6 and λ8. The optical signals of the wavelengths λ1, λ3, λ5 and λ7 branching out to the optical fiber 153 are then divided into four portions at the 2×4 star coupler 149, and the divided ones respectively reach the fixed wavelength reception units I 117 to VII 120 through the optical fibers 101, 102, 103 and 104. Each fixed wavelength reception unit receives the optical signal of each predetermined wavelength out of the optical signals of the respective wavelengths. For example, the fixed wavelength reception unit I 117 receives the optical signal of the wavelength λ1 and the fixed wavelength reception unit III 118 receives the optical signal of the wavelength λ3.

Therefore, where the packet is to be transmitted between the terminal equipments in this node device concerned (for example, from the terminal equipment 180 to the terminal equipment 177), the packet is inserted by the separation-insertion unit 136 and stored in the predetermined memory region in the buffer 148. The packet stored in the memory region is read at the time when the wavelength of the variable wavelength transmission unit 132 is varied and reaches the wavelength of the fixed wavelength reception unit 122, and transmitted to the fixed wavelength reception unit 122 through the variable wavelength transmission unit 132, the optical fiber 116, the 4×2 star coupler 149, the optical fiber 158, the 2×4 star coupler 152 and the optical fiber 106. The optical signal is converted into an electrical signal by the fixed wavelength reception unit 122, transmitted through the separation-insertion unit 138 and received by the addressed terminal equipment 177.

Thus, the feature of the node device of this embodiment illustrated in FIGS. 9A and 9B is that the interactive optical signals can be accommodated by one optical fiber for connecting the node devices to each other.

Here, the structure of the 2×1 star coupler is the same as those of the 2×4 star coupler and the like, and may be formed by fusing and coupling three optical fibers.

Further, in the structure of FIGS. 1A and 1B, the numbers of fixed reception wavelengths, variable transmission wavelengths, memory regions in the buffer and the like can be small or large, and there is no limits thereto since the above operations can be performed in all those cases. Likewise, as to the 4×2 star coupler and the 2×4 star coupler, the number of the optical fibers is not limited. The coupling and division can be performed in accordance with the numbers of transmission and reception wavelengths.

Further, the example of the packet structure consisting of the header portion and the transmission data portion is described in the foregoing, but other structures can be applied to the present invention. For example, in ATM and LAN, the packet is generally a cell of 53 bites having a header portion of five (5) bites and a fixed-length data of 48 bites.

[Modification of Second Embodiment]

Figure 10:
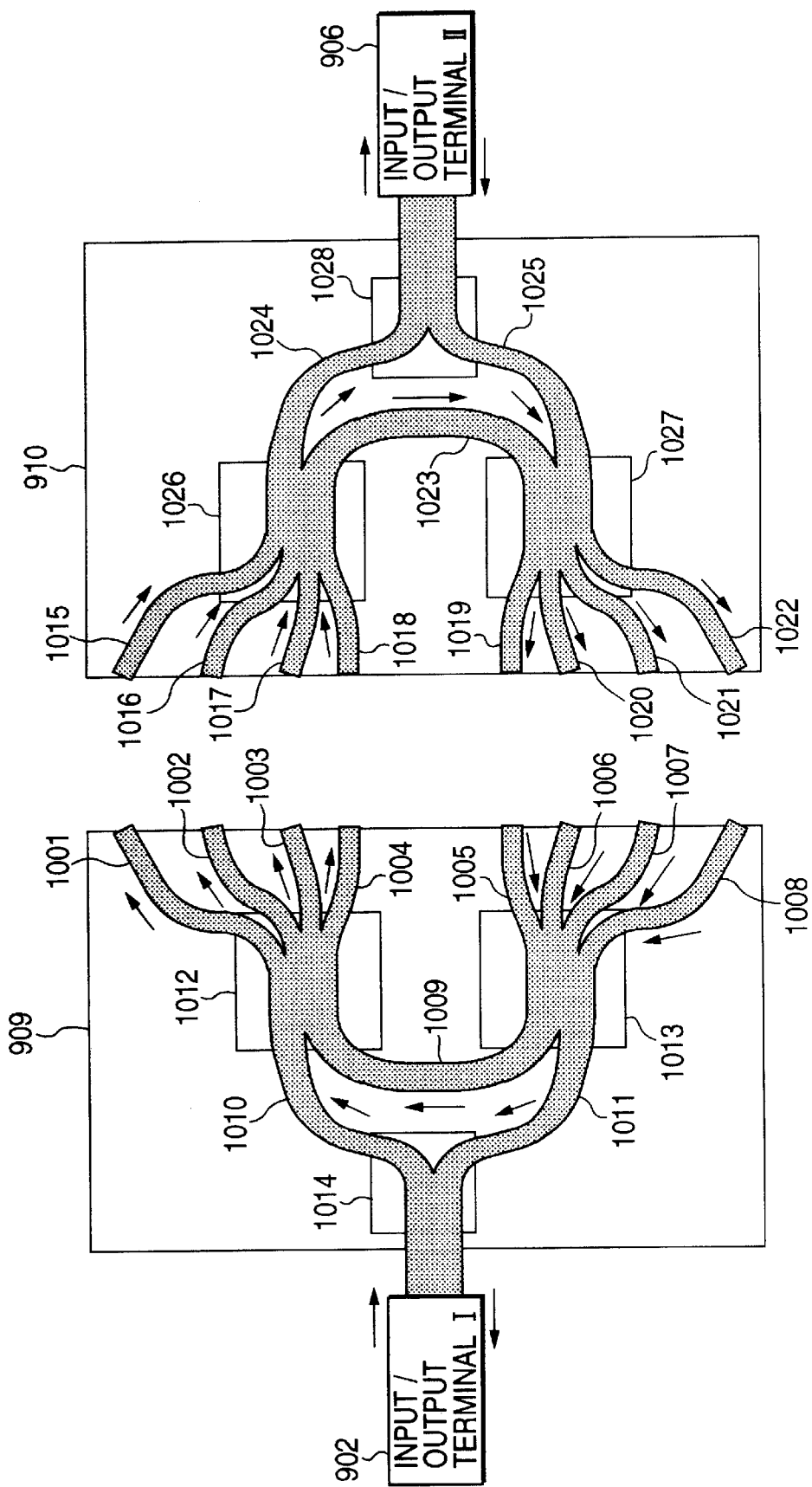
FIG. 10 is a schematic diagram of another wavelength division multiplexing transmission system illustrating the first embodiment according to the present invention.

FIG. 10 shows other structures of the wavelength multiplexing transmission systems 909 and 910 in the second embodiment. In this modification, the light transmission lines between 2×1 star coupler 901 and input/output terminal I 902, 2×1 star coupler 901 and 2×4 star coupler 149, 2×1 star coupler 901 and 4×2 star coupler 150, 2×4 star coupler 149 and each of fixed wavelength reception units I 117, III 118, V 119 and VII 120, and 4×2 star coupler 150 and each of variable wavelength transmission units II 125, IV 126, VI 127 and VIII 128 in the wavelength multiplexing transmission system 909 of FIG. 9A are replaced by semiconductor light waveguides, and the 2×1 star coupler 901, 4×2 star coupler 150 and 2×4 star coupler 149 are also formed by semiconductor devices. The light waveguide 1001 is connected to the fixed wavelength reception unit I 117, the light waveguide 1002 is connected to the fixed wavelength reception unit III 118, the light waveguide 1003 is connected to the fixed wavelength reception unit V 119, the light waveguide 1004 is connected to the fixed wavelength reception unit VII 120, the light waveguide 1005 is connected to the variable wavelength transmission unit II 125, the light waveguide 1006 is connected to the variable wavelength transmission unit IV 126, the light waveguide 1007 is connected to the variable wavelength transmission unit VI 127, and the light waveguide 1008 is connected to the variable wavelength transmission unit VIII 128. The wavelength multiplexing transmission system 910 is also constructed in the same manner as the wavelength multiplexing transmission system 909. This modification can be made sufficiently compact in size, compared to the wavelength multiplexing transmission system of the second embodiment of FIGS. 9A and 9B.

Further, at respective combining and dividing portions 1012–1014 and 1026–1028, predetermined characteristics can be obtained by fusing. Where a glass plate is used at those combining and dividing portions and light is input from the input portion onto the glass plate at a small angle from a perpendicular direction, the angle of emerging light shifts depending on its wavelength. Therefore, the output wavelength can be selected and enter of unwanted wavelength can be prevented. Thus, only desired wavelength can be output to each output of the optical fiber, and the optical filter in each fixed wavelength reception unit can be omitted or such a filter as has low filtering characteristics may be used likewise.

[Modification of Second Embodiment]

Figure 11:
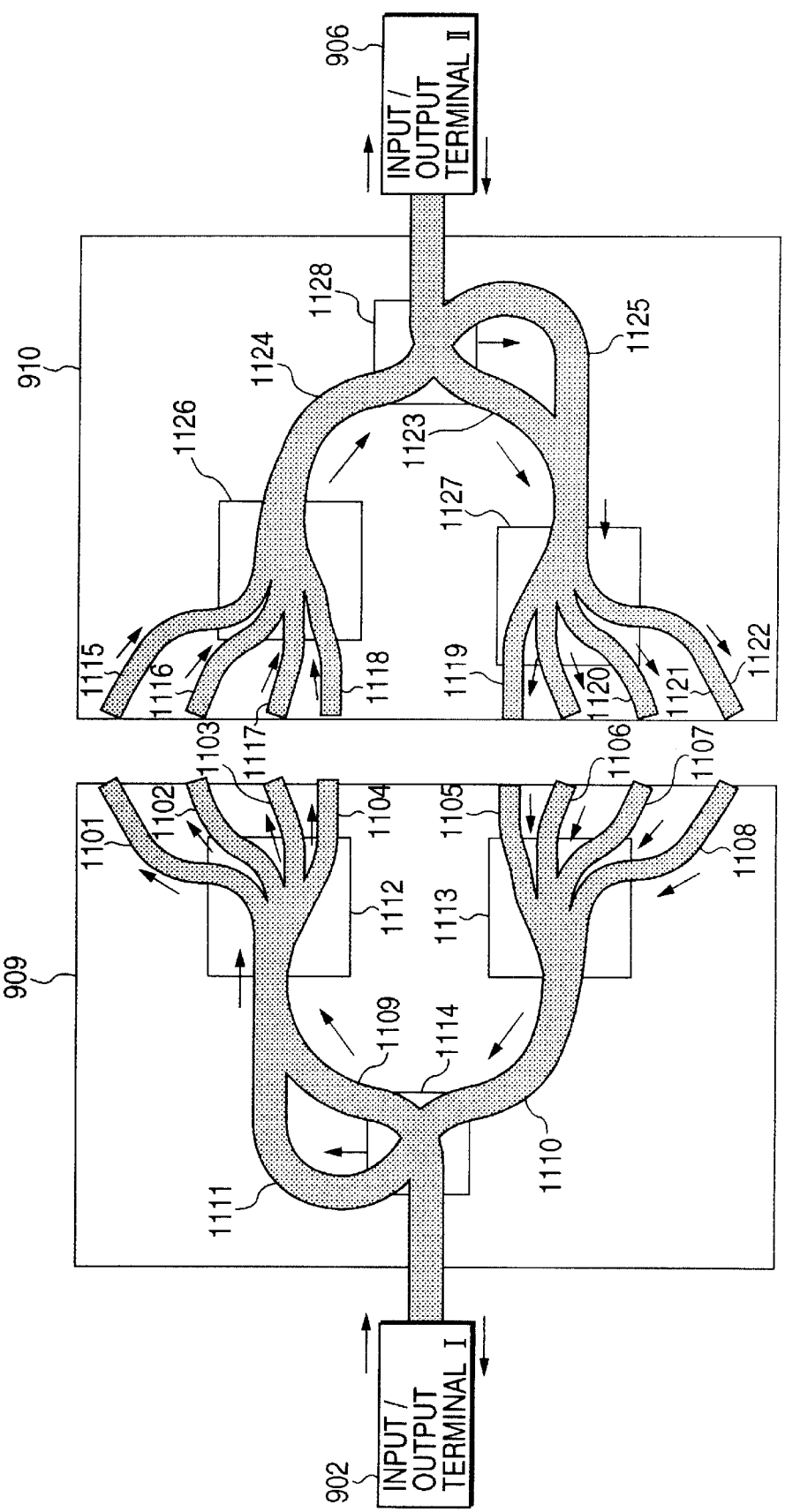
FIG. 11 is a schematic diagram of another wavelength division multiplexing transmission system illustrating the first embodiment according to the present invention.

FIG. 11 shows still other structures of the wavelength multiplexing transmission systems 909 and 910 in the second embodiment. In this modification, the wavelength multiplexing transmission system is constructed by using semiconductor light waveguides, similar to the above modification. Regarding the transmission of output light, for example, the optical signal output to the light waveguide 1105 is combined with optical signals transmitted through other light waveguides 1106, 1107 and 1108 at the combining portion 1113 on the light waveguide, and the combined one is output to the light waveguide 1110 and then divided into the light waveguide 1111 and the input/output terminal I 902 at the dividing or branching portion 1114 on the light waveguide. The optical signal transmitted through the light waveguide 1111 is divided into the light waveguides 1101, 1102, 1103 and 1104 at the dividing portion 1112. Further, the optical signal input into the input/output terminal I 902 is divided into the light waveguides 1109 and 1110 at the dividing portion 1114 on the light waveguide. The optical signal transmitted through the light waveguide 1109 is divided into the light waveguides 1101, 1102, 1103 and 1104 at the dividing portion 1112.

Third Embodiment

FIGS. 12A, 12B, 13A and 13B show a third embodiment of the node device of the present invention. In this embodiment, fixed wavelength reception units in the node device of the second embodiment are replaced by mere optical reception units in which O/E conversion is executed by the photodiode. Therefore, the wavelength multiplexing transmission systems 190 and 191 have demultiplexing functions of the wavelength multiplexed optical signals such that the optical signal of the predetermined is transmitted to each reception unit. Reference numeral 1209 designates a reception unit I for converting the optical signal into the electric signal, which differs from the fixed wavelength reception unit in that the reception unit need not have the function for receiving only the optical signal of a predetermined wavelength.

Portions of the node device 100 other than the reception units I 1209, III 1210, V 1212 and VII 1213, the reception units II 1213, IV 1214, VI 1215 and VIII 1216 and the wavelength multiplexing transmission systems 190 and 191 are fully the same as those of the node device 100 of FIGS. 1A and 1B. The control method is also the same. The wavelength multiplexing transmission systems 190 and 191 are formed by causing the wavelength multiplexing transmission systems 190 and 191 illustrated in FIGS. 1A and 1B to have the demultiplexing function of the optical signal. A wavelength demultiplexer 1202 demultiplexes the wavelength multiplexed optical signals output from the 2×1 star coupler 1201 and outputs the optical signals of the predetermined wavelengths to the reception units I 1209, III 1210, V 1211 and VII 1212. Since the fixed wavelength reception unit V 119 receives the optical signal of the wavelength λ5 in the first embodiment, the wavelength demultiplexer 1202 is set such that the optical signals of λ5 and other are respectively demultiplexed and guided to the reception units V 1211 and others. In other words, the fixed wavelength reception units I 117, III 118, V 119 and VII 120 are replaced by the reception units I 1209, III 1210, V 1211 and VII 1212, and the fixed wavelength reception units II 121, IV 122, VI 123 and VIII 124 are replaced by the reception units II 1213, IV 1214, VI 1215 and VIII 1216. Therefore, respective output ports of the wavelength demultiplexer 1202 are connected to the respective light waveguides in the following manner: The output port of the wavelength demultiplexer 1202 connected to the light waveguide 101 outputs the optical signal of λ1, the output port of the wavelength demultiplexer 1202 connected to the light waveguide 102 outputs the optical signal of λ3, the output port of the wavelength demultiplexer 1202 connected to the light waveguide 103 outputs the optical signal of λ5, and the output port of the wavelength demultiplexer 1202 connected to the light waveguide 104 outputs the optical signal of λ7. The optical signals of the respective wavelengths output from the output ports of the wavelength demultiplexer 1207 are also set in the same manner as above. In the third embodiment, the communication control identical with that described in the first embodiment can also be performed due to the above-discussed structures of wavelength multiplexing transmission systems 190 and 191 and settings of the receiving wavelengths of the respective reception units.

[Modification of Third Embodiment]

Figure 12B:
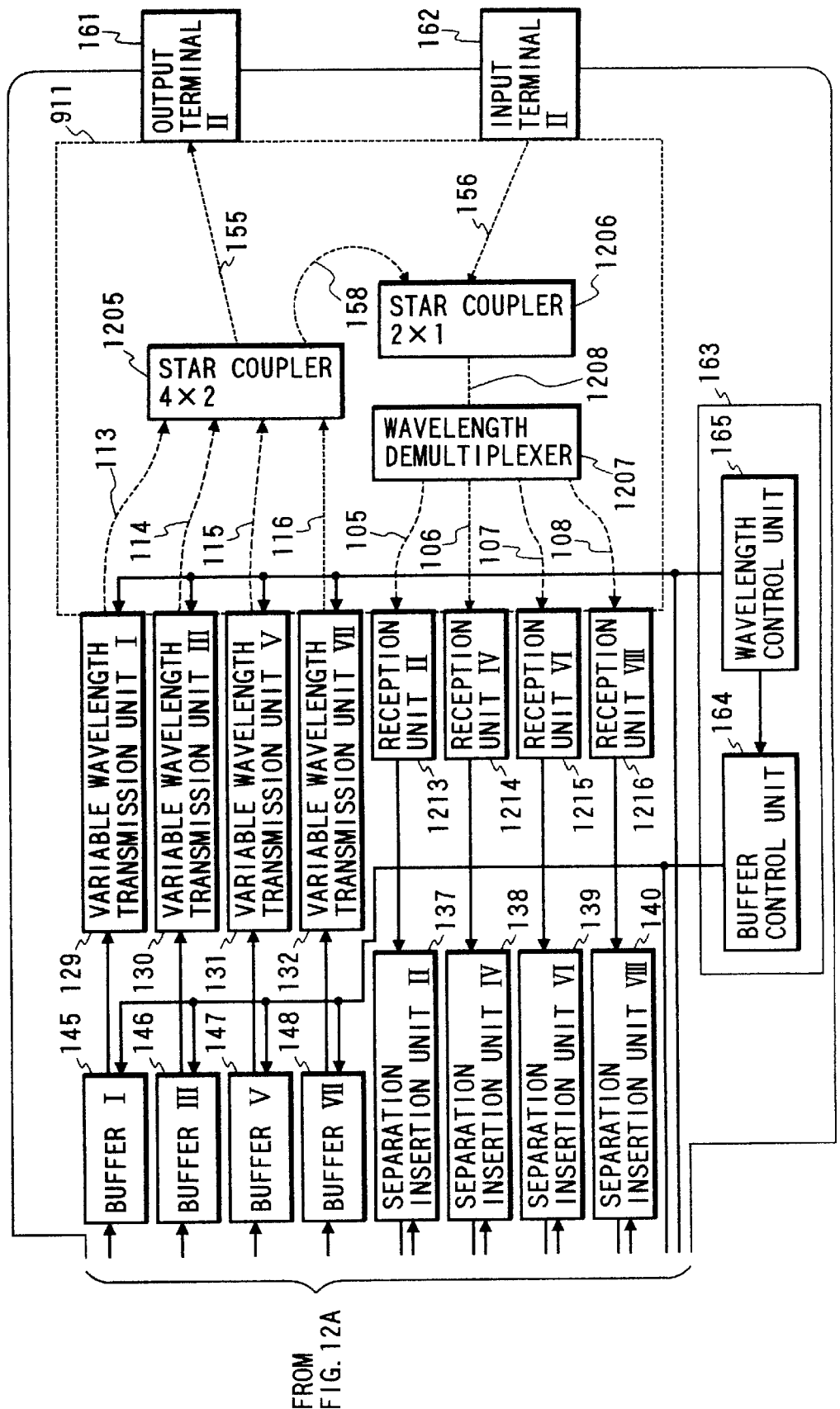
FIG. 12, which consists of FIG. 12A and FIG. 12B, is a schematic diagram of a node device illustrating a second embodiment according to the present invention.
Figure 13B:
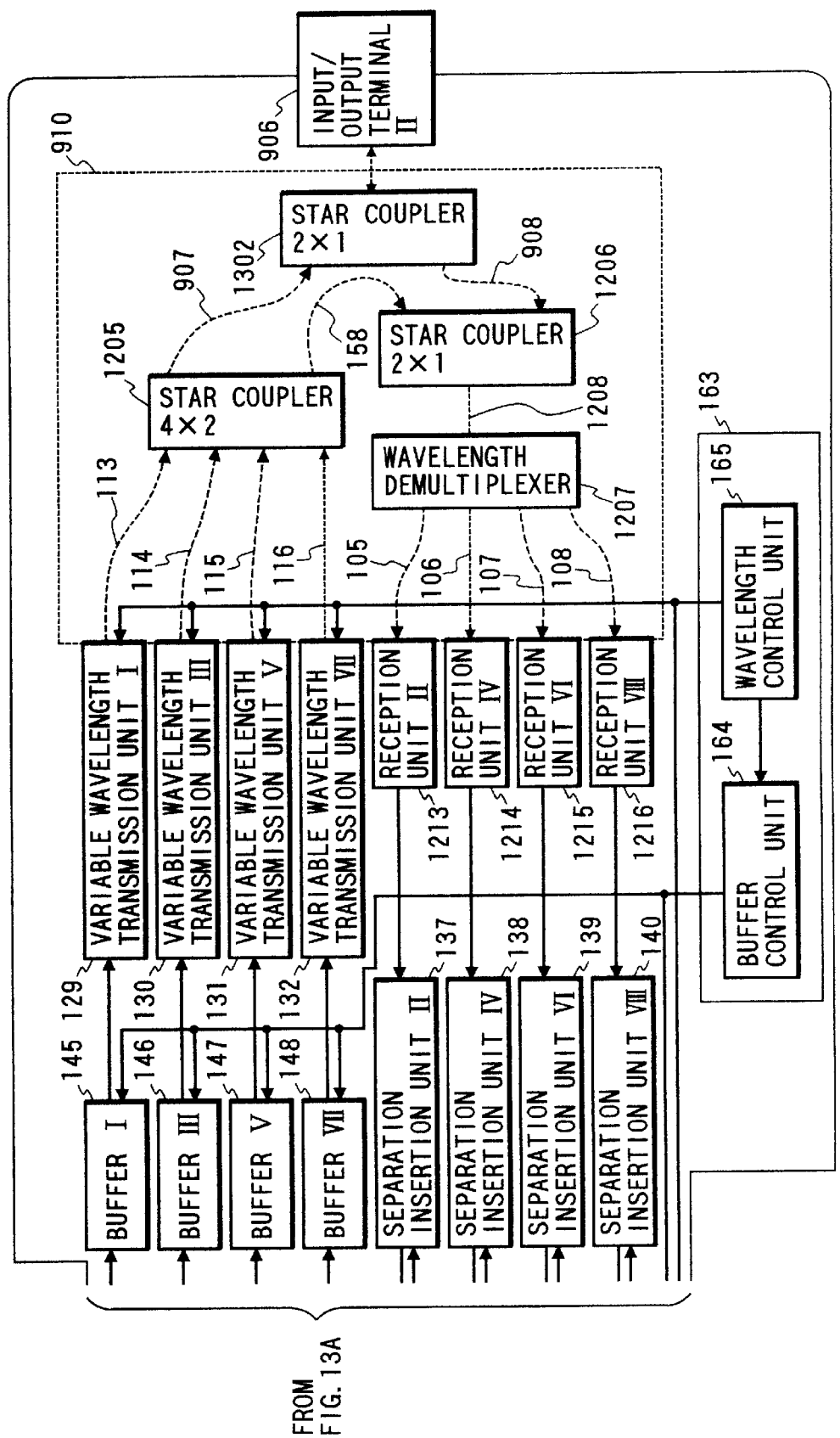
FIG. 13, which consists of FIG. 13A and FIG. 13B, is a schematic diagram of a wavelength division multiplexing transmission system illustrating the second embodiment according to the present invention.
Figure 14B:
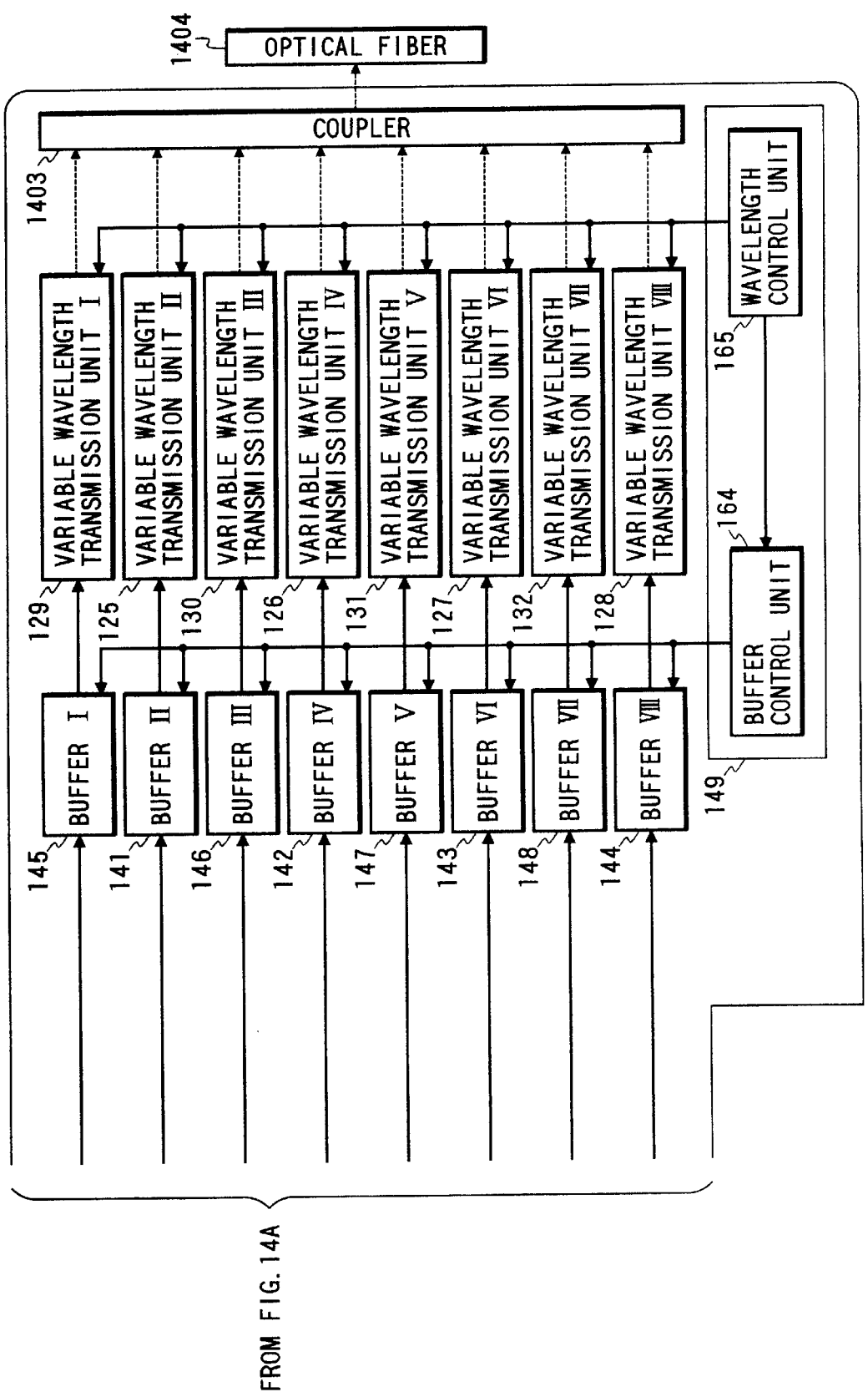
FIG. 14, which consists of FIG. 14A and FIG. 14B, is a schematic diagram of a node device illustrating a reference example.

FIGS. 13A and 13B show a modification of the wavelength multiplexing transmission system of the third embodiment illustrated in FIGS. 12A and 12B. The wavelength multiplexing transmission system of FIGS. 13A and 13B is constructed by adding demultiplexing functions of the wavelength multiplexed optical signals to the wavelength multiplexing transmission systems 909 and 910 of FIGS. 9A and 9B. Here, transmission and reception of the signal with another node device can be performed by one optical fiber, and interactive transmission and reception can also be executed.

As described above, according to the network system, node device and transmission control method, even when the transmission is performed with the node device located upstream in the transmission direction, the transmission direction can be reversed by using the reversing or returning communication means. Therefore, the packet can be transmitted to the addressed node device with a small number of relayings and transmissions.

Further, even when transmitting terminal equipment and addressed terminal equipment are connected to different separation-insertion units in the same node device, the packet need not be relayed and transmitted in all the node devices arranged in a loop form but this node device concerned. Therefore, the number of relayings and transmissions can be reduced.

Fourth Embodiment

In the network system and transmission control method of the above-discussed first embodiment, a half of the time period of the optical communication from the variable wavelength transmission unit, both the first-directional one and the second-directional one, is assigned to the time for reversing or returning the packet to this node device concerned, and the other half thereof is assigned to the time for outputting the packet to the adjacent node device. Namely, in the node device controlled by the transmission control method of the first embodiment, the processing time for outputting the packet from a node device to its adjacent node device is equal to the processing time for reversing or returning the packet. However, there is only a very little probability that there appears in an actual network the traffic characteristic that a half of packets input into the node device require the relaying and the other half require the reversing.

Therefore, a node device on the network is required to inspect if the time needed to reverse the packet is equal to the time needed to output the packet to the adjacent node device. In the following, the positional relationships between transmitting and receiving terminal equipments will be classified, the number of relayings needed in the communication between the transmitting and receiving terminal equipments, which belong to each of the classified positional relationships, will be examined, and an inspection will be made if the time needed to reverse the packet in the node device is equal to the time needed to output the packet to the adjacent node device.

Initially, the positional relationships between transmitting and receiving terminal equipments can be classified into the following three.

(1) The positional relationship in which the transmitting and addressed receiving terminal equipments are connected to the same-directional separation-insertion units, and the number of relayings performed until the packet reaches the addressed destination node device is not larger than a half of the number of relayings needed for the packet to circulate the network once, when the transmitting terminal equipment outputs the packet to this same-directional transmission line.

(2) The positional relationship in which the transmitting and addressed receiving terminal equipments are connected to the same-directional separation-insertion units, and the number of relayings performed until the packet reaches the addressed destination node device is not smaller than a half of the number of relayings needed for the packet to circulate the network once, when the transmitting terminal equipment outputs the packet to this same-directional transmission line.

(3) The positional relationship in which the transmitting and addressed receiving terminal equipments are connected to the different-directional separation-insertion units.

Next, in the above three positional relationships between the transmitting and addressed terminal equipments, the number of reversings of the packet transmitted from the transmitting terminal equipment will be considered. It is assumed that the node device connected to the transmitting terminal equipment sends the packet output from the transmitting terminal equipment to such a directional transmission line that the number of relayings needed until the packet reaches the addressed receiving terminal equipment is not larger than the number of relayings needed for the packet to once circulate the network.

In the positional relationship (1), when the packet to be transmitted is output to such a directional transmission line to which the transmitting and receiving terminal equipments are connected, the number of relayings needed for the packet to reach the destination node device is not larger than a half of the number of relayings needed for the packet to once circulate the network and the transmitting and receiving terminal equipments are connected to the same-directional transmission line, so that there is no need to reverse the packet. Thus, in the case of (1), the number of reversings is zero (0).

In the positional relationship (2), the transmitting and receiving terminal equipments are connected to the same-directional transmission line. However, when the packet to be transmitted is output to such a directional transmission line to which the transmitting terminal equipment is connected, the number of relayings needed for the packet to reach the destination node device is not smaller than a half of the number of relayings needed for the packet to once circulate the network, so that the reversing of the packet is performed once in the node device connected to the transmitting terminal equipment. Hence, the number of relayings needed for the packet to reach the destination node device can be equal to or less than a half of the number of relayings needed for the packet to once circulate the network. The packet output to such a directional transmission line that differs from the transmission line connected to the transmitting terminal equipment is again returned to such a directional transmission line connected to the receiving terminal equipment in the destination node device, and reaches the receiving addressed terminal equipment. Thus, in the case of (2), the number of reversings is two (2).

In the positional relationship (3), the number of relayings needed for the transmitted packet to reach the destination terminal equipment is analyzed with respect to both cases where the node device connected to the transmitting terminal equipment initially transmits the packet using such a directional transmission line to which the transmitting terminal equipment is connected and where the node device connected to the transmitting terminal equipment initially transmits the packet using such a directional transmission line to which the receiving terminal equipment is connected. Where the number of relayings of the packet is smaller when the packet is transmitted using such a directional transmission line connected to the transmitting terminal equipment, the packet is transmitted through this directional transmission line. The packet output to this transmission line is reversed or returned to such a directional transmission line, to which the receiving terminal equipment is connected, and output to the receiving terminal equipment in the node device connected to the receiving terminal equipment. Where the number of relayings of the packet is smaller when the packet is transmitted using such a directional transmission line connected to the receiving terminal equipment, the node device connected to the transmitting terminal equipment reverses the transmission direction of the transmitted packet and transmits the packet to such a directional transmission line connected to the receiving terminal equipment. Thus, in the case of (3), the number of reversings is one (1).

Thus, the number of reversings of the packet output from the transmitting terminal equipment is only dependent on the positional relationship but not on the number of terminal equipments on the network. However, as the number of node devices on the network increases, the number of packet relayings in the node devices needed for the packet to reach the addressed destination terminal equipment increases. Therefore, in the node device, the number of packets relayed to the adjacent node device is apparently larger than the number of packets reversed in this node device.

In this embodiment, the situation that the number of packets relayed to the adjacent node device is larger than the number of the reversed packets is considered, the processing time for relaying the packet is made longer than the processing time for reversing the packet.

Table 3 shows the transmission wavelength control pattern during one period illustrating contents of respective wavelength control tables of the present invention. Numbers in the wavelength control pattern indicate the transmission wavelengths of the variable wavelength transmission units, and numbers 1 to 8 are respectively $\lambda 1, \lambda 2, \lambda 3, \lambda 4, \lambda 5, \lambda 6, \lambda 7$ and $\lambda 8$. Table 4 shows the offset values of the buffer control tables I to VIII altered as the contents of respective wavelength control tables are changed according to the present invention. This embodiment differs from the first embodiment only in contents and address numbers of the control patterns of the wavelength control tables and buffer control tables.

TABLE 3

| Table name | Address | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Wavelength control table I | 1 | 5 | 7 | 3 | 1 | 5 | 7 | 3 | 6 | 8 | 4 | 2 |
| Wavelength control table III | 5 | 7 | 3 | 1 | 5 | 7 | 3 | 1 | 2 | 6 | 8 | 4 |
| Wavelength control table V | 7 | 3 | 1 | 5 | 7 | 3 | 1 | 5 | 4 | 2 | 6 | 8 |
| Wavelength control table VII | 3 | 1 | 5 | 7 | 3 | 1 | 5 | 7 | 8 | 4 | 2 | 6 |
| Wavelength control table II | 2 | 6 | 8 | 4 | 2 | 6 | 8 | 4 | 5 | 7 | 3 | 1 |
| Wavelength control table IV | 6 | 8 | 4 | 2 | 6 | 8 | 4 | 2 | 1 | 5 | 7 | 3 |

TABLE 3-continued

| Table name | Address | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Wavelength control table VI | 8 | 4 | 2 | 6 | 8 | 4 | 2 | 6 | 3 | 1 | 5 | 7 |
| Wavelength control table VIII | 4 | 2 | 6 | 8 | 4 | 2 | 6 | 8 | 7 | 3 | 1 | 5 |

$\lambda 1 \rightarrow 1, \lambda 2 \rightarrow 2, \lambda 3 \rightarrow 3 \ldots \lambda 8 \rightarrow 8$

TABLE 4

| Table name | Address | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Buffer control table I | A1 | A5 | A7 | A3 | A1 | A5 | A7 | A3 | A6 | A8 | A4 | A2 |
| Buffer control table III | A5 | A7 | A3 | A1 | A5 | A7 | A3 | A1 | A2 | A6 | A8 | A4 |
| Buffer control table V | A7 | A3 | A1 | A5 | A7 | A3 | A1 | A5 | A4 | A2 | A6 | A8 |
| Buffer control table VII | A3 | A1 | A5 | A7 | A3 | A1 | A5 | A7 | A8 | A4 | A2 | A6 |
| Buffer control table II | A2 | A6 | A8 | A4 | A2 | A6 | A8 | A4 | A5 | A7 | A3 | A1 |
| Buffer control table IV | A6 | A8 | A4 | A2 | A6 | A8 | A4 | A2 | A1 | A5 | A7 | A3 |
| Buffer control table VI | A8 | A4 | A2 | A6 | A8 | A4 | A2 | A6 | A3 | A1 | A5 | A7 |
| Buffer control table VIII | A4 | A2 | A6 | A8 | A4 | A2 | A6 | A8 | A7 | A3 | A1 | A5 |

The structures of node devices and the like are the same as those described above. In this embodiment, the wavelength $\lambda 1$ is the shortest, the wavelength $\lambda 8$ is the longest, and the wavelength becomes longer as the discriminative number n of the wavelength $\lambda n$ increases. The wavelength control tables and buffer control tables are synchronously read by ROM counters 702 and 1602. Further, as is known from FIGS. 2A and 2B, the optical signal output from the first-directional variable wavelength transmission unit of the node device 100 reaches the second-directional fixed wavelength reception units in this node device 100 and the first-directional fixed wavelength reception units in the adjacent node device 199, and the optical signal output from the second-directional variable wavelength transmission unit of the node device 199 also reaches the first-directional fixed wavelength reception units in this node device 199 and the second-directional fixed wavelength reception units in the adjacent node device 100. Therefore, the transmission wavelengths of respective variable wavelength transmission units in the node devices 100 and 199 are controlled by circulating the same wavelength control tables with the same phase such that no optical signals of the same wavelength are output to the wavelength multiplexing transmission systems 190 and 191. That is, eight wavelength control tables illustrated in Table 3 are commonly used by all the node devices, and the wavelength control signals, which are made synchronous with each other by the same reading address, are input into the variable wavelength transmission units. Thus, all the variable wavelength transmission units of the first-directional variable wavelength transmission units in the node device 100 and the second-directional variable wavelength transmission units in the node device 199 are controlled such that they respectively output optical signals of different wavelengths. This control method of the transmission wavelengths is completely the same as that of the first embodiment.

In Tables 3 and 4, when the transmission wavelengths of the variable wavelength transmission unit are respectively $\lambda 1, \lambda 2, \lambda 3, \lambda 4, \lambda 5, \lambda 6, \lambda 7$ and $\lambda 8$, the offset values for reading the dual port memory 405 of the buffer are respectively A1, A2, A3, A4, A5, A6, A7 and A8 corresponding to the memory regions I, II, III, IV, V, VI, VII and VIII.

The arrangement of wavelengths in the transmission wavelength control pattern of the wavelength control tables in Table 3 will be described.

In each wavelength control table of Table 3, the transmission wavelength control pattern during one period is illustrated. Each wavelength control table is composed of a portion of the addresses 0 to 7 and a portion of the addresses 8 to 11 as illustrated in Table 3. The portion of the addresses 0 to 7 is a portion assigned to relay the packet from this node device concerned to its adjacent node device, and the portion of the addresses 8 to 11 is a portion assigned to return the output packet to this node device concerned. The variable wavelength transmission units I, III, V and VII, which are the first-directional variable wavelength transmission means controlled by the wavelength control tables I, III, V and VII, respectively output the optical signals of the wavelengths $\lambda 1, \lambda 3, \lambda 5$ and $\lambda 7$ twice during one period of the transmission wavelength control pattern, and output the optical signals of the wavelengths $\lambda 2, \lambda 4, \lambda 6$ and $\lambda 8$ once. As is also seen from FIG. 2, when the optical signals output from the variable wavelength transmission units I, III, V and VII, which are the first-directional variable wavelength transmission means in the node device 100, are optical signals of the wavelengths $\lambda 1, \lambda 3, \lambda 5$ and $\lambda 7$, the respective optical signals are transmitted through the optical transmission system 191, the optical fiber 200 and the optical transmission system 190 in the node device 199, and received by the fixed wavelength reception units in the node device 199 corresponding to the respective wavelengths. Further, when the optical signals output from the variable wavelength transmission units I, III, V and VII are optical signals of the wavelengths $\lambda 2, \lambda 4, \lambda 6$ and $\lambda 8$, the respective optical signals are combined by the 4×2 coupler 151 in the optical transmission system 191, divided by the 2×4 coupler 152 and received by the fixed wavelength reception units in the node device 100 corresponding to the respective wavelengths. Therefore, the variable wavelength transmission units I, III, V and VII respectively controlled by the wavelength control tables I, III, V and VII output the optical signals of wavelengths only receivable by the first-directional fixed wavelength reception units of the adjacent node device during two thirds of one period of the transmission wavelength control pattern, and output the optical signals of wavelengths to be returned to this node device concerned during the remaining one third thereof. As a result, a ratio between the time for relaying the packet to the adjacent node device and the time for returning the packet to this node device is 2:1. In the following, this transmission wavelength control pattern of each wavelength control table I, III, V and VII is named a first-directional transmission wavelength control pattern, and this pattern is repeated to periodically control the transmission wavelengths of the respective variable wavelength transmission units I, III, V and VII. In other words, the ratio between the time for relaying the packet to the adjacent node device and the time for returning the packet to this node device can be freely changed by changing a ratio between the time for transmitting the optical signal of the wavelength only receivable by the adjacent node device and the time for transmitting the optical signal of the wavelength to be returned to this node device concerned, in the transmission wavelength control pattern during one period of the wavelength control table.

The construction of each wavelength control table I, III, V and VII will be described. Initially, at the address 0 in Table 3, the first-directional transmission wavelengths of the wavelengths $\lambda 1, \lambda 3, \lambda 5$ and $\lambda 7$ are re-arranged to transfer in the order of the wavelengths $\lambda 1, \lambda 5, \lambda 7$ and $\lambda 3$, which is named the first transmission wavelength control pattern, and the second-directional transmission wavelengths of the wavelengths $\lambda 2, \lambda 4, \lambda 6$ and $\lambda 8$ are re-arranged to transfer in the order of the wavelengths $\lambda 2, \lambda 6, \lambda 8$ and $\lambda 4$, which is named the second transmission wavelength control pattern. The first and second transmission wavelength control patterns are set as above described because the maximum value of a change in the wavelength amount at the time each directional transmission wavelength is modulated can be reduced thereby.

Namely, one transition amount of the wavelength is made small by using such a pattern in which a plurality of wavelengths to be selected is arranged in the order from a short one to a long one, or vice versa, after the selection of the first wavelength the wavelengths in the order of odd numbers are selected in upward sequent order, after the selection of the largest wavelength in the order of odd numbers the largest wavelength in the order of even numbers is selected, the wavelengths in the order of even numbers are selected in downward sequent order and after the selection of the second wavelength the selection is returned to the first wavelength. The wavelengths to be selected in the first transmission wavelength control pattern is $\lambda 1, \lambda 3, \lambda 5$ and $\lambda 7$ in the order from a short one to a long one, and the wavelengths to be selected in the second transmission wavelength control pattern is $\lambda 2, \lambda 4, \lambda 6$ and $\lambda 8$ in the order from a short one to a long one. Those are the above-discussed patterns. This pattern may be a pattern in which a plurality of wavelengths to be selected is arranged in the order from a short one to a long one, or vice versa, after the selection of the second wavelength the wavelengths in the order of even numbers are selected in upward sequent order, after the selection of the largest wavelength in the order of even numbers the largest wavelength in the order of odd numbers is selected, the wavelengths in the order of odd numbers are selected in downward sequent order and after the selection of the first wavelength the selection is returned to the first wavelength.

Further, two sets of the first transmission wavelength control patterns are assigned to the portion of each wavelength control table I, III, V and VII of the addresses 0 to 7, and a set of the second transmission wavelength control pattern is assigned to the portion of the addresses 8 to 11. Further, phases of the wavelength control patterns of the addresses 0 to 7 of the wavelength control tables I, III, V and VII are set to be shifted from each other such that the variable wavelength transmission units I, III, V and VII controlled by the wavelength control tables I, III, V and VII do not output the optical signals of the same wavelength concurrently. The phases of the wavelength control patterns of the addresses 8 to 11 of the wavelength control tables I, III, V and VII are also set to be shifted from each other. For example, in the wavelength control pattern of the addresses 0 to 7 of the wavelength control table I, the wavelength transfers in the order of $\lambda 1, \lambda 5, \lambda 7, \lambda 3, \lambda 1, \lambda 5, \lambda 7$ and $\lambda 3$, and in the wavelength control pattern of the addresses 0 to 7 of the wavelength control table III, the wavelength transfers in the order of $\lambda 5, \lambda 7, \lambda 3, \lambda 1, \lambda 5, \lambda 7, \lambda 3$ and $\lambda 1$. The phases of those wavelength control patterns are shifted from each other by one. Further, in the wavelength control pattern of the addresses 8 to 11 of the wavelength control table I, the wavelength transfers in the order of $\lambda 6, \lambda 8, \lambda 4$ and $\lambda 2$, and in the wavelength control pattern of the addresses 8 to 11 of the wavelength control table III, the wavelength transfers in the order of $\lambda 2, \lambda 6, \lambda 8$ and $\lambda 4$. The phases of those wavelength control patterns are also shifted from each other by one. Thus, with respect to the first and second transmission wavelength control patterns in each wavelength table, the phases are shifted in each of the portions of addresses 0 to 7 and addresses 8 to 11, so that all the transmission wavelengths at each address in each wavelength control table are different from each other.

Further, optimum regulation of use of the patterns (i.e., which phase of the pattern to be selected in each pattern) in each table can be made such that the transition amount of the wavelength between the addresses 7 and 8, at which the first and second transmission wavelength control patterns are exchanged, can be reduced.

Further, the wavelength control patterns of the wavelength control tables II, IV, VI and VIII are also set such that the variable wavelength transmission units II, IV, VI and VIII respectively output the optical signals of wavelengths (the wavelengths $\lambda 2, \lambda 4, \lambda 6$ and $\lambda 8$) receivable by the adjacent node device during two thirds of one period of the transmission wavelength control pattern, and output the optical signals of wavelengths (the wavelengths $\lambda 1, \lambda 3, \lambda 5$ and $\lambda 7$) to be returned to this node device concerned during the remaining one third thereof. Moreover, phases of those wavelength control patterns are shifted such that all the transmission wavelengths of the variable wavelength transmission units II, IV, VI and VIII at each address are different from each other.

The transmission control method in this embodiment will be described.

[Example of Transmission Object]

In the description of the transmission control method, transmission destinations of eight packets to be processed in the node device I 301 (node device 100 in FIG. 2A) are assumed as follows: The packet I is a packet to be transmitted to the terminal equipment VI 179 connected to the node device I 301. The packet II is a packet to be transmitted to the terminal equipment I 174 connected to the node device II 302. The packet IV is a packet to be transmitted to the terminal equipment V 178 connected to the node device II 302. The packet VII is a packet to be transmitted to the terminal equipment III 176 connected to the node device II 302. The packet VIII is a packet to be transmitted to the terminal equipment VIII 181 connected to the node device I 301. The packets III, V and VI are respectively packets to be transmitted to the terminal equipments connected to the node devices III 303, IV 304 and V 305.

Common constitutional elements in different node devices, such as node devices I 301 and V 305, are designated by the same reference numerals.

Figure 17A:
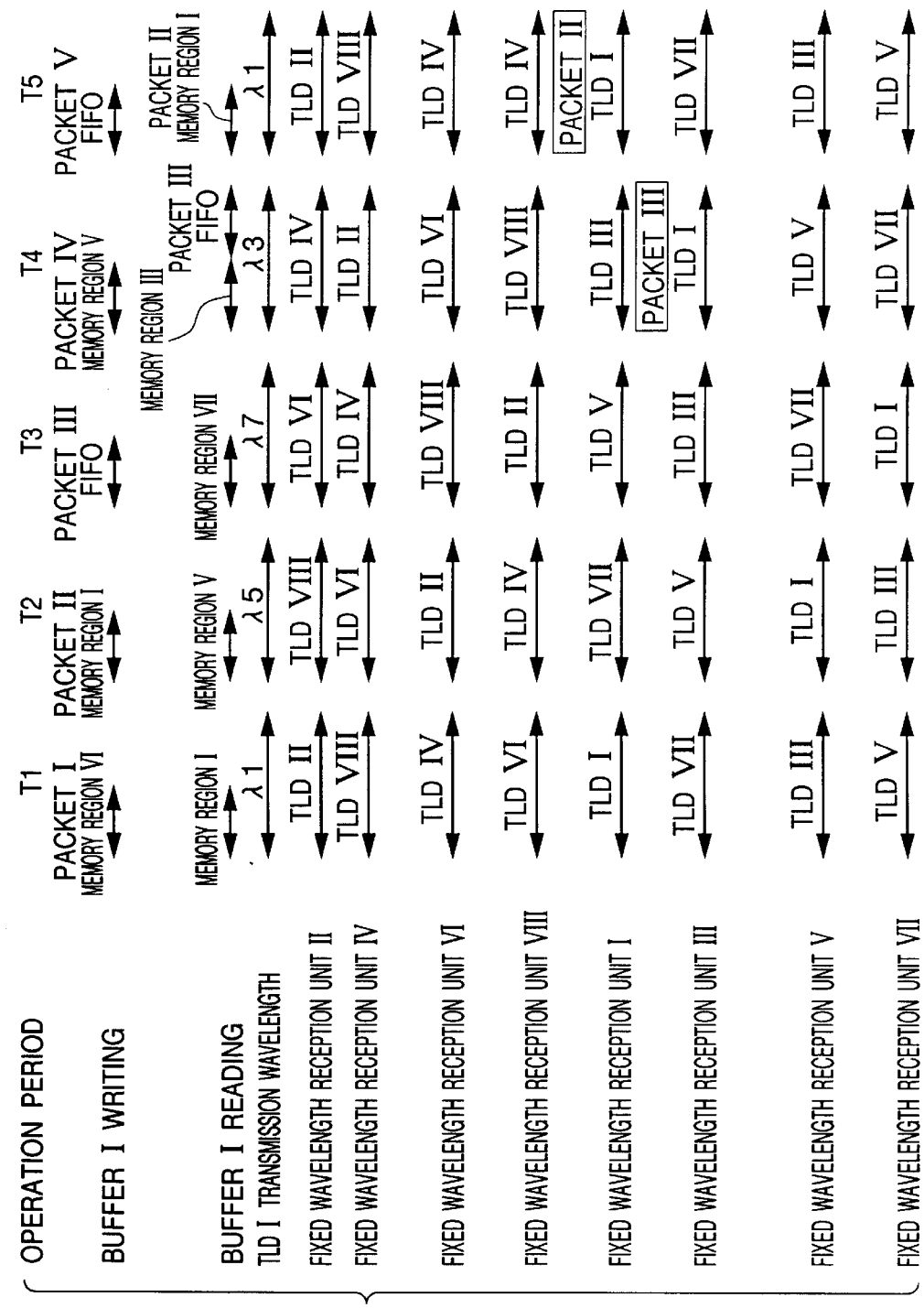

Further, the address values (synchronization signals) from the ROM counters 702 and 1602 for reading buffer control tables and wavelength control tables in the node device I 301 are synchronous with each other and assumed to be 0 in the operation period T1 illustrated in FIG. 17A, for the sake of explanation. Therefore, it is assumed that address values from the ROM counters 702 and 1602 during operation periods T2, T3, . . . , T9 and T10 are respectively 1, 2, . . . , 8 and 9.

[Communication Operation of Node Device 100]

The communication operation of the node device 100 (node device I 301 in FIG. 3) will be described referring to the time chart of FIGS. 17A and 17B hereinafter.

During the operation period T1, the separation-insertion unit I 133 of the node device 100 finds a break in the packet stream of the packet I and other packets received by the fixed wavelength reception unit I 117, inserts into this break the packet input through the sub-transmission line I 166 and outputs it to the buffer I 145. In FIGS. 17A and 17B, however, only the watched packets I to VIII are shown. During the operation period T1, the decoder 401 in the buffer I 145 reads the address portion of the input packet I. The destination for receiving the packet I is the terminal equipment VI 179 connected to this node device concerned 100, so that the decoder 401 sets such that the demultiplexer 404 outputs to the dual port memory 405 and outputs the predetermined writing start address value A6 of the packet I to the writing address counter 402. The writing address counter 402 thus starts with the writing start address value A6 of the packet I and outputs the discrimination signal of the memory region VI, in which the packet is to be written, to the dual port memory 405 in order. The predetermined writing start address value of the packet I in the dual port memory 405 is A6 because the packet I is to be transmitted to the terminal equipment VI 179 connected to this node device 100. Since the terminal equipment VI 179 is connected to the separation-insertion unit VI 139 in this node device 100, this packet needs to be converted into the optical signal of the wavelength λ6 and input into the fixed wavelength reception unit VI 123 connected to the separation-insertion unit VI 139 in this node device 100, so that the packet can reach the terminal equipment VI 179. The packet stored in the memory region VI of the dual port memory 405 in each buffer is read only when the transmission wavelength of the variable wavelength transmission unit connected to each buffer is controlled to be set to the wavelength λ6. As a result, the packet I is converted into the optical signal at the wavelength λ6 and received by the fixed wavelength reception unit VI 123 through the reversing or returning means in the wavelength multiplexing transmission system 191, when the transmission wavelength of the variable wavelength transmission unit I 129 is set to the wavelength λ6. The transmission of the optical signal of packet I in the wavelength multiplexing transmission system 191 will be described later.

Further, during the dual port memory reading period Td in the operation period T1, the ROM counters 702 and 1602 of the wavelength control unit 165 simultaneously output the reading address value 0 to the wavelength control tables I to VIII. The contents of the respective wavelength control tables are output by this address value. From the wavelength control table I, the control signal corresponding to the wavelength λ1 is output to the variable wavelength transmission unit I 129, and the transmission wavelength of the variable wavelength transmission unit I 129 is set to the wavelength λ1. Likewise, the transmission wavelength of the variable wavelength transmission unit II 125 is set to the wavelength λ2 by the control signal from the wavelength control table II, which corresponds to the wavelength λ2.

Further, during the dual port memory reading period Td in the operation period T1, the reading control units 1501 and 1502 in the buffer control unit 164 output to the selector 407 the control signal of reading permission of the dual port memory and reading prohibition of the FIFO. Based thereon, the selector 407 connects the dual port memory 405 to the variable wavelength transmission unit. Further, on the basis of the reading address value 0 of the ROM counters 702 and 1602 in the wavelength control unit 165, each buffer control table outputs the reading address value in each dual port memory to the reading address counter 403. For example, the buffer control table I outputs the head address A1 of the memory region IV to the reading address counter 403, on the basis of the reading address value 0 of the ROM counter 702 in the wavelength control unit 165. Thus, the dual port memory 405 outputs the packet stored in the memory region I to the variable wavelength transmission unit I 129.

During the FIFO reading period Tf in the operation period T1, the reading control units 1501 and 1502 in the buffer control unit 164 output to the selector 407 the control signal of reading permission of the FIFO and reading prohibition of the dual port memory. Based thereon, the selector 407 outputs the packet stored in the FIFO 406 to the variable wavelength transmission unit. In this embodiment, during each operation period T, the transmission wavelength of each variable wavelength transmission unit remains unchanged irrespective of the periods Tf and Td.

Similarly, during the operation period T2, the separation-insertion unit I 133 of the node device 100 finds a break in the packet stream of the packet II and other packets received by the fixed wavelength reception unit I 117, inserts into this break the packet II input through the sub-transmission line I 166 and outputs it to the buffer I 145. During the operation period T2, the decoder 401 in the buffer I 145 reads the address portion of the input packet II. The destination for receiving the packet II is the terminal equipment I 174 connected to the adjacent node device 199 (node device II 302 in FIG. 3), so that the packet II is stored in the memory region I of the dual port memory 405.

Then, during the operation period T3, the separation-insertion unit I 133 of the node device 100 finds a break in the packet stream of the packet III and other packets received by the fixed wavelength reception unit I 117, inserts into this break the packet input through the sub-transmission line I 166 and outputs it to the buffer I 145. During the operation period T3, the decoder 401 in the buffer I 145 reads the address portion of the input packet III. The destination for receiving the packet III is the terminal equipment connected to the node device III 303 and the packet III is to pass the channel alteration unit twice or more than twice more, so that the output wavelength of the packet III need not be designated. Therefore, the decoder 401 connects the output of the demultiplexer 404 to the FIFO 406. Thus, the packet III is stored in the FIFO 406. The reason therefor is that the packet III is not the packet transmitted to the terminal equipment connected to the adjacent node device 199 and not the packet to be returned or reversed and hence this packet need not be output to a predetermined fixed wavelength reception unit in this node device 100 or the adjacent node device 199.

Further, the packet IV is stored in the memory region V of the dual port memory 405 during the operation period T4, the packet V is stored in the FIFO 406 during the operation period T5, the packet VI is stored in the FIFO 406 during the operation period T6, the packet VII is stored in the memory region III of the dual port memory 405 during the operation period T7, and the packet VIII is stored in the memory region VIII of the dual port memory 405 during the operation period T8.

Reading and transmission of the packet III from the buffer I 145 during the operation period T4 will be described. In the beginning of the operation period T4, the reading address value 3 is simultaneously output to the wavelength control tables I to VIII from the ROM counters 702 and 1602 in the wavelength control unit 165. The contents of the wavelength control table I is read by this address value, and the control signal 1 of the transmission wavelength λ3 is output to the variable wavelength transmission unit I 129. Thus, the transmission wavelength of the variable wavelength transmission unit I 129 is controlled to the wavelength λ3. During the FIFO reading period Tf after the dual port memory reading period Td in the operation period T4, the control signal of reading permission of the FIFO and reading prohibition of the dual port memory is output from the reading control units 1501 and 1502 to the selector 407 in each buffer, and each selector 407 outputs the packet stored in the FIFO 406 to the variable wavelength transmission unit connected thereto. During the operation period T4, the packet III stored in the FIFO 406 is converted into the optical signal of the wavelength λ3 by the variable wavelength transmission unit I 129 and output to the wavelength multiplexing transmission system 191. As described in the first embodiment, the optical signal of the wavelength λ3 output from the variable wavelength transmission unit I 129 is received by the fixed wavelength reception unit III 118 in the adjacent node device 199 (node device II 302 in FIG. 3).

Next, reading and transmission of the packet II stored in the memory region I of the dual port memory 405 during the operation period T5 will be described. In the beginning of the operation period T5, the reading address value 4 is simultaneously output to the wavelength control tables I to VIII from the ROM counters 702 and 1602 in the wavelength control unit 165. The contents of the wavelength control table I is read by this address value, and the control signal of the transmission wavelength λ1 is output to the variable wavelength transmission unit I 129. Thus, the transmission wavelength of the variable wavelength transmission unit I 129 is controlled to the wavelength λ1.

Further, during the reading period Td of the dual port memory in the operation period T5, the reading address counter 403 in the buffer I 145 performs loading thereinto of the offset value A1 from the buffer control table I, and generates the address for reading the packet written in the memory region I by performing an increment of the counter in due order to supply it to the dual port memory 405. The reading address permits the dual port memory 405 to read out and output the packet II stored in the memory region I from its output port to the variable wavelength transmission unit I 129. The packet II is converted into the optical signal of the wavelength λ1 by the variable wavelength transmission unit I 129, and output to the wavelength multiplexing transmission system 191.

The packet III of the optical signal at the wavelength λ1 output from the variable wavelength transmission unit I 129 to the wavelength multiplexing transmission system 191 is transmitted through the optical fiber 113, and after that, is combined with the optical signals transmitted through other optical fibers 114, 115 and 116 at the 4×2 star coupler 151. Thereafter, the combined one is divided into the optical fibers 158 and 155. The optical signal of the wavelength λ1 divided into the optical fiber 155 is transmitted through the optical fiber 200 and the optical fiber 153 in the node device 199 and divided into four portions in the optical fibers 101, 102, 103 and 104 at the 2×4 star coupler 149, and the four divided portions are respectively output to the fixed wavelength reception units I 117 to VII 120 connected to the respective optical fibers. Since the fixed wavelength reception unit I 117 receives only the optical signal of the wavelength λ1, the packet II is received by the fixed wavelength reception unit I 117 in the adjacent node device 199, separated from the packet supplied to the buffer I 145 by the separation-insertion unit I 133 and output to the addressed destination terminal equipment I 174.

Next, reading and transmission of the packets IV and V from the buffer I 145 during the operation period T6 will be described. In the beginning of the operation period T6, the reading address value 5 is simultaneously output to the wavelength control tables I to VIII from the ROM counters 702 and 1602 in the wavelength control unit 165. The contents of the wavelength control table I is read by this address value, and the control signal 5 of the transmission wavelength is output to the variable wavelength transmission unit I 129. Thus, the transmission wavelength of the variable wavelength transmission unit I 129 is controlled to the wavelength λ5. In synchronization therewith, during the reading period Td of the dual port memory in the operation period T6, the reading address counter 403 in the buffer I 145 performs loading thereinto of the offset value A5 from the buffer control table I, and generates the address for reading the packet written in the memory region V by performing an increment of the counter in due order to supply it to the dual port memory 405. The reading address permits the dual port memory 405 to read out and output the packet IV stored in the memory region V from its output port to the variable wavelength transmission unit I 129. The packet IV is converted into the optical signal of the wavelength λ5 by the variable wavelength transmission unit I 129, and output to the wavelength multiplexing transmission system 191.

The packet IV of the optical signal at the wavelength λ5 output from the variable wavelength transmission unit I 129 to the wavelength multiplexing transmission system 191 is transmitted through the optical fiber 113, the 4×2 coupler 151, the optical fiber 155, the optical fiber 200, the optical fiber 153 in the node device 199, the 2×4 coupler 149 and the optical fiber 103, and received by the fixed wavelength reception unit V 119. The packet IV received by the fixed wavelength reception unit V 119 in the adjacent node device 199 is separated from the packet supplied to the buffer V 147 by the separation-insertion unit V 135 and output to the addressed destination terminal equipment V 178.

During the FIFO reading period Tf after the dual port memory reading period Td in the operation period T6, the control signal of reading permission of the FIFO and reading prohibition of the dual port memory is output from the reading control units 1501 and 1502 to the selector 407 in each buffer, and each selector 407 outputs the packet V stored in the FIFO 406 to the variable wavelength transmission unit I connected thereto. The packet V is converted into the optical signal of the wavelength λ5 by the variable wavelength transmission unit I 129 and output to the wavelength multiplexing transmission system 191. The packet V converted into the optical signal of the wavelength λ5 is received by the fixed wavelength reception unit V 119 in the adjacent node device 199 (node device II 302 in FIG. 3). The packet V received by the fixed wavelength reception unit V 119 is output to the buffer V 147 from the separation-insertion unit V 135.

Then, the packet VI is received by the fixed wavelength reception unit VII 120 in the adjacent node device during the operation period T7, the packet VII is received by the fixed wavelength reception unit III 118 in the adjacent node device, separated from the packet supplied to the buffer III 146 by the separation-insertion III 134 and output to the addressed terminal equipment III 176 during the operation period T8, the packet I is received by the fixed wavelength reception unit VI 123 in this node device 100, separated from the packet supplied to the buffer VI 143 by the separation-insertion VI 139 and output to the addressed terminal equipment VI 179 during the operation period T9, and the packet VIII is received by the fixed wavelength reception unit VIII 124 in this node device 100, separated from the packet supplied to the buffer VIII 144 by the separation-insertion VIII 140 and output to the addressed terminal equipment VIII 181 during the operation period T10.

The transmission control method of this embodiment to be used in the network system, which includes the interactive loop lines and has the function of reversal from one of the interactive loop lines to the other line, is invented to extend the packet transmission time in the node device to its adjacent node device and shorten the time for returning the packet to this node device.

Fifth Embodiment

Figure 18B:
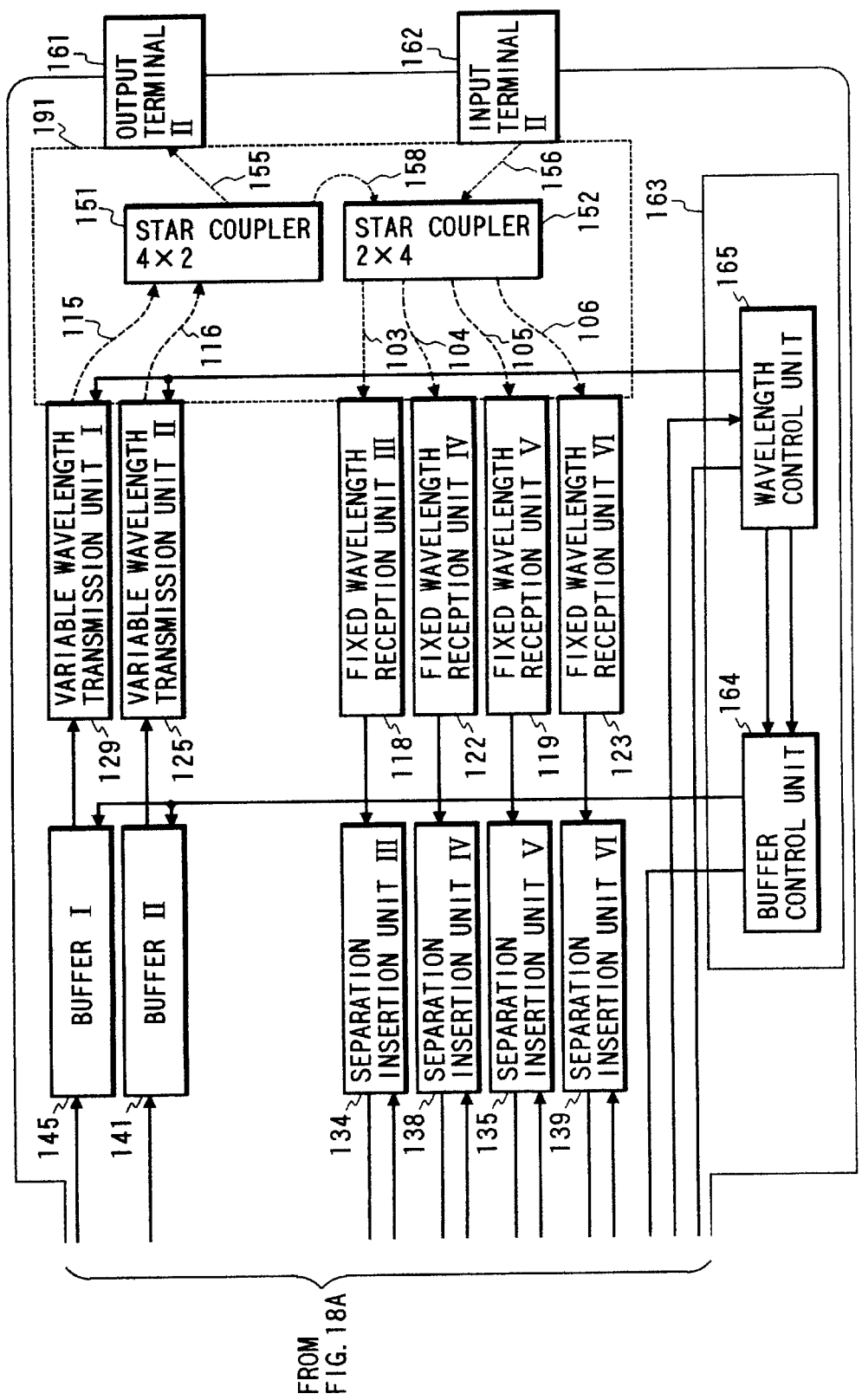
FIG. 18, which consists of FIG. 18A and FIG. 18B, is a schematic diagram of a node device illustrating a fifth embodiment according to the present invention.

In a fifth embodiment, there are wavelength control tables in the case where the number of the variable wavelength transmission units for outputting the optical signals to the first-directional transmission lines is different from the number of the variable wavelength transmission units for outputting the optical signals to the second-directional transmission lines, as is known from FIGS. 18A and 18B. The fifth embodiment is different from the fourth embodiment only in the transmission wavelength transition patterns of the wavelength control tables, and the transmission control method for controlling the respective node devices by the wavelength control tables of the present invention is fully the same as the fourth embodiment. The description of a specific packet transmission control by using the wavelength control tables of the present invention is therefore omitted herein. In the fifth embodiment, the number of variable wavelength transmission units for outputting the optical signals to the first-directional transmission lines is 2 (two), and the number of variable wavelength transmission units for outputting the optical signals to the second-directional transmission lines is 4 (four).

Table 5 shows the wavelength control tables of the fifth embodiment. Since the number of variable wavelength transmission units for outputting the optical signals to the first-directional transmission lines is not equal to the number of the variable wavelength transmission units for outputting the optical signals to the second-directional transmission lines in the node device, the wavelength number of the optical signals for relaying the packet from the first-directional variable wavelength transmission units to the adjacent node device is 2 (two) and the wavelength number of the optical signals to be used for returning the packet is 4 (four). Specifically, the wavelengths $\lambda 1$ and $\lambda 2$ are wavelengths for relaying and the wavelengths $\lambda 3$, $\lambda 4$, $\lambda 5$ and $\lambda 6$ are wavelengths for reversing or returning. Further, the wavelength number of the optical signals for relaying the packet from the second-directional variable wavelength transmission units to the adjacent node device is 4 (four) and the wavelength number of the optical signals to be used for returning the packet is 2 (two). Specifically, the wavelengths $\lambda 3$, $\lambda 4$, $\lambda 5$ and $\lambda 6$ are wavelengths for relaying and the wavelengths $\lambda 1$ and $\lambda 2$ are wavelengths for reversing or returning. That is, each of the wavelength numbers of the optical signals to be used for relaying and returning is different between the first-directional and second-directional variable wavelength transmission units. Arrangements of the wavelength control tables and the transmission wavelength control patterns shown in FIG. 5 will be described hereinafter.

In each wavelength control table of Table 5, the transmission wavelength control pattern during one period is illustrated. Each wavelength control table is composed of a portion of the addresses 0 to 7 and a portion of the addresses 8 to 11 as illustrated in Table 5. The portion of the addresses 0 to 7 is a wavelength control pattern portion assigned to relay the packet from this node device concerned to its adjacent node device, and the portion of the addresses 8 to 11 is a wavelength control pattern portion assigned to return the output packet to this node device concerned. For example, the wavelength control tables I and II are set such that the transmission wavelengths of the first-directional variable wavelength transmission units I and II are controlled to the wavelengths $\lambda 1$ and $\lambda 2$ four times during one period of the transmission wavelength control pattern and then controlled to the wavelengths $\lambda 3$, $\lambda 4$, $\lambda 5$ and $\lambda 6$ once. As is also seen from the structure of the node device of FIGS. 18A and 18B, when the optical signals output from the variable wavelength transmission units I and II, which are the first-directional variable wavelength transmission means in the node device 100, are optical signals of the wavelengths $\lambda 1$ and $\lambda 2$, the respective optical signals are transmitted through the optical transmission system 191, the optical fiber 200 and the optical transmission system 190 in the adjacent node device, and received by the fixed wavelength reception units I and II in the adjacent node device corresponding to the wavelengths $\lambda 1$ and $\lambda 2$. Further, when the optical signals output from the variable wavelength transmission units I and II are optical signals of the wavelengths $\lambda 3$, $\lambda 4$, $\lambda 5$ and $\lambda 6$, the respective optical signals are combined by the 4×2 coupler 151 in the optical transmission system 191, divided by the 2×4 coupler 152 and received by the fixed wavelength reception units III, IV, V and VI in this node device 100 corresponding to the respective wavelengths. Therefore, the variable wavelength transmission units I and II respectively controlled by the wavelength control tables I and II output the optical signals of wavelengths only receivable by the first-directional fixed wavelength reception units of the adjacent node device during the portion of the addresses 0 to 8 (two thirds of one period) of one period of the transmission wavelength control pattern, and output the optical signals of wavelengths to be returned to this node device concerned during the remaining portion of the addresses 8 to 11 (one third of one period) thereof. As a result, a ratio between the time for relaying the packet to the adjacent node device and the time for returning the packet to this node device is 2:1. This transmission wavelength control pattern of each wavelength control table I and II is named a first-directional transmission wavelength control pattern, and this pattern is repeated to periodically control the transmission wavelengths of the respective variable wavelength transmission units I and II. In other words, the ratio between the time for relaying the packet to the adjacent node device and the time for returning the packet to this node device can be freely changed by changing a ratio between the time for transmitting the optical signal of the wavelength only receivable by the adjacent node device and the time for transmitting the optical signal of the wavelength to be returned to this node device concerned, in the transmission wavelength control pattern during one period of the wavelength control table.

The construction of each wavelength control table III, IV, V and VI will be described. Initially, the second-directional transmission wavelengths of the wavelengths $\lambda 3$, $\lambda 4$, $\lambda 5$ and $\lambda 6$ are set to transfer in the order of the wavelengths $\lambda 5$, $\lambda 6$, $\lambda 4$ and $\lambda 3$, which is named the second transmission wavelength control pattern, and the first-directional transmission wavelengths of the wavelengths $\lambda 1$ and $\lambda 2$ are set to transfer in the order of the wavelengths $\lambda 1$ and $\lambda 2$, which is named the first transmission wavelength control pattern. Two sets of the second transmission wavelength control patterns are assigned to the portion of the addresses 0 to 7 of each wavelength control table III, IV, V and VI, and a set of the first transmission wavelength control pattern is assigned to the portion of the addresses 8 to 11. Further, phases of the wavelength control patterns of the addresses 0 to 7 of the wavelength control tables III, IV, V and VI are set to be shifted from each other such that the variable wavelength transmission units III, IV, V and VI controlled by the wavelength control tables III, IV, V and VI do not output the optical signals of the same wavelength concurrently.

Further, in the portion of the addresses 8 to 11 of each wavelength control pattern III, IV, V and VI, the number of usable wavelengths is only two, while the number of the variable wavelength transmission units is four. Therefore, the first transmission wavelength control pattern is divided into two portions, and the phases are shifted from each other such that the transmission wavelengths of the four variable wavelength transmission units will not be the same. For example, the wavelength control pattern of the addresses 8 to 11 of the wavelength control table IV is set to be transmission pause, the wavelength $\lambda 1$, transmission pause and the wavelength $\lambda 2$, and the wavelength control pattern of the addresses 8 to 11 of the wavelength control table V is set to be the wavelength $\lambda 1$, transmission pause, the wavelength $\lambda 2$ and transmission pause. The phases of the wavelength control patterns (the transmission pause, the wavelength $\lambda 1$, transmission pause and the wavelength $\lambda 2$) set by dividing the first transmission control pattern into two portions are shifted by one. However, regarding constructions of the wavelength tables III to VI there occurs no problem even if such a wavelength that is not assigned to other variable wavelength transmission units is assigned to the portion indicating the transmission pause. Especially, the above-discussed wavelength assignment is effective, since when a tunable laser is used as the light source, it takes a re-oscillated wavelength time to be stabilized if the tunable laser is put into a non-oscillated state at the time of the transmission pause.

Further, also in the wavelength control patterns of the wavelength control tables I and II, four sets of the first transmission wavelength patterns are assigned to the portion of the addresses 0 to 7, and a set of the second transmission wavelength control pattern is assigned to the portion of the addresses 8 to 11. The phase of the wavelength control pattern of the addresses 0 to 7 of each wavelength control I and II is shifted by one from the phase of the wavelength control pattern of the addresses 8 to 11 such that the variable wavelength transmission units controlled by each wavelength control table I and II do not output the optical signals of the same wavelength concurrently.

In the node device in which the number of the first-directional variable wavelength transmission units is different from the number of the second-directional variable wavelength transmission units, the time for transmitting the packet to the adjacent node device can be extended and the time for returning the packet to this node device can be shortened by the thus-set wavelength control tables I to VI. Further, Table 6 shows buffer control tables set corresponding to Table 5.

TABLE 5

| Table name | \multicolumn{12}{c}{Address} |
| | 0 | 1 | 2 | 3 | 4 | 5 | 6 | 7 | 8 | 9 | 10 | 11 |
|---|---|---|---|---|---|---|---|---|---|---|---|---|
| Wavelength control table I | 1 | 2 | 1 | 2 | 1 | 2 | 1 | 2 | 6 | 4 | 3 | 5 |
| Wavelength control table II | 2 | 1 | 2 | 1 | 2 | 1 | 2 | 1 | 4 | 3 | 5 | 6 |
| Wavelength control table III | 3 | 5 | 6 | 4 | 3 | 5 | 6 | 4 |   | 2 |   | 1 |
| Wavelength control table IV | 5 | 6 | 4 | 3 | 5 | 6 | 4 | 3 |   | 1 |   | 2 |
| Wavelength control table V | 6 | 4 | 3 | 5 | 6 | 4 | 3 | 5 | 1 |   | 2 |   |
| Wavelength control table VI | 4 | 6 | 5 | 6 | 4 | 6 | 5 | 6 | 2 |   | 1 |   |

$\lambda 1 \rightarrow 1$, $\lambda 2 \rightarrow 2$, $\lambda 3 \rightarrow 3$ ... $\lambda 8 \rightarrow 8$

TABLE 6

| Table name | \multicolumn{12}{c}{Address} |
| | 0 | 1 | 2 | 3 | 4 | 5 | 6 | 7 | 8 | 9 | 10 | 11 |
|---|---|---|---|---|---|---|---|---|---|---|---|---|
| Buffer control table I | A1 | A2 | A1 | A2 | A1 | A2 | A1 | A2 | A6 | A4 | A3 | A5 |
| Buffer control table II | A2 | A1 | A2 | A1 | A2 | A1 | A2 | A1 | A4 | A3 | A5 | A6 |
| Buffer control table III | A3 | A5 | A6 | A4 | A3 | A5 | A6 | A4 |   | A2 |   | A1 |
| Buffer control table IV | A5 | A6 | A4 | A3 | A5 | A6 | A4 | A3 |   | A1 |   | A2 |
| Buffer control table V | A6 | A4 | A3 | A5 | A6 | A4 | A3 | A5 | A1 |   | A2 |   |
| Buffer control table VI | A4 | A6 | A5 | A6 | A4 | A6 | A5 | A6 | A2 |   | A1 |   |

As described above, according to the transmission control method of this embodiment, the time for transmitting the packet in the node device to its adjacent node device can be extended and the time for returning the packet to this node device can be shortened. Thus, the wastefully-assigned packet returning time can be assigned to the packet transmission time, so that the transmission capacity of the network can be increased without altering the hardware structure of the node device.

Sixth Embodiment

In the fourth and fifth embodiments, the opportunity for the reversing communication is relatively decreased on the basis of the condition that "the number of reversings of the packet output from the transmitting terminal equipment is only dependent on the positional relationship but not on the number of terminal equipments on the network. However, as the number of node devices on the network increases, the number of packet relayings in the node devices needed for the packet to reach the node device connected to the addressed destination terminal equipment increases. Therefore, in the node device, the number of packets relayed to the adjacent node device is apparently larger than the number of packets reversed in this node device".

In this embodiment, the structure is built such that opportunities for outputting the packet to the adjacent node device and for returning the packet can be appropriately set.

The number of the packets in the node device to be relayed to its adjacent node device and the number of the packets to be returned are influenced by factors other than the structure of the network system. For example, the traffic characteristic on the network always fluctuates, and the traffic distribution deviates depending on the combination of transmitting and receiving terminal equipments and the positional relationship of communication apparatuses, such as a bridge, a rooter and the like, on the network. Further, the returning or reversing is effective for the communication between the terminal equipments connected to the same node device, especially when the number of the node devices is large, and the traffic distribution deviates depending on the amounts of the traffics between node devices.

Therefore, in this embodiment, the ratio between the processing time for transmitting the packet to the adjacent node device and the processing time for returning the packet to this node device concerned is set so as to match with the traffic characteristics of the packets transmitting through this node device. Thus, throughput of the network is improved.

This embodiment will hereinafter be described in detail.

Figure 19:
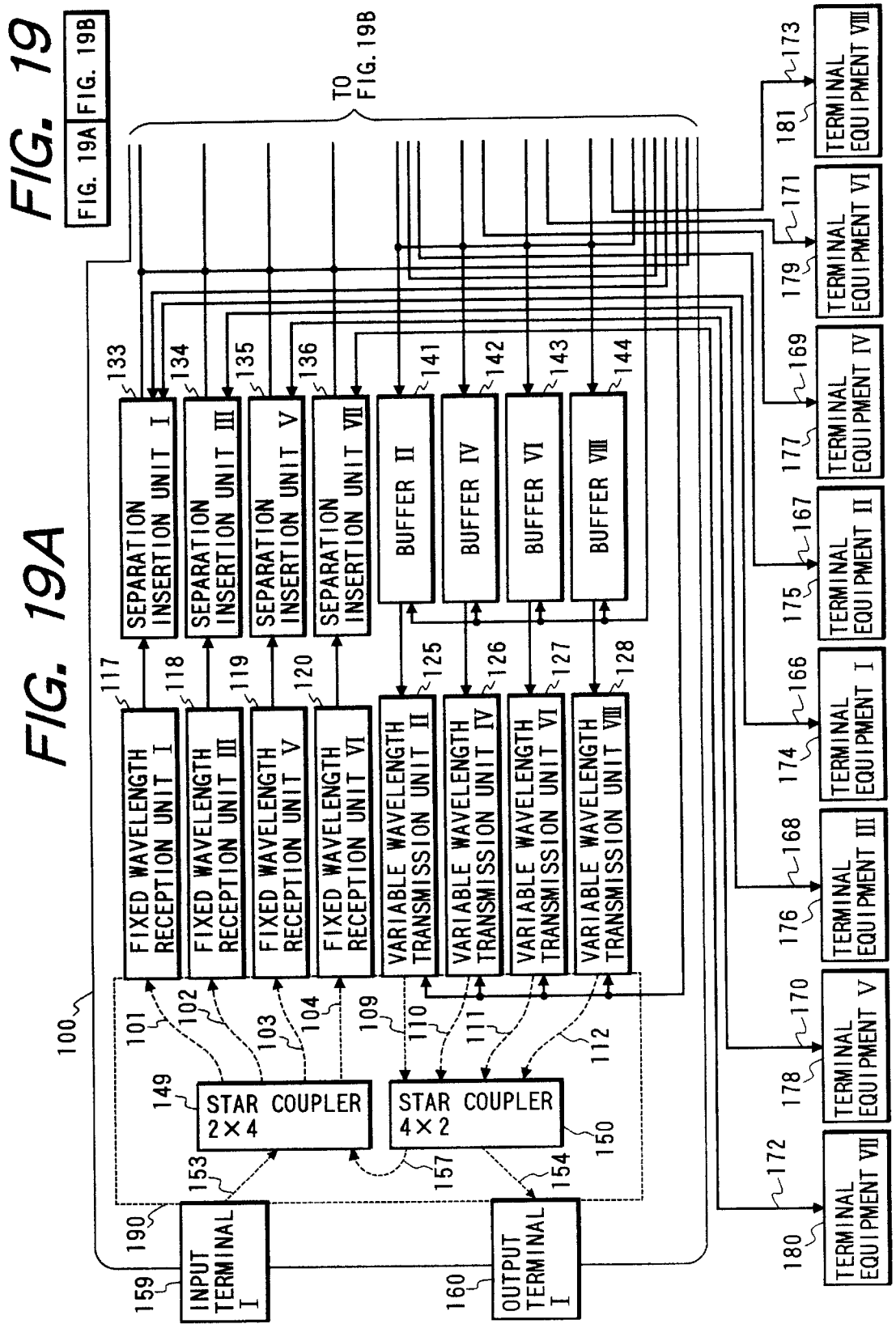
FIG. 19, which consists of FIG. 19A and FIG. 19B, is a schematic diagram of a node device illustrating a sixth embodiment according to the present invention.
Figure 19B:
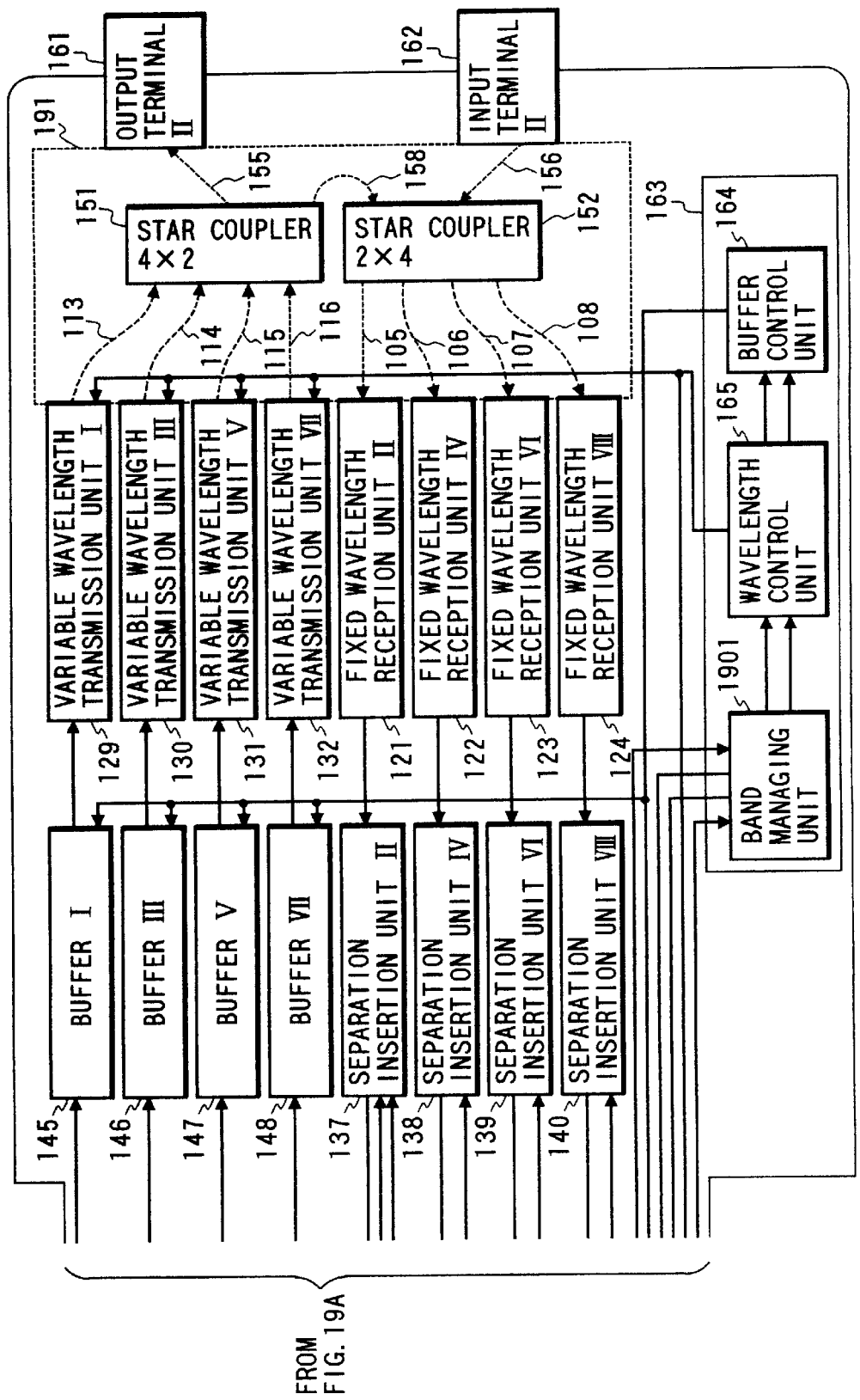

FIGS. 19A and 19B show the structure of the node device of this embodiment. This node device is different from the node device illustrated in FIGS. 1A and 1B in that a band managing unit 1901 is newly arranged in the control unit 163. In this node device, operation functions of the fixed wavelength reception units 117 to 124, separation-insertion units III, IV, V, VI and VII, buffers and variable wavelength transmission units in the node device of the present invention are fully identical with operation functions thereof used in the node device of FIGS. 1A and 1B. However, operations and functions of the buffer control unit and the wavelength control unit are different from those of the buffer control unit and the wavelength control unit of FIGS. 1A and 1B because the band managing unit is newly provided in this embodiment. Further, functions of the separation-insertion units I and II connected to the band managing unit are different from those of the separation-insertion units I and II of FIGS. 1A and 1B. The functions of portions of the fixed wavelength reception units, separation-insertion units, buffers and variable wavelength transmission units described above will not be described hereinafter.

The node device of this embodiment features that the ratio between the processing time for transmitting the packet to the adjacent node device and the processing time for returning the packet to this node device concerned is appropriately set so as to match with the traffic characteristics of the packets transmitting through this node device.

For convenience' sake, the transmission direction of the packet input into the input terminal I 159 and output from the terminal output II 161 is called a first direction, and the transmission direction of the packet input into the input terminal II 162 and output from the output terminal I 160 is called a second direction. Transmission functions of variable wavelength transmission units I 129, II 125, III 130, IV 126, V 131, VI 127, VII 132 and VIII 128 for outputting optical signals in the respective transmission directions are fully the same with each other. Variable transmission wavelengths are wavelengths of $\lambda 1$, $\lambda 2$, $\lambda 3$, $\lambda 4$, $\lambda 5$, $\lambda 6$, $\lambda 7$ and $\lambda 8$. Here, the wavelength $\lambda 1$ is the shortest of all, and the wavelength becomes longer as the wavelength-discriminative number becomes greater. Fixed wavelength reception units are classified into a group of fixed wavelength reception units II 121, IV 122, VI 123 and VIII 124 for receiving wavelengths whose discriminative numbers are even numbers and a group of fixed wavelength reception units I 117, III 118, V 119 and VII 120 for receiving wavelengths whose discriminative numbers are odd numbers.

As is known from FIGS. 19A and 19B, the group of the fixed wavelength reception units arranged for the communication in the first direction consists of the fixed wavelength reception units I 117, III 118, V 119 and VII 120 which respectively receive optical signals of the wavelengths $\lambda 1$, $\lambda 3$, $\lambda 5$ and $\lambda 7$. The group of the fixed wavelength reception units arranged for the communication in the second direction consists of the fixed wavelength reception units II 121, IV 122, VI 123 and VIII 124 which respectively receive optical signals of the wavelengths $\lambda 2$, $\lambda 4$, $\lambda 6$ and $\lambda 8$.

The separation-insertion unit 133 of this embodiment has the function to insert the packet from the terminal equipment I 174 and the band managing unit 1901 and to output the separated packet to the terminal equipment I 174 and the band managing unit 1901. Further, the separation-insertion unit 137 inserts the packet from the terminal equipment II 175 and the band managing unit 1901 and outputs the separated packet to the terminal equipment II 175 and the band managing unit 1901.

Reference numeral 190 designates the wavelength multiplexing transmission system used in the node device of FIGS. 1A and 1B. Reference numeral 191 designates the wavelength multiplexing transmission system used in the node device of FIGS. 1A and 1B. The optical signals of the wavelengths $\lambda 1$, $\lambda 3$, $\lambda 5$ and $\lambda 7$ transmitted from the variable wavelength transmission units II 125, IV 126, VI 127 and VIII 128 are respectively received by the fixed wavelength reception units 117 to 120 in this node device concerned, and the optical signals of the wavelengths $\lambda 2$, $\lambda 4$, $\lambda 6$ and $\lambda 8$ transmitted from the variable wavelength transmission units I 129, III 130, V 131 and VII 132 are respectively received by the fixed wavelength reception units 121 to 124 in this node device concerned.

In the connection configuration between the node devices of this embodiment, the output terminal II 161 and the input terminal II 162 in one node device are set to be respectively connected to the input terminal I 159 and the output terminal I 160 in the other node device adjacent thereto on the downstream side in the first direction. The following communication can be executed by that connection configuration. When the variable wavelength transmission units I 129, III 130, V 131 and VII 132 in the node device 100 output optical signals of the wavelengths $\lambda 1$, $\lambda 3$, $\lambda 5$ and $\lambda 7$, the optical signals at the respective wavelengths are input into the adjacent node device via its output terminal 161 after transmitted through the 4×2 star coupler 151 and the optical fiber 155, and are divided into the optical fibers 101, 102, 103 and 104 by the 2×4 star coupler 149 in the adjacent node device. The divided optical signal of the wavelength $\lambda 1$ is only received by the fixed wavelength reception unit I 117, the divided optical signal of the wavelength $\lambda 3$ is only received by the fixed wavelength reception unit III 118, the divided optical signal of the wavelength $\lambda 5$ is only received by the fixed wavelength reception unit V 119, and the divided optical signal of the wavelength $\lambda 7$ is only received by the fixed wavelength reception unit VII 120. In other words, where the variable wavelength transmission units I 129, III 130, V 131 and VII 132 intend to transmit the packet to the adjacent node device, the optical signal of any of the wavelengths $\lambda 1$, $\lambda 3$, $\lambda 5$ and $\lambda 7$ is transmitted therefrom.

Where the packet is intended to be transmitted to (returned to or reversed to) this node device concerned, the optical signal of any of the wavelengths $\lambda 2$, $\lambda 4$, $\lambda 6$ and $\lambda 8$ is output.

Figure 20B:
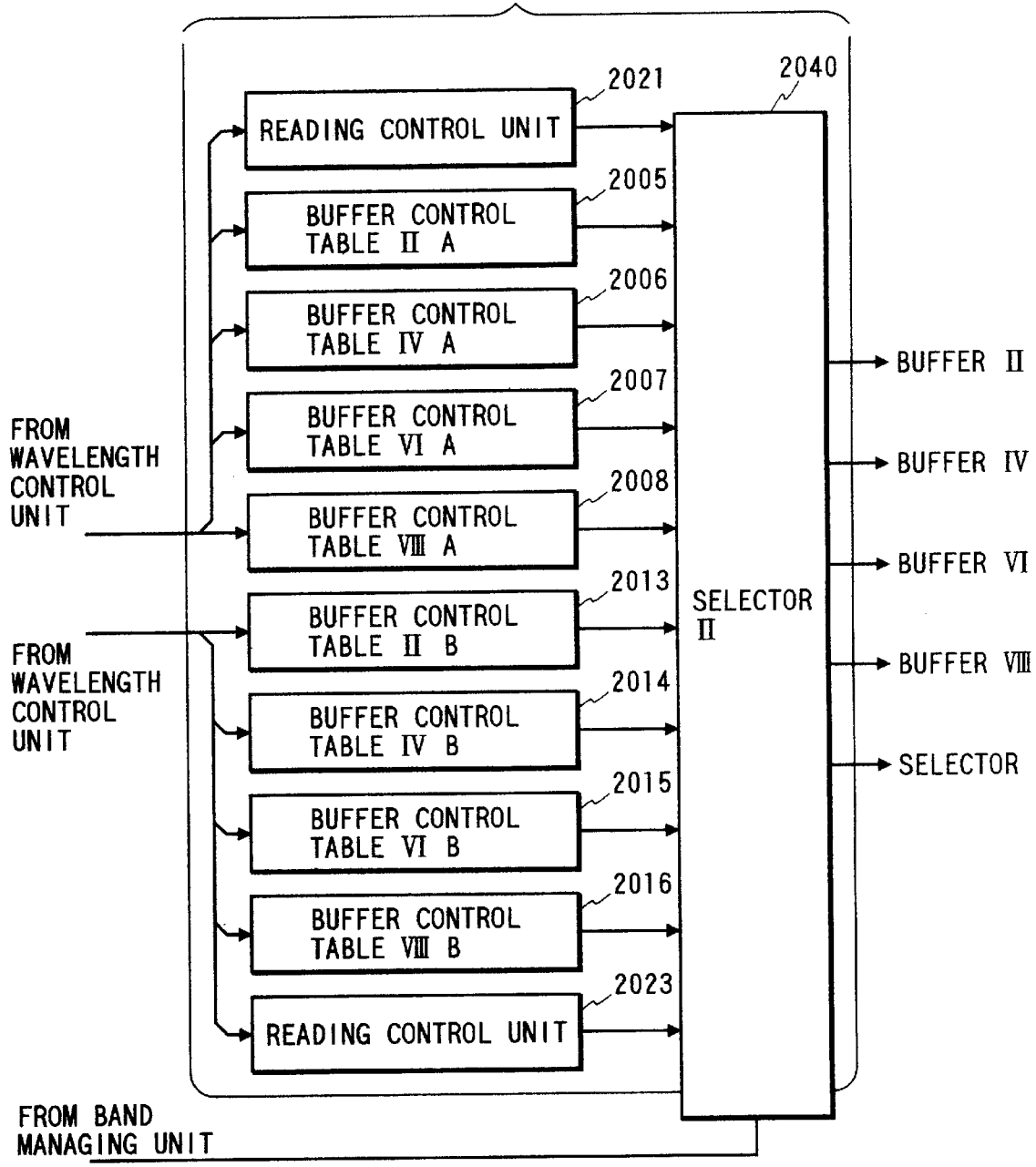
FIG. 20, which consists of FIG. 20A and FIG. 20B, is a block diagram of a buffer control unit according to the present invention.

FIGS. 20A and 20B show the internal structure of the buffer control unit 164 of this embodiment. In FIGS. 20A and 20B, reference numerals 2001 to 2004 respectively designate buffer control tables I A, III A, V A and VII A, and the buffer control tables I A, III A, V A and VII A are read out in order in response to the address value which is output from the ROM counter I 2102 in the wavelength control unit 165. Then, predetermined read offset values are, after selected by the selector I 2030, respectively output to the reading address counters 403 in the buffers I, III, V and VII. Reference numerals 2009 to 2012 respectively designate buffer control tables I B, III B, V B and VII B, and the buffer control tables I B, III B, V B and VII B are read out in order in response to the address value which is output from the ROM counter II 2103 in the wavelength control unit 165. Then, predetermined read offset values are, after selected by the selector I 2030, respectively output to the reading address counters 403 in the buffers I, III, V and VII.

Further, reference numerals 2005 to 2008 respectively designate buffer control tables II A, IV A, VI A and VIII A, and the buffer control tables II A, IV A, VI A and VIII A are read out in order in response to the address value which is output from the ROM counter III 2114 in the wavelength control unit 165. Then, predetermined read offset values are, after selected by the selector II 2040, respectively output to the reading address counters 403 in the buffers II, VI and VIII. Reference numerals 2013 to 2016 respectively designate buffer control tables II B, IV B, VI B and VIII B, and the buffer control tables II B, IV B, VI B and VIII B are read out in order in response to the address value which is output from the ROM counter IV 2115 in the wavelength control unit 165. Then, predetermined read offset values are, after selected by the selector II 2040, respectively output to the reading address counters 403 in the buffers II, IV, VI and VIII. Those tables are incorporated in a read-only memory (ROM). The contents of the buffer control tables I A to VIII A and I B to VIII B will be described later.

Reference numeral 2020 designates the reading control unit, which outputs to the selector 407 in the buffers I, III, V and VII the reading control signal for reading one of the dual port memory 405 and the FIFO 406 in the buffers I, III, V and VII, by counting the clock signal output from the ROM counter I 2102 of the wavelength control unit 165.

Similarly, reference numeral 2021 designates the reading control unit, which outputs to the selector 407 in the buffers II, IV, VI and VIII the reading control signal for reading one of the dual port memory 405 and the FIFO 406 in the buffers II, IV, VI and VIII, by counting the clock signal output from the ROM counter III 2114 of the wavelength control unit 165. Each of reference numerals 2022 and 2023 designates the reading control unit, which outputs to the selector 407 in the buffer the reading control signal for reading one of the dual port memory 405 and the FIFO 406, by counting the clock signal output from the ROM counters II 2103 and IV 2115 of the wavelength control unit 165.

Reference numeral 2030 designates the selector which selects the offset value of one of the first-directional buffer control tables of the groups A and B and the reading control signal of one of the first-directional reading control units 2020 and 2022 of the groups A and B, and outputs them to the corresponding buffers I, III, V and VII.

Similarly, reference numeral 2040 designates the selector which selects the offset value of one of the second-directional buffer control tables of the groups A and B and the reading control signal of one of the second-directional reading control units 2021 and 2023 of the groups A and B, and outputs them to the corresponding buffers II, IV, VI and VIII.

Buffer control tables of the group A are the buffer control tables I A, III A, V A, VII A, II A, IV A, VI A and VIII A. The buffer control tables of the group A are tables of head addresses showing the memory region of the dual port memory in the buffer, in which the packet to be output to the adjacent node device is to be stored. As described in the above embodiments, the packet to be output to the adjacent node device is stored in the predetermined memory region of the memory regions I, III, V and VII by each first-directional buffer, and the packet to be output to the adjacent node device is stored in the predetermined memory region of the memory regions II, IV, VI and VIII by each second-directional buffer. Therefore, buffer control tables I A, III A, V A and VII A are composed of the offset values showing the memory regions I, III, V and VII, and buffer control tables II A, IV A, VI A and VIII A are composed of the offset values showing the memory regions II, IV, VI and VIII.

Further, buffer control tables of the group B are the buffer control tables I B, III B, V B, VII B, II B, IV B, VI B and VIII B. The buffer control tables of the group B are tables of head addresses showing the memory region of the dual port memory in the buffer, in which the packet needed to change its transmission direction is to be stored. As described in the above embodiments, the packet to be returned to this node device is stored in the predetermined memory region of the memory regions II, IV, VI and VIII by each first-directional buffer, and the packet to be returned to this node device is stored in the predetermined memory region of the memory regions I, III, V and VII by each second-directional buffer. Therefore, buffer control tables I B, III B, V B and VII B are composed of the offset values showing the memory regions II, IV, VI and VIII, and buffer control tables II B, IV B, VI B and VIII B are composed of the offset values showing the memory regions I, III, V and VII.

Figure 21B:
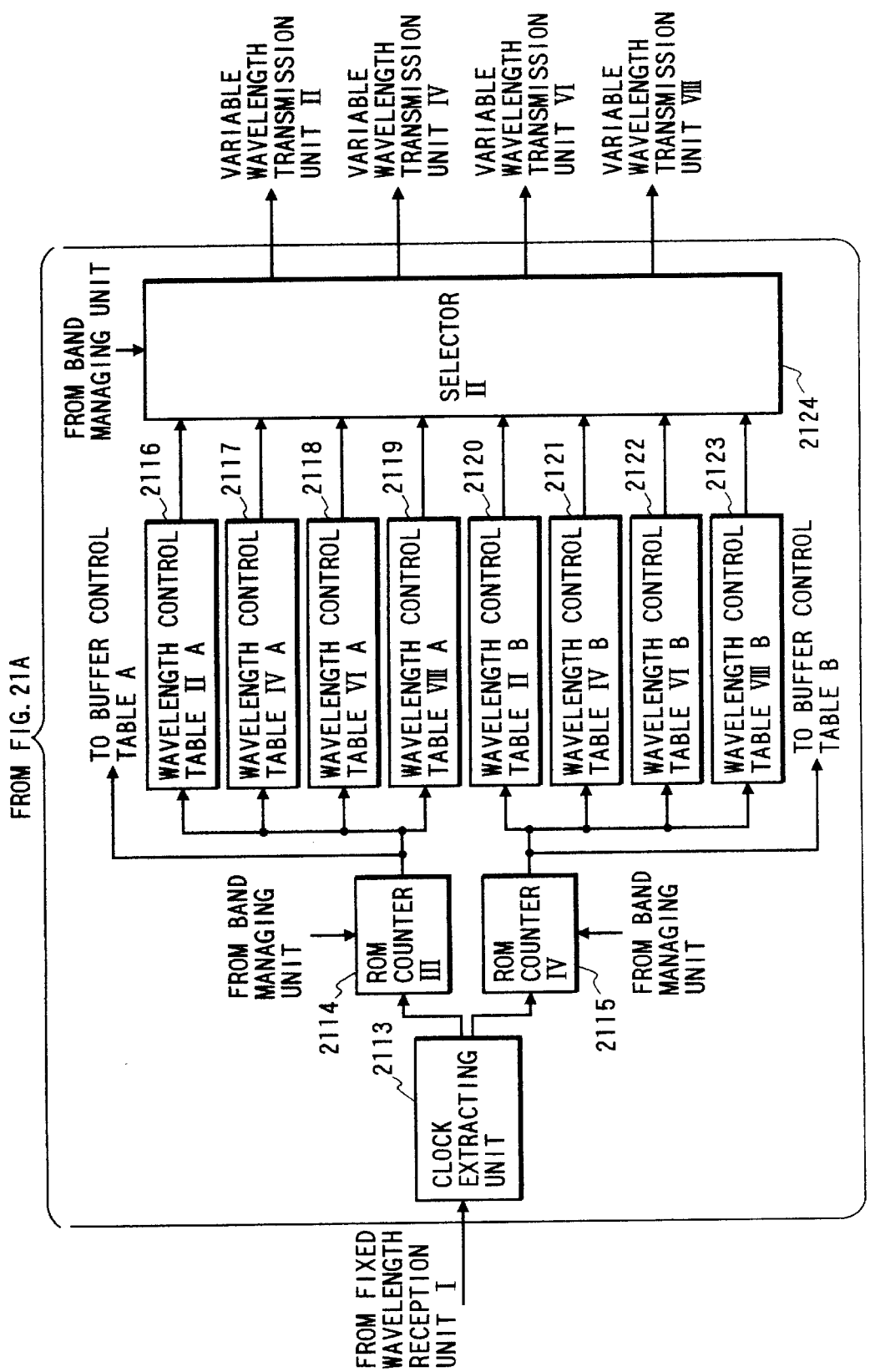
FIG. 21, which consists of FIG. 21A and FIG. 21B, is a block diagram of a wavelength control unit according to the present invention.

FIG. 21 shows the internal structure of the wavelength control unit 165. The contents of each table is shown in Table 7. In FIG. 21, reference numerals 2104 to 2107 are respectively wavelength control tables I A, III A, V A and VII A. The wavelength control tables I A, III A, V A and VII A are repeatedly read out in order in response to the address value which is output from the ROM counter I 2102 in the wavelength control unit 165. Then, predetermined wavelength control signals are respectively output to respective drive units of the corresponding variable wavelength transmission units I, III, V and VII.

As is seen from the structure of the node device of FIG. 19, when the first-directional variable wavelength transmission units (variable wavelength transmission units I 129, III 130, V 131 and VII 132) output the optical signals of $\lambda 1$, $\lambda 3$, $\lambda 5$ and $\lambda 7$, the optical signals of those wavelengths are transmitted as follows: The optical signals of $\lambda 1$, $\lambda 3$, $\lambda 5$ and $\lambda 7$ are output to the adjacent node device through the output terminal II 161, after transmitted through the 4×2 star coupler 151 and the optical fiber 155, and divided into the optical fibers 101, 102, 103 and 104 at the 2×4 star coupler 149, after transmitted through the input terminal I 159 of the adjacent node device and the optical fiber 153. The divided optical signal of $\lambda 1$ is only received by the fixed wavelength reception unit I 117 in the adjacent node device, the divided optical signal of $\lambda 3$ is only received by the fixed wavelength reception unit III 118 in the adjacent node device, the divided optical signal of $\lambda 5$ is only received by the fixed wavelength reception unit V 119 in the adjacent node device, and the divided optical signal of λ7 is only received by the fixed wavelength reception unit VII 120 in the adjacent node device. Therefore, the wavelength control tables I A, III A, V A and VII A composed of the offset values showing the wavelengths λ1, λ3, λ5 and λ7 can be said to be tables provided for transmitting the packet to the adjacent node device.

Further, reference numerals 2108 to 2111 are respectively wavelength control tables I B, III B, V B and VII B. The wavelength control tables I B, III B, V B and VII B are repeatedly read out in order in response to the address value which is output from the ROM counter II 2103 in the wavelength control unit 165. Then, predetermined wavelength control signals are respectively output to respective drive units of the corresponding variable wavelength transmission units I, III, V and VII.

When the variable wavelength transmission units (variable wavelength transmission units I 129, III 130, V 131 and VII 132) output the optical signals of λ2, λ4, λ6 and λ8, the optical signals of those wavelengths are transmitted as follows: The optical signals of λ2, λ4, λ6 and λ8 are divided into the optical fibers 105, 106, 107 and 108 at the 2×4 star coupler 152, after transmitted through the 4×2 star coupler 151 and the optical fiber 158. The divided optical signal of λ2 is only received by the fixed wavelength reception unit II 121 in this node device, the divided optical signal of λ4 is only received by the fixed wavelength reception unit IV 122 in this node device, the divided optical signal of λ6 is only received by the fixed wavelength reception unit VI 123 in this node device, and the divided optical signal of λ8 is only received by the fixed wavelength reception unit VIII 124 in this node device. Therefore, the wavelength control tables I B, III B, V B and VII B composed of the offset values showing the wavelengths λ2, λ4, λ6 and λ8 can be said to be tables provided for returning the packet to this node device.

Similarly, reference numerals 2116 to 2119 are respectively wavelength control tables II A, IV A, VI A and VIII A. The wavelength control tables II A, IV A, VI A and VIII A are repeatedly read out in order in response to the address value which is output from the ROM counter III 2114 in the wavelength control unit 165. Then, predetermined wavelength control signals are respectively output to respective drive units of the corresponding variable wavelength transmission units II, IV, VI and VIII. The wavelength control tables II A, IV A, VI A and VIII A composed of the offset values showing the wavelengths λ2, λ4, λ6 and λ8 are tables provided for transmitting the packet to the adjacent node device on the upstream side in the first direction.

Further, reference numerals 2120 to 2123 are respectively wavelength control tables II B, IV B, VI B and VIII B. The wavelength control tables II B, IV B, VI B and VIII B composed of the offset values showing the wavelengths λ1, λ3, λ5 and λ7 are tables provided for returning the packet to this node device.

These tables are also incorporated in the read-only memory (ROM). The contents of the wavelength control tables I to VIII will be described later.

Further, reference numeral 2101 designates the clock generator which generates a predetermined clock signal, and supplies it to the buffer control unit 164 and outputs the clock signal to the ROM counters I 2102 and II 2103. Reference numeral 2113 designates the clock extracting unit, which extracts the clock from the optical signals output from the variable wavelength transmission unit I 129 in the adjacent node device (for example, the node device V 305 adjacent to the node device I 301 in FIG. 3) and received by the fixed wavelength reception unit I 117 in this node device (for example, the node device I 301 relative to the node device V 305), transmits this clock signal to the buffer control unit 164 and frequency-demultiplies this clock signal and outputs the frequency-demultiplied one to the ROM counters III 2114 and IV 2115 (in FIGS. 19A and 19B, the line from the fixed wavelength reception unit I 117 to the wavelength control unit 165 is omitted).

Reference numeral 2102 designates the ROM counter I, which, pursuant to the ON/OFF signal (the clock count command signal) from a later-described band managing unit 1901, counts the clock signal of the clock generator 2101 in the ON-state and outputs the predetermined address value to the first-directional wavelength control tables of the group A, while not counting the clock signal of the clock generator 2101 in the OFF-state.

Further, reference numeral 2103 designates the ROM counter II which, pursuant to the ON/OFF signal (the clock count command signal) from the band managing unit 1901, outputs the predetermined address value to the first-directional wavelength control tables of the group B, similar to the ROM counter I.

Similarly, reference numeral 2114 designates the ROM counter III which, pursuant to the ON/OFF signal from the band managing unit 1901, counts the clock signal of the clock extracting unit 2113 in the ON-state and outputs the predetermined address value to the second-directional wavelength control tables of the group A, while not counting the clock signal of the clock extracting unit 2113 in the OFF-state.

Further, reference numeral 2115 designates the ROM counter IV which, pursuant to the ON/OFF signal (the clock count command signal) from the band managing unit 1901, outputs the predetermined address value to the second-directional wavelength control tables of the group B, similar to the ROM counter III.

For the sake of explanation, the ROM counters I and II are named the first-directional ROM counters, and the ROM counters III and IV are named the second-directional ROM counters. Reference numeral 2112 designates the selector which selects the offset value of one of the first-directional wavelength control tables of the groups A and B, and outputs it to the corresponding variable wavelength transmission units I, III, V and VII. Similarly, reference numeral 2124 designates the selector which selects the offset value of one of the second-directional wavelength control tables of the groups A and B, and outputs it to the corresponding variable wavelength transmission units II, IV, VI and VIII.

Further, the first-directional buffer control tables of the group A and the first-directional wavelength control tables of the group A are synchronously read by the ROM counter I 2102. For example, when the ROM counter I 2102 outputs the address signals 1, 2 and 3 to the wavelength control table I A, the offset values 5, 7 and 3 are output from the wavelength control table I A to the variable wavelength transmission unit I 129 and the transmission wavelengths of the variable wavelength transmission unit I 129 are set to the wavelengths λ5, λ7 and λ3. Synchronously therewith, when the ROM counter I 2102 outputs the address signals 1, 2 and 3 to the buffer control table I A, the offset values 5, 7 and 3 are output from the buffer control table I A to the reading address counter 403 in the buffer I 145 and the packets in the memory regions V, VII and III of the dual port memory 405 in the buffer I 145 are read in order. Therefore, on the basis of the wavelength control tables and the buffer control tables, the packet in the memory region corresponding to the transferring transmission wavelength of the variable wavelength transmission unit is converted into the optical signal of that transferring transmission wavelength of the variable wavelength transmission unit and output. Further, the first-directional tables of the group B, second-directional tables of the group A and second-directional tables of the group B are synchronously read by the corresponding ROM counters, respectively.

Further, each ROM counter and each selector are respectively controlled by the control signals of the band control unit 2204 (the control signal output from the ROM counter is the clock count command signal or clock count pause command signal, and the control signal output from the selector is the command signal for selecting the A group or B group). For example, in order to read the offset values of the first-directional wavelength control tables of the group A and the first-directional buffer control tables of the group A, the clock count command signal is output from the band managing unit 1901 to the ROM counter I 2102 and the command signal for selecting the group A is output from the band managing unit 1901 to the selectors I 2112 and I 2030. As a result, the offset values in the first-directional wavelength control tables of the group A and the first-directional buffer control tables of the group A designated by the address signal of the ROM counter I 2102 are read, while the offset values in the first-directional wavelength control tables of the group B and the first-directional buffer control tables of the group B are not read. This is the same, with respect to the second-directional wavelength control tables and the second-directional buffer control tables.

Further, in order that the same-directional variable wavelength transmission units do not perform the transmission at the same wavelength in the same node device, the transition phase of the offset values, indicating the transmission wavelengths, in the wavelength control tables of the same group for controlling the transmission wavelengths of the variable wavelength transmission units for the above directional use are shifted from each other. For example, the transmission wavelengths from the first-directional variable wavelength transmission units I 129, III 130, V 131 and VII 132 in the node device are controlled by the offset values of one of the transmission wavelength control tables I of the groups A and B. For example, when controlled by the transmission wavelength control tables of the group A, if the address signals from the ROM counter I 2102 are address signals 0, 1 and 2, the transmission wavelength of the first-directional variable wavelength transmission unit I 129 transfers in the order of the wavelengths 1, 5 and 7, the transmission wavelength of the first-directional variable wavelength transmission unit III 130 transfers in the order of the wavelengths 5, 7 and 3, the transmission wavelength of the first-directional variable wavelength transmission unit V 131 transfers in the order of the wavelengths 7, 3 and 1, and the transmission wavelength of the first-directional variable wavelength transmission unit VII 132 transfers in the order of the wavelengths 3, 1, and 5. Therefore, the transmission wavelengths of the first-directional variable wavelength transmission units I 129, III 130, V 131 and VII 132 are always set to different transmission wavelengths, so that the wavelength multiplexing communication can be attained without cross talk.

Thus, the transmission wavelengths of the variable wavelength transmission units for the same directional use in the node device are always set by the offset values of the wavelength control tables of the same group (the wavelength control tables of the group A or B), and the transitions of the offset values indicating the transmission wavelengths in the wavelength control tables of the same group are set with their phases being shifted.

Further, in order that the variable wavelength transmission units in two adjacent node devices for outputting the same optical fiber transmission line do not perform the transmission at the same wavelength, the offset values, indicating the transmission wavelengths, in the wavelength control tables for controlling the transmission wavelengths of the variable wavelength transmission units in one node device are set to values different from values of the offset values, indicating the transmission wavelengths, in the wavelength control tables for controlling the transmission wavelengths of the variable wavelength transmission units in the other node device. For example, the variable wavelength transmission units in the two adjacent node devices for outputting to the same optical fiber are the first-directional variable wavelength transmission units I 129, III 130, V 131 and VII 132 in the node device I 301 and the second-directional variable wavelength transmission units II 125, IV 126, VI 127 and VIII 128 in the node device V 305. Further, the fact that "the offset values in the wavelength control tables of one group for controlling the transmission wavelengths of the variable wavelength transmission units in one node device are set to values different from values of the offset values in the wavelength control tables of the same group for controlling the transmission wavelengths of the variable wavelength transmission units in the other node device" means the following: For example, the transmission wavelengths of the first-directional variable wavelength transmission units I 129, III 130, V 131 and VII 132 in the node device I 301 are controlled by the transmission wavelength control tables of the group A composed of the offset values showing the wavelengths $\lambda 1$, $\lambda 3$, $\lambda 5$ and $\lambda 7$ and the transmission wavelength control tables of the group B composed of the offset values showing the wavelengths $\lambda 2$, $\lambda 4$, $\lambda 6$ and $\lambda 8$. And, the transmission wavelength control tables of the group A for controlling the transmission wavelengths of the second-directional variable wavelength transmission units II 125, IV 126, VI 127 and VIII 128 in the node device V 305 are composed of the offset values showing the wavelengths $\lambda 2$, $\lambda 4$, $\lambda 6$ and $\lambda 8$, the transmission wavelength control tables of the group B are composed of the offset values showing the wavelengths $\lambda 1$, $\lambda 3$, $\lambda 5$ and $\lambda 7$, and the transmission wavelengths of the variable wavelength transmission units in the two adjacent node device are always controlled by the transmission wavelength control tables of the same group.

Thus, the transmission wavelengths of the variable wavelength transmission units for one directional use in the node device are controlled pursuant to the offset values of the wavelength control tables of one group (the wavelength control tables of the group A or B), and the transmission wavelengths of the variable wavelength transmission units in adjacent node device for outputting to the same optical fiber transmission line are also controlled pursuant to the offset values of the wavelength control tables of same group (the wavelength control tables of the group A or B).

Figure 22:
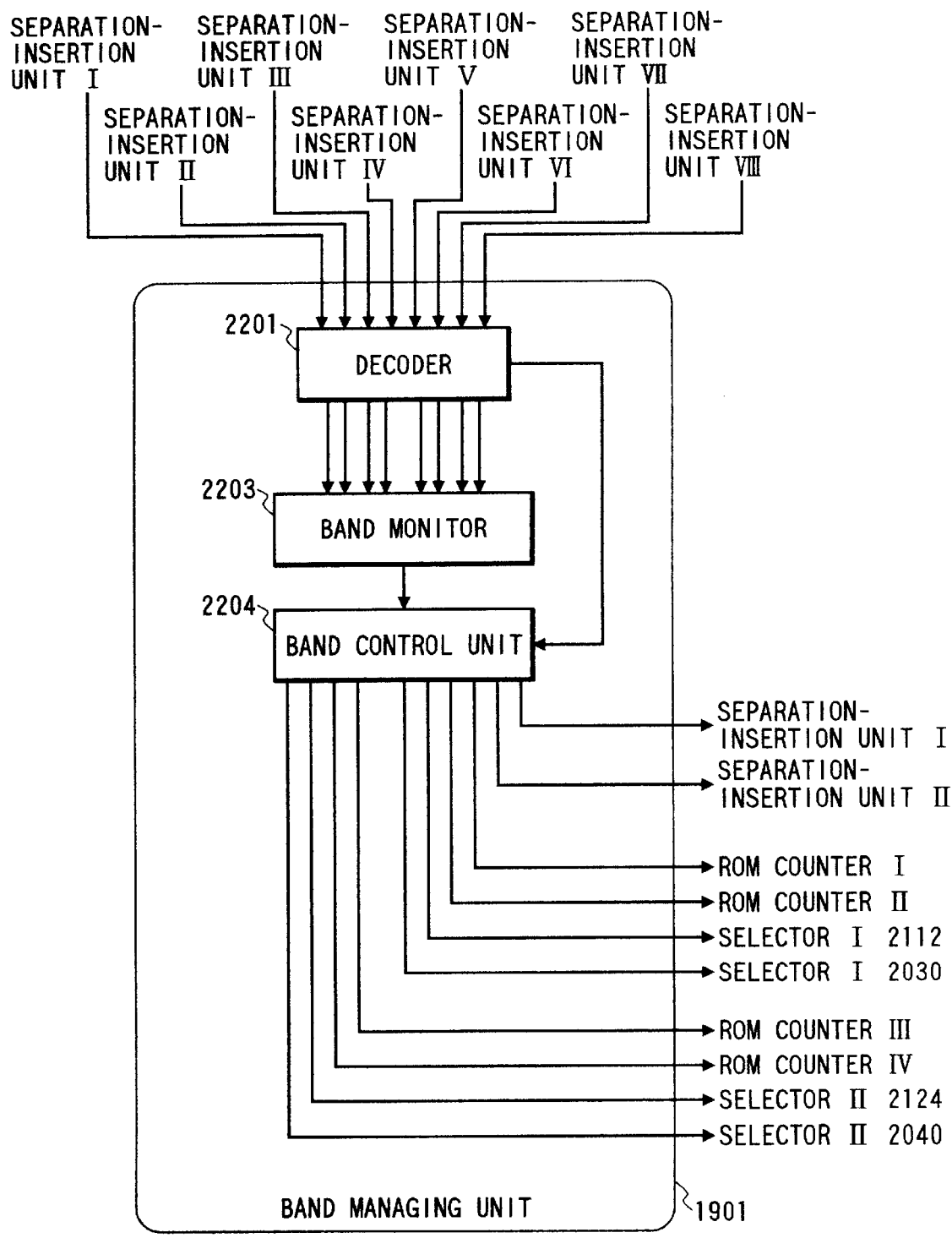
FIG. 22 is a block diagram of a band control unit according to the present invention.

FIG. 22 shows the internal structure of the band managing unit 1901. In FIG. 22, reference numeral 2201 designates the decoder, which decodes the addresses of all the packets separated by the separation-insertion units I 133, II 137, III 134, IV 138, V 135, VI 139, VII 136 and VIII 140, analyzes if the received packet needs to be returned in this node device concerned, notifies the band monitor 2203 of need or needlessness of the packet reversal, discriminates the packet descriptive of information about the band management and outputs the packet to the band control unit 2204. The information of the band management is, for example, the number of node devices, traffic characteristics of the transmitted packet in each terminal equipment, the selection order of the wavelength control tables of the groups A and B in the adjacent node devices, and the like. Further, the band managing unit 1901 controls the synchronization of the wavelength control tables for controlling the transmission wavelengths of the variable wavelength transmission units in the two adjacent node devices for outputting to the same optical fiber transmission line. This synchronization method will be described when the operation proceedings of the node device is described.

Reference numeral 2203 designates a band monitor which obtains the number of the packets needed to be relayed to the adjacent node device and the number of the packets needed to be returned, out of the packets received by each fixed wavelength reception unit during a certain time interval, and notifies the band control unit 2204 of its ration. This certain time interval is not limited to a fixed time interval or a variable time interval. Reference numeral 2204 designates the band control unit, which determines the selection order of the wavelength control tables of the groups A and B corresponding to the respective variable wavelength transmission units from the ratio between the number of the packets needed to be relayed to the adjacent node device and the number of the packets needed to be returned, and outputs the clock count command signal to one of the first-directional ROM counters I or II and one of the second-directional ROM counters III or IV such that this selection order is established.

Here, the selection order of the wavelength control tables of the groups A and B corresponding to the respective variable wavelength transmission units means the arrangement order of the respective tables in the basic pattern which is composed of the wavelength control tables (0 (zero) or more than 0) of the group A and the wavelength control tables (0 or more than 0) of the group B. Therefore, pursuant to the basic pattern which is composed of the N1 wavelength control tables of the group A and the N2 wavelength control tables of the group B, the clock count command signal is output to one of the first-directional ROM counters I or II and one of the second-directional ROM counters III or IV. The transmission wavelengths of the corresponding variable wavelength transmission units are circularly controlled by circulating this basic pattern. Further, when the basic pattern is altered, the band control unit 2204 packets information about the arrangement in the basic pattern of the wavelength control tables of the groups A and B and outputs this packet to a first-directional separation-insertion unit. In this embodiment, this separation-insertion unit is the separation-insertion unit I 133. Hence, the band control unit 2204 in an adjacent node device B for receiving the packet output from the first-directional variable wavelength transmission unit in a node device A analyzes the packet from the node device A descriptive of the information about the arrangement in the basic pattern of the wavelength control tables of the groups A and B, and outputs the clock count command signal to the ROM counters III or IV pursuant to the altered basic pattern. For example, when the band control unit 2204 in the node device A sets the basic pattern to the arrangement of two consecutive wavelength control tables of the group A and one wavelength control table of the group B thereafter, the band control unit 2204 in the node device A outputs the clock count command signal to the ROM counter I 2102 during the time interval in which 4×2 clocks are output, and after that outputs the clock count command signal to the ROM counter II 2103 during the time interval in which 4×1 clocks are output. The band control unit 2204 in the node device B outputs the clock count command signal to the ROM counter III 2114 during the time interval in which 4×2 clocks are output, and after that outputs the clock count command signal to the ROM counter IV 2215 during the time interval in which 4×1 clocks are output. In the band control units 2204 in the respective node devices, that series of operations are circulated pursuant to the basic pattern. Thus, the wavelength control tables of the group A are read twice, and after that the wavelength control tables of the group B are read once. This series of reading operations are circulated.

Assuming that the basic pattern is composed of N1 wavelength control tables of the group A and N2 wavelength control tables of the group B, the ratio between the time for outputting light of the wavelength, which can be output from the node device to its adjacent node device, and the time for outputting light of the wavelength, which can be returned to this node device concerned, can be set to a ratio of N1:N2. In this embodiment, in order to freely set the time for outputting light of the wavelength, which can be output from the node device to its adjacent node device, and the time for outputting light of the wavelength, which can be returned to this node device concerned, there is provided means for freely setting the number of the wavelength control tables of the group A and the number of the wavelength control tables of the group B, which respectively constitute the basic pattern.

The contents of the above-described wavelength control tables I to VIII show the transition of the optical signals to be transmitted by the variable wavelength transmission units. Those are set as illustrated in Table 7, for example. Here, numbers other than the address numbers indicate the affixed numbers of the wavelength $\lambda$.

TABLE 7

| Table name | Address | | | |
|---|---|---|---|---|
| | 0 | 1 | 2 | 3 |
| Wavelength control table I A | 1 | 5 | 7 | 3 |
| Wavelength control table I B | 2 | 6 | 8 | 4 |
| Wavelength control table II A | 2 | 6 | 8 | 4 |
| Wavelength control table II B | 1 | 5 | 7 | 3 |
| Wavelength control table III A | 5 | 7 | 3 | 1 |
| Wavelength control table III B | 6 | 8 | 4 | 2 |
| Wavelength control table IV A | 6 | 8 | 4 | 2 |
| Wavelength control table IV B | 5 | 7 | 3 | 1 |
| Wavelength control table V A | 7 | 3 | 1 | 5 |
| Wavelength control table V B | 8 | 4 | 2 | 6 |
| Wavelength control table VI A | 8 | 4 | 2 | 6 |
| Wavelength control table VI B | 7 | 3 | 1 | 5 |
| Wavelength control table VII A | 3 | 1 | 5 | 7 |
| Wavelength control table VII B | 4 | 2 | 6 | 8 |

TABLE 7-continued

| Table name | Address | | | |
|---|---|---|---|---|
| | 0 | 1 | 2 | 3 |
| Wavelength control table VIII A | 4 | 2 | 6 | 8 |
| Wavelength control table VIII B | 3 | 1 | 5 | 7 |

Further, the offset values of the above buffer control tables I to VIII are set as shown in Table 8.

TABLE 8

| Table name | Address | | | |
|---|---|---|---|---|
| | 0 | 1 | 2 | 3 |
| Buffer control table I A | A1 | A5 | A7 | A3 |
| Buffer control table I B | A2 | A6 | A8 | A4 |
| Buffer control table II A | A2 | A6 | A8 | A4 |
| Buffer control table II B | A1 | A5 | A7 | A3 |
| Buffer control table III A | A5 | A7 | A3 | A1 |
| Buffer control table III B | A6 | A8 | A4 | A2 |
| Buffer control table IV A | A6 | A8 | A4 | A2 |
| Buffer control table IV B | A5 | A7 | A3 | A1 |
| Buffer control table V A | A7 | A3 | A1 | A5 |
| Buffer control table V B | A8 | A4 | A2 | A6 |
| Buffer control table VI A | A8 | A4 | A2 | A6 |
| Buffer control table VI B | A7 | A3 | A1 | A5 |
| Buffer control table VII A | A3 | A1 | A5 | A7 |
| Buffer control table VII B | A4 | A2 | A6 | A8 |
| Buffer control table VIII A | A4 | A2 | A6 | A8 |
| Buffer control table VIII B | A3 | A1 | A5 | A7 |

Those thirty-two (32) tables are synchronously read from the respective ROM counters.

Referring to Tables 7 and 8, the operation for desirably controlling the time for outputting light of the wavelength, which can be output from a node device to its adjacent node device, and the time for outputting light of the wavelength, which can be returned to this node device concerned, will be described. This embodiment features that the ratio between the time for outputting light of the wavelength, which can be output from the node device to its adjacent node device, and the time for outputting light of the wavelength, which can be returned to this node device concerned, is desirably controlled to match with the traffic characteristic of the packet passing through each node device, and that the transmission efficiency of the network is improved.

For the sake of explanation, it is assumed that the connection is built such that when the packet is output from the second-directional variable wavelength transmission unit in the node device I 301 to its adjacent node device, this packet is received by the node device V 305.

In this embodiment, the band managing unit 1901 in the node device monitors the traffic characteristic by using the address of the packet passing through the node device, and desirably controls the time for outputting light of the wavelength, which can be output from this node device to its adjacent node device, and the time for outputting light of the wavelength, which can be returned to this node device concerned, on the basis of that monitored result.

It is assumed that the transmission wavelengths of the first-directional variable wavelength transmission units in the node device I 301 are controlled by the following basic pattern. Then, the transmission wavelengths of the second-directional variable wavelength transmission units in the node device II 302 necessarily come to be controlled by the same basic pattern. The basic pattern is constructed such that one wavelength control table of the group B is added following two consecutive wavelength control tables of the group A. In this case, the band managing unit 1901 in the node device I 301 takes in the packets output from the first-directional separation-insertion units (separation-insertion units I 133, III 134, V 135 and VII 136), and decodes the addresses of the packets taken in by the decoder 2201 in the band managing unit 1901. The decoder 2201 judges if the taken-in packet is to be transmitted to the adjacent node device or to be returned, on the basis of the address of the taken-in packet, and outputs its result to the band monitor 2203. The data form to be output to the band monitor 2203 is one (1) in the case of the packet to be supplied to the adjacent node device, and zero (0) in the case of the packet to be returned. This judging standard is as follows:

(1) The packet is judged to be the packet to be supplied to the adjacent node device (the output data to be output to the band monitor 2203 is 1 (one)), when the addressed receiving terminal equipment of the taken-in packet is connected to the separation-insertion unit for the directional use of transmission of this packet, and the number of relayings to be performed until the packet reaches the addressed destination node device is not larger than a half of the number of relayings needed for the packet to circulate the network once, if the transmitting terminal equipment outputs the packet to that same-directional transmission line.

(2) The packet is judged to be the packet to be returned (the output data to be output to the band monitor 2203 is 0 (zero)), when the addressed receiving terminal equipment of the taken-in packet is connected to the separation-insertion unit for the directional use of transmission of this packet, and the number of relayings to be performed until the packet reaches the addressed destination node device is not smaller than a half of the number of relayings needed for the packet to circulate the network once, if the transmitting terminal equipment outputs the packet to that same-directional transmission line.

(3) When the addressed receiving terminal equipment of the taken-in packet is not connected to the separation-insertion unit for the directional use of transmission of this packet, the number of relayings to be performed until the packet reaches the addressed destination node device connected to the receiving terminal equipment is analyzed with respect to two cases. These two cases are the case where the packet is transmitted through the transmission line for the directional use of transmission of this packet, and the case where the packet is transmitted through the transmission line for the directional use opposite to the directional use of transmission of this packet. Where the number of relayings of the packet is smaller when the packet is transmitted through the transmission line for the directional use of transmission of this packet, the packet is judged to be the packet to be transmitted to the adjacent node device (the output data to be output to the band monitor 2203 is 1 (one)). Where the number of relayings of the packet is smaller when the packet is transmitted through the transmission line for the directional use connected to the receiving terminal equipment, the packet is judged to be the packet to be returned (the output data to be output to the band monitor 2203 is 0 (zero)).

The decoder 2201 outputs the judgement result of the taken-in packet on the basis of that judging standard, to the band monitor 2203. However, the judging standard is not limited to the above standard, and the judging standard varies depending on the routing algorithm of the network system in which this node device is used.

The band monitor 2203 collects the results of the packets transmitted through the first-directional and second-directional transmission lines, and notifies the band control unit 2204 of the collected result. The data measuring time of the band monitor 2203 may be fixed or variable. For an example where the measuring time is variable, the measuring time is set to a time period obtained by multiplying the basic pattern by an integer. That is, when the basic pattern is newly set by the band control unit 2204, the measuring time becomes a time period obtained by multiplying the basic pattern by an integer.

The band control unit 2204 puts data of the judged result of the packet transmitted through the second-directional transmission line, out of the data collected by the band monitor 2203, into the packet, and outputs this packet to the adjacent node device through the second-directional transmission line to notify the band control unit 2204 in this adjacent node device of that judged result. Then, the band control unit 2204 newly sets the basic pattern on the basis of the judged result of the packet transmitted through the first-directional transmission line and the judged result of the packet transmitted through the second-directional transmission line in the adjacent node device and input through the second-directional transmission line, out of the data collected by the band monitor 2203. For example, where the ratio between the number of the packets to be transmitted to the adjacent node device and the number of the packets to be returned is 5:2 with respect to the packets transmitting the first-directional separation-insertion unit in the node device 301 and the ratio between the number of the packets to be transmitted to the adjacent node device and the number of the packets to be returned is also 5:2 with respect to the packets transmitting the second-directional separation-insertion unit in the node device 302, the band control unit 2204 begins to re-set the basic pattern (as described above, the basic pattern prior to the re-setting has the structure in which one wavelength control table of the group B is added following two successive wavelength control tables of the group A). In this case, the basic pattern is composed of five wavelength control tables of the group A and two wavelength control tables of the group B. However, there is no limitation to how to arrange those seven wavelength control tables. As an example, the basic pattern is constructed by arranging one wavelength control table of the group A, one wavelength control table of the group B, three successive wavelength control tables of the group A, one wavelength control table of the group B and one wavelength control table of the group A in this order. This is built such that there occurs no deviation to the selection of the wavelength control tables of the groups A and B when the basic pattern is circulated.

The band control unit 2204 then packets data of this new basic pattern, outputs this packet to the separation-insertion unit I 133, and notifies the adjacent node device II 302. The band control unit 2204 in the node device II 302 controls the transmission wavelengths of the second-directional variable wavelength transmission units in the node device II 302 pursuant to the new basic pattern, on the basis of that data.

The way the band control unit 2204 controls the wavelength control unit 165 and the buffer control unit 164 by using the new basic pattern will be described. The band control unit 2204 outputs the following clock count command signal to the ROM counters I 2102 and II 2103 on the basis of the new basic pattern (the basic pattern constructed by arranging one wavelength control table of the group A→one wavelength control table of the group B→three successive wavelength control tables of the group A→one wavelength control table of the group B→one wavelength control table of the group A in this order).

The band control unit 2204 outputs the clock count command signal to the ROM counter I 2102 and in synchronization therewith outputs the clock count pause command signal to the ROM counter II 2103 when reading the offset value from the wavelength control table of the group A, and outputs the clock count command signal to the ROM counter II 2103 and in synchronization therewith outputs the clock count pause command signal to the ROM counter I 2102 when reading the offset value from the wavelength control table of the group B. Therefore, the band control unit 2204 performs this operation pursuant the arrangement of the two groups constituting the basic pattern. For the sake of explanation, although the description is made with respect to the ROM counters in the wavelength control unit 165, the clock count command signal or the clock count pause command signal of the band control unit 2204 is also output to the buffer control tables (see FIGS. 21A and 21B). Thereby, the wavelength control unit 165 is synchronous with the buffer control unit 164 on the basis of the same clock count command signal or the clock count pause command signal.

At this time, the band control unit 2204 in the node device II 302 also outputs the same clock count command signal to the ROM counter III 2114 or the ROM counter IV 2115 in this node device concerned. For example, when the band control unit 2204 in the node device I 301 outputs the clock count command signal to the ROM counter I 2102 and in synchronization therewith outputs the clock count pause command signal to the ROM counter II 2103, the band control unit 2204 in the node device II 302 outputs the clock count command signal to the ROM counter III 2114 in this node device and outputs the clock count pause signal to the ROM counter IV 2115. That is, when the ROM counter I 2102 in the node device I 301 counts the clock, the ROM counter III 2114 in the node device II 302 also counts the clock.

The wavelength control unit 165 will be described. When the ROM counter I 2102 in the wavelength control unit 165 receives the clock count command signal, this ROM counter counts the clock signal of the clock generator 2102 and outputs the predetermined address value to the first-directional wavelength control table of the group A. When the ROM counter I 2102 in the wavelength control unit 165 receives the clock count pause command signal, this ROM counter stops counting the clock signal. Therefore, while the ROM counter I 2102 counts the clock, the predetermined offset value of the wavelength control table of the group A is output to the driving systems of the variable wavelength transmission units I, III, V and VII and the variable wavelength transmission unit converts the packet into the predetermined optical signal to output it to the adjacent node device. While the ROM counter II 2103 counts the clock, the predetermined offset value of the wavelength control table of the group B is output to the driving systems of the variable wavelength transmission units I, III, V and VII and the variable wavelength transmission unit converts the packet into the predetermined optical signal to return the optical signal to this node device.

Thus, the band managing unit 1901 analyzes the traffic characteristics of the packet transmitting through the first-directional transmission line of the node device and the packet transmitting through the second-directional transmission line in the adjacent node device, and re-constructs the basic pattern matched to the characteristics. The band managing unit 1901 controls the clock count of each ROM counter pursuant to that basic pattern, so that it is possible to desirably control the time for outputting light of the wavelength, at which the packet can be output to the adjacent node device, and the time for outputting light of the wavelength, at which the packet is returned to this node device.

Seventh Embodiment

In this embodiment, there is described the operation in which the node devices on the network exchanges information of band management (the number of the node devices, the traffic characteristics of the transmitted packet in each node device and the like) therebetween and the band managing unit 1901 in each node device determines the basic pattern from that information. In this embodiment, the band managing unit 1901 in each node device determines the basic pattern on the basis of the information of the number of node devices on the network. Regarding the method for enabling each node device to know the number of node devices on the network, in order to notify all the other node devices of information of a node device newly added to the network, the band control unit 2204 in the band managing unit 1901 in the newly-added node device packets that information and outputs this packet to the separation-insertion unit I 133. This packet is separated at the separation-insertion unit I 133 in the other node devices, and output to the band managing unit 1901 in each node device. The decoder 2201 recognizes the packet output to the band managing unit 1901 as the packet descriptive of data of the band management. The thus-recognized packet is output from the decoder 2201 to the band control unit 2204, and the band control unit 2204 can recognize the number of the node devices on the network.

Next, the relationship between the ratio between the time for outputting light of the wavelength, at which the packet can be output to the adjacent node device, and the time for outputting light of the wavelength, at which the packet is returned to this node device, and the number of node devices on the network will be described. The relationship is the very relationship in equilibrium obtained when observing the network for a long time.

When the relationship between the ratio between the time for outputting light of the wavelength, at which the packet can be output to the adjacent node device, and the time for outputting light of the wavelength, at which the packet is returned to this node device, and the number of the node devices is to be obtained, the following two traffic characteristics are assumed.

(a) The node device performs the switching of the packet on the basis of the address judgement standard of the packet described in the sixth embodiment.

(b) The transmitting terminal equipment randomly selects the receiving terminal equipment, and information of a predetermined amount is transmitted to each receiving terminal equipment.

The following relation (1) will be described.

Where the packet is output one by one from a certain terminal equipment to each terminal equipment on the network, the total sum of the numbers of relayings of all the packets can be expressed by the relation (1).

$$(Tn/2)\{(Nn-2)(Nn/2)/2\}+(Tn/2)(Nn/2)+(Tn/2)\{(Nn-2)(Nn/2)/2\}+ \\ (Tn/2)\{(Nn-2)(Nn/2)\}+(Tn/2)(Nn/2) \quad (1)$$

where Nn is the number of the node devices on the network and Tn is the number of terminal equipments connected to the node device (in this embodiment, Tn=8).

In the relation (1), the first and second terms represent the total sum of the numbers of relayings of the packet (excluding the number of reversals of the packet in the node device) where the connection configuration is the case (1) of the address judgement standard of the packet described in the first embodiment, the third term represents the total sum of the numbers of relayings of the packet (excluding the number of reversals of the packet in the node device) where the connection configuration is the case (2) of the address judgement standard of the packet, and the fourth and fifth terms represent the total sum of the numbers of relayings of the packet (excluding the number of reversals of the packet in the node device) where the connection configuration is the case (3) of the address judgement standard of the packet.

Where the packet is output one by one from a certain terminal equipment to each terminal equipment on the network, the total sum of the numbers of reversals of all the packets can be expressed by the following relation (2).

$$[(Tn/2)\{(Nn-2)/2\}]\times 2+[(Tn/2)(Nn-2)]+(Tn/2)+ \\ [(Tn/2)\times 1]+[(Tn-2)] \quad (2)$$

In the relation (2), the first term represents the total sum of the numbers of relayings of the packet where the connection configuration is the case (2), the second and third terms represent the total sum of the numbers of reversals of the packet where the connection configuration is the case (3), and the fourth and fifth terms represent the total sum of the numbers of reversals of the packet where the packet is transmitted from the transmitting terminal equipment to another terminal equipment in the node device connected to the transmitting terminal equipment.

The time for outputting light of the wavelength, at which the packet is returned to this node device, relative to the time for outputting light of the wavelength, at which the packet can be output to the adjacent node device, is given by the relation (2)/the relation (1). Namely, the number of the wavelength control tables of the group B relative to the number of the wavelength control tables of the group A, which constitute the basic pattern, is given by the relation (2)/the relation (1). Here, where the number of the wavelength control tables of the group A is n1 and the number of the wavelength control tables of the group B is n2 in the basic pattern, the following relation (3) can be obtained.

$$[2/(Nn-1)]-[4/\{Tn(Nn(Nn-1))\}]=(n2/n1) \quad (3)$$

Here, in the case of Nn>2, the following relation (4) can be obtained when the second term is neglected since the second term on the left side of the relation (3) is smaller than the first term thereof.

$$[2/(Nn-1)]=(n2/n1) \qquad (4)$$

Therefore, the band control unit 2204 in the band managing unit 1901 re-constructs the number of the wavelength control tables of the group A in the basic pattern and the number of the wavelength control tables of the group B from the number of the node devices on the network by using the relation (4). After the basic pattern is altered by the band control unit 2204, the band control unit 2204 in each node device controls the wavelength control unit 165 and the buffer control unit 164 pursuant to the basic pattern, similar to the first embodiment. However, the number of the wavelength control tables of the group B relative to the number of the wavelength control tables of the group A, which constitute the basic pattern, is not limited to the relation (4), but another relation can be considered by modeling the network.

Further, the band management can be constructed by combining the sixth and seventh embodiments. For example, when the network is newly built and network communication is to be performed for the first time, the band management of each node device is performed pursuant to the basic pattern described in the seventh embodiment and the basic pattern is altered as described in the sixth embodiment, as time elapses. Thus, optimum regulation of the basic pattern of each node device is performed.

In the above embodiment, there is described the example in which the number of the node devices in the network system is five, the number of the terminal equipments connected to each node device is eight, the number of the first-directional channels is four and the number of the second-directional channels is four. The present invention is not limited thereto, and those number may be smaller and larger. Further, the numbers of corresponding fixed wavelength reception units, separation-insertion units, buffers, variable wavelength transmission units and the like can be freely changed corresponding to the numbers of channels, terminal equipments and the like. Further, regarding the control in the band managing unit or means, the following control can be performed such that the data can be transmitted from the transmitter to the receiver in a short time, for example. The first-directional and second-directional channels are divided into two (2) channels and six (6) channels, and the band managing unit performs management, while in the above embodiment they are divided into a half (four channels) and a half (four channels).

As described in the foregoing, according to the transmission control method of the present invention, the ratio of the time for outputting light of the wavelength, at which the packet is returned to this node device, relative to the time for outputting light of the wavelength, at which the packet can be output to the adjacent node device, can be freely set to be matched to the traffic characteristics of the packet transmitting through each node device. Thus, the network efficiency can be improved and the transmission capacity can be increased.

Further, since relaying and returning matched to the traffic characteristics of the packet are performed, both-directional data relaying and returning can be effectively distributed in a node device. For example, where the number of the reversals in this node device concerned is much greater, the rate of obtaining the wavelengths of the variable wavelength transmission units for the reversing transmission from the first direction to the second direction is increased in the basic pattern. Where the number of transmitting packets to this node device is large, the reversing transmission to this node device is decreased. Thus, the transmission efficiency in the entire network system is improved, and the transmission time can be considerably shortened.

Eighth Embodiment

Figure 23B:
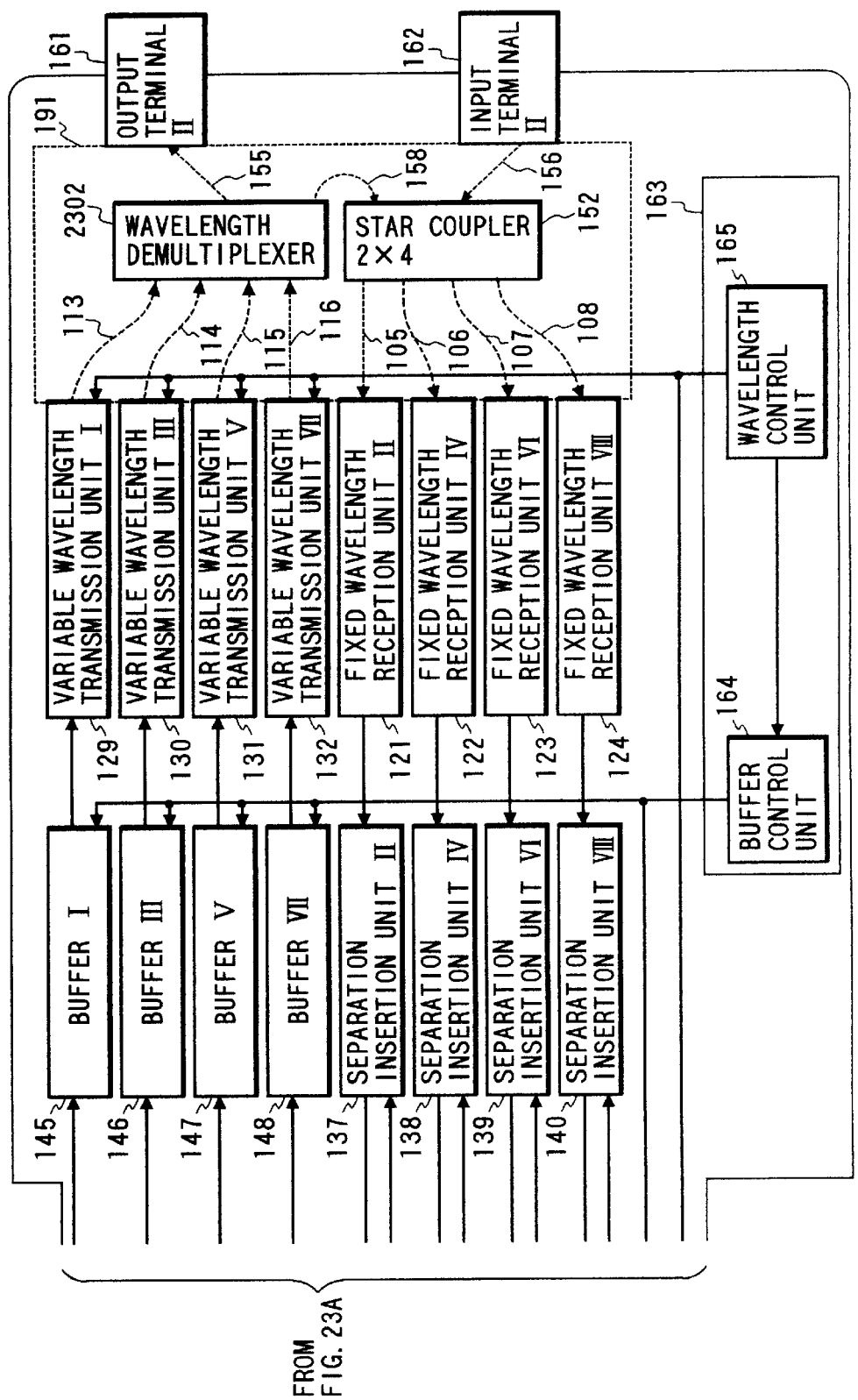
FIG. 23, which consists of FIG. 23A and FIG. 23B, is a schematic diagram of a node device illustrating an eighth embodiment according to the present invention.

In the above embodiments, each variable wavelength transmission unit (first-directional variable wavelength transmission unit) for outputting the channel to the adjacent node device on the first-directional side also outputs all the second-directional channels, but the model of the present invention is not limited thereto. In this embodiment, the first-directional variable wavelength transmission unit) outputs only one ($\lambda 8$) of the second-directional channels and the second-directional variable wavelength transmission unit) outputs only one ($\lambda 7$) of the first-directional channels. Further, in the above embodiment, the returning or reversing channel output from the first-directional variable wavelength transmission unit is divided into the adjacent node device through the star coupler. The returning channel is, however, not used in the adjacent node device. Therefore, in this embodiment, the returning channel is only guided to the fixed wavelength reception unit in this node device concerned by using the demultiplexer. Portions other than those are the same as the first embodiment, in the eighth embodiment. Further, the buffer control unit and the wavelength control unit having the structures as illustrated in FIGS. 15 and 16 are used in this embodiment. FIGS. 23A and 23B show the structure of the node device of the eighth embodiment.

Transmission functions of first-directional variable wavelength transmission units I 129, III 130, V 131 and VII 132 are the same with each other. Variable transmission wavelengths thereof are wavelengths of $\lambda 1$, $\lambda 3$, $\lambda 5$, $\lambda 7$ and $\lambda 8$. The transmission functions of second-directional variable wavelength transmission units II 125, IV 126, VI 127 and VIII 128 are the same with each other. Variable transmission wavelengths thereof are wavelengths of $\lambda 2$, $\lambda 4$, $\lambda 6$, $\lambda 7$ and $\lambda 8$.

Reference numeral 190 designates a wavelength multiplexing transmission system for transmitting the wavelength multiplexed optical signals input into the node device and optical signals transmitted from the variable wavelength transmission units in this node device, which transmits light of the second-directional transmission wavelength output from the variable wavelength transmission units II, IV, VI, VIII to an adjacent node device and transmits light of the first-directional transmission wavelength output from the adjacent node device and light of the first-directional transmission wavelength output from the variable wavelength transmission units II, IV, VI and VIII of this node device to the fixed wavelength reception units I, III, V and VII.

Reference numerals 109, 110, 111 and 112 designate optical fibers for transmitting optical signals output from the variable wavelength transmission units corresponding thereto. Reference numeral 2301 designates a demultiplexer which demultiplexes light of the first-directional transmission wavelength to the optical fiber 157 and demultiplexes light of the second-directional transmission wavelength to the optical fiber 154, out of the signals transmitted through the optical fibers 109, 110, 111 and 112. Reference numeral 160 designates an output terminal I which outputs the wavelength multiplexed light transmitted through the optical fiber 154. Reference numeral 159 designates an input terminal I for wavelength multiplexed optical signals output from the adjacent node device. Reference numeral 153 designates an optical fiber for transmitting the wavelength multiplexed optical signals input through the input terminal I 159. Reference numeral 149 designates a 2×4 star coupler (two inputs and four outputs) which combines or multiplexes the optical signals transmitted through the optical fibers 153 and 157 and divides the combined one into the optical fibers 101, 102, 103 and 104.

Reference numeral 191 also designates a wavelength multiplexing transmission system having the same structure as the wavelength multiplexing transmission system. Reference numerals 105, 106, 107 and 108 designate optical fibers corresponding to the optical fibers 101, 102, 103 and 104 in the wavelength multiplexing transmission system 190. Reference numerals 113, 114, 115 and 116 designate optical fibers corresponding to the optical fibers 109, 110, 111 and 112 in the wavelength multiplexing transmission system 190. Reference numeral 2302 designates a demultiplexer. Reference numeral 152 designates a 2×4 star coupler corresponding to the 2×4 star coupler 149.

Thus, the demultiplexer and the 2×4 star coupler are connected by the optical fibers as illustrated in FIG. 23, so that when any of the variable wavelength transmission units II 125, IV 126, VI 127 and VIII 128 outputs the optical signal of the wavelength λ7, the optical signal of the wavelength λ7 is demultiplexed into the optical fiber 157 by the demultiplexer 2307, divided or branched into the optical fibers 101, 102, 103 and 104 by the 2×4 star coupler 149 and only received by the fixed wavelength reception unit VII 120. Similarly, when any of the variable wavelength transmission units I 129, III 130, V 131 and VII 132 outputs the optical signal of the wavelength λ8, the optical signal of the wavelength λ8 is demultiplexed into the optical fiber 158 by the demultiplexer 2302, divided or branched into the optical fibers 105, 106, 107 and 108 by the 2×4 star coupler 152 and only received by the fixed wavelength reception unit VIII 124. Namely, the optical signals of the wavelengths λ2, λ4, λ6 and λ8 output from the variable wavelength transmission units II 125, IV 126, VI 127 and VIII 128 are output from the output terminal I 160 and transmitted to the adjacent node device on the upstream side, while the optical signal of the wavelength λ7 is received by the fixed wavelength reception unit VII 120 in this node device concerned. Further, the optical signals of the wavelengths λ1, λ3, λ5 and λ7 output from the variable wavelength transmission units I 129, III 130, V 131 and VII 132 are output from the output terminal II 161 and transmitted to the adjacent node device on the downstream side, while the optical signal of the wavelength λ8 is received by the fixed wavelength reception unit VIII 124 in this node device concerned. This means that when the variable wavelength transmission unit outputs the optical signal of the predetermined wavelength, this optical signal can be received by the fixed wavelength reception unit disposed on the same side of this node device (i.e., the function of reversing the transmission direction of the optical signal).

Table 9 shows the contents of the wavelength control tables I to VIII of this embodiment and shows the transition of the wavelengths of the optical signals to be transmitted by the variable wavelength transmission units. Here, numbers of each wavelength control table other than the address numbers indicate the affixed numbers of the wavelengths λ1 to λ8.

TABLE 9

| Table name | Address | | | | | | | | | | | |
|---|---|---|---|---|---|---|---|---|---|---|---|---|
|  | 0 | 1 | 2 | 3 | 4 | 5 | 6 | 7 | 8 | 9 | 10 | 11 |
| Wavelength control table I | 1 | 5 | 7 | 3 | 1 | 5 | 7 | 3 | 1 | 5 | [8] | 3 |
| Wavelength control table III | 5 | 7 | 3 | 1 | 5 | 7 | 3 | 1 | 5 | [8] | 3 | 1 |
| Wavelength control table V | 7 | 3 | 1 | 5 | 7 | 3 | 1 | 5 | [8] | 3 | 1 | 5 |
| Wavelength control table VII | 3 | 1 | 5 | 7 | 3 | 1 | 5 | [8] | 3 | 1 | 5 | 7 |
| Wavelength control table II | 2 | 6 | 8 | 4 | 2 | 6 | 8 | 4 | 2 | 6 | [7] | 4 |
| Wavelength control table IV | 6 | 8 | 4 | 2 | 6 | 8 | 4 | 2 | 6 | [7] | 4 | 2 |
| Wavelength control talbe VI | 8 | 4 | 2 | 6 | 8 | 4 | 2 | 6 | [7] | 4 | 2 | 6 |
| Wavelength control table VIII | 4 | 2 | 6 | 8 | 4 | 2 | 6 | [7] | 4 | 2 | 6 | 8 |

Table 10 shows the offset values of the buffer control tables I to VIII.

TABLE 10

| Table name | Address | | | | | | | | | | | |
|---|---|---|---|---|---|---|---|---|---|---|---|---|
|  | 0 | 1 | 2 | 3 | 4 | 5 | 6 | 7 | 8 | 9 | 10 | 11 |
| Buffer control table I | A1 | A5 | A7 | A3 | A1 | A5 | A7 | A3 | A1 | A5 | [A8] | A3 |
| Buffer control table III | A5 | A7 | A3 | A1 | A5 | A7 | A3 | A1 | A5 | [A8] | A3 | A1 |
| Buffer control table V | A7 | A3 | A1 | A5 | A7 | A3 | A1 | A5 | [A8] | A3 | A1 | A5 |
| Buffer control table VII | A3 | A1 | A5 | A7 | A3 | A1 | A5 | [A8] | A3 | A1 | A5 | A7 |
| Buffer control table II | A2 | A6 | A8 | A4 | A2 | A6 | A8 | A4 | A2 | A6 | [A7] | A4 |
| Buffer control table IV | A6 | A8 | A4 | A2 | A6 | A8 | A4 | A2 | A6 | [A7] | A4 | A2 |
| Buffer control talbe VI | A8 | A4 | A2 | A6 | A8 | A4 | A2 | A6 | [A7] | A4 | A2 | A6 |
| Buffer control table VIII | A4 | A2 | A6 | A8 | A4 | A2 | A6 | [A7] | A4 | A2 | A6 | A8 |

In each table, the wavelength control tables I, III, V and VII are all read out synchronously by the ROM counter 702. The wavelength control tables II, IV, VI and VIII are all read out synchronously by the ROM counter 1602. Thus, the transmission wavelengths of the respective tunable laser diodes (TLDs) are shifted and circulated in the order of λ1, λ5, λ7, λ3, λ1, λ5, λ7, λ3, λ1, λ5, λ8 and λ3, and the offset value for reading the memory regions in the dual port memory 405 of the buffers I, III, V and VII connected to each tunable laser diode (TLD) is circulated in the order A1, A5, A7, A3, A1, A5, A7, A3, A1, A5, A8 and A3, which is synchronous with the transition of the transmission wavelength of each variable wavelength transmission unit. Therefore, in accordance with the wavelength control tables and the buffer control tables, the packets in the memory regions corresponding to the shifted and circulated transmission wavelengths of the variable wavelength transmission units are converted into optical signals at transmission wavelengths of the respective variable wavelength transmission units at respective times and output therefrom. Further, circulations of the transmission wavelengths of the respective variable wavelength transmission units I, III, V and VII are shifted from each other in phase such that those variable wavelength transmission units do not perform transmissions at the same wavelength.

Further, as is known from FIGS. 23A and 23B, the optical signal of the wavelength $\lambda 8$ output from the first-directional variable wavelength transmission unit in the node device 100 is received by the second-directional fixed wavelength reception unit VIII 124 in this node device 100. The optical signal of the wavelength $\lambda 8$ output from the second-directional variable wavelength transmission unit in the adjacent node device, which receives the optical signal output from the first-directional variable wavelength transmission unit in the node device 100, is also received by the second-directional fixed wavelength reception unit VIII in this node device 100. Therefore, the wavelength control unit in each node device needs to control the transmission wavelength of each variable wavelength transmission unit such that the first-directional variable wavelength transmission unit in the node device 100 and the second-directional variable wavelength transmission unit in the node device, which receives the optical signal output from that first-directional variable wavelength transmission unit, do not output the optical signal at the same wavelength simultaneously. In this control method of the transmission wavelength, each node device has completely the same transmission wavelength control tables, and the transmission wavelengths of the first-directional and second-directional variable wavelength transmission units in each node device are controlled pursuant to the transmission wavelength control tables circulated with the same phase. Specifically, the control signal 1 (address number value 0) for setting the transmission wavelength to $\lambda 1$ is input into the variable wavelength transmission unit I 129 pursuant to the transmission wavelength control table, the variable wavelength transmission unit I 129 converts the bit row (discriminative signal) for showing the head of the transmission wavelength control table into the output light of the wavelength $\lambda 1$ and notifies the adjacent node device of the phase (address value for reading the table) of the transmission wavelength control table of this node device. Therefore, the wavelength control unit 165 in the node device analyzes the phase of the transmission wavelength control table for the first-directional variable wavelength transmission unit I 129 in the adjacent node device from the discriminative signal showing the head of the wavelength control table for controlling the first-directional variable wavelength transmission unit, and matches the phase of the transmission wavelength control pattern for the second-directional variable wavelength transmission unit in this node device concerned to the analyzed phase. Thus, the transmission wavelength $\lambda 8$ from the first-directional variable wavelength transmission unit in this node device and the transmission wavelength $\lambda 8$ from the second-directional variable wavelength transmission unit in the adjacent node device, to which that first-directional variable wavelength transmission unit outputs the optical signal, are output at mutually-different times. Hence, the transmission wavelength from the first-directional variable wavelength transmission unit in this node device and the transmission wavelength from the second-directional variable wavelength transmission unit in the adjacent node device are all controlled to be set to different wavelengths.

The transmission control method in this network system will be described with reference to Tables 9 and 10.

[Example of Transmission Object]

In the description of the transmission control method, followings are assumed: In this embodiment, the circulation in the counter-clockwise direction is called the second direction, and the circulation in the clockwise direction is called the first direction. The connection is built such that the optical signal output from the second-directional variable wavelength transmission unit in the node device I 301 reaches the second-directional fixed wavelength reception unit in the node device II 302 and the optical signal output from the first-directional variable wavelength transmission unit in the node device I 301 reaches the first-directional fixed wavelength reception unit in the node device V 305.

The transmission control method of this network system will be described on the assumption of the transmission lines of two packets as follows: The packet I is a packet to be transmitted from the terminal equipment I 174 connected to the node device I 301 to the terminal equipment II 175 connected to the node device II 302. The packet II is a packet to be transmitted from the terminal equipment I 174 connected to the node device I 301 to the terminal equipment III 176 connected to the node device V 305.

Figure 24A:
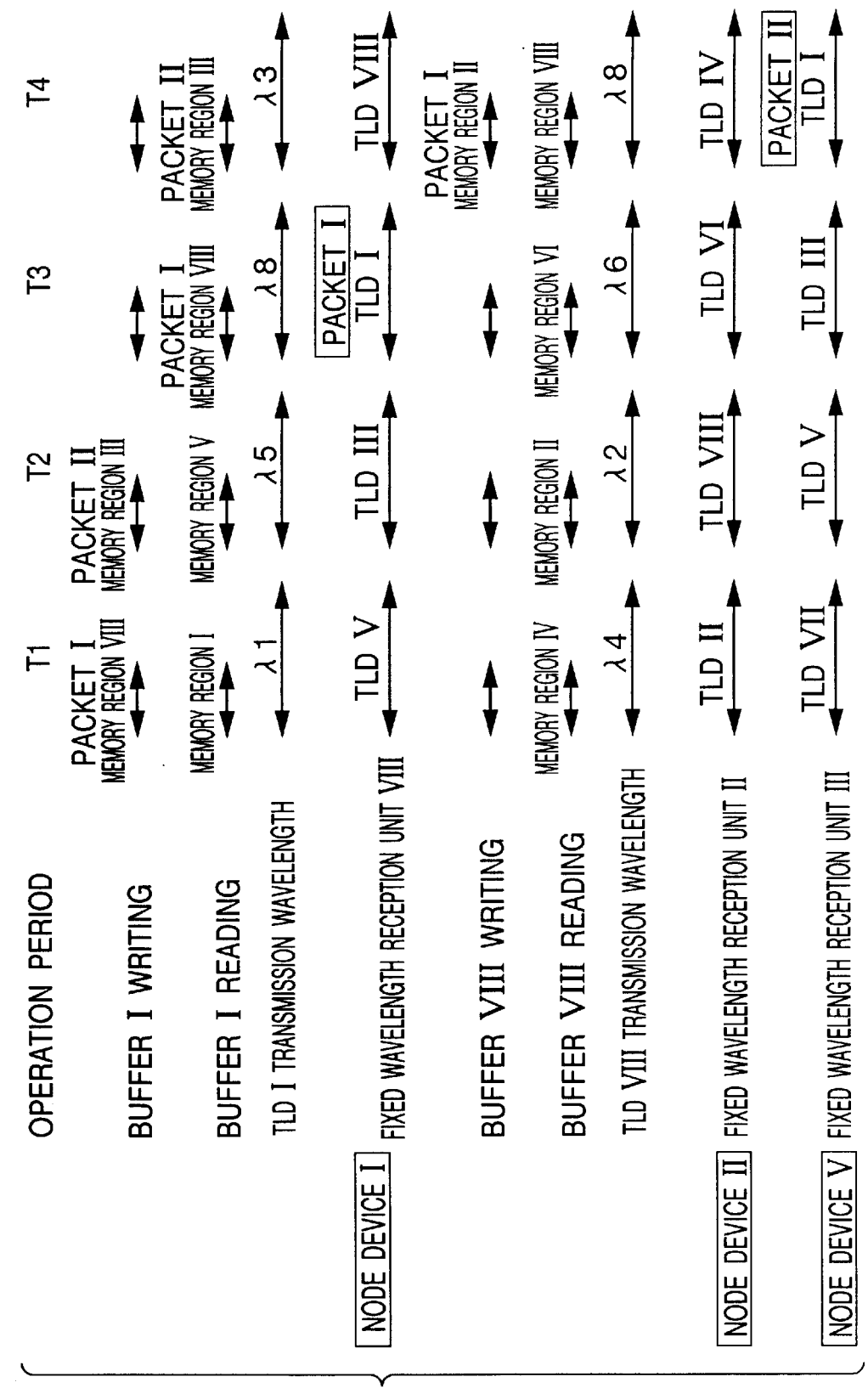
FIG. 24A and FIG. 24B are time charts illustrating the eighth embodiment according to the present invention.
Figure 24B:
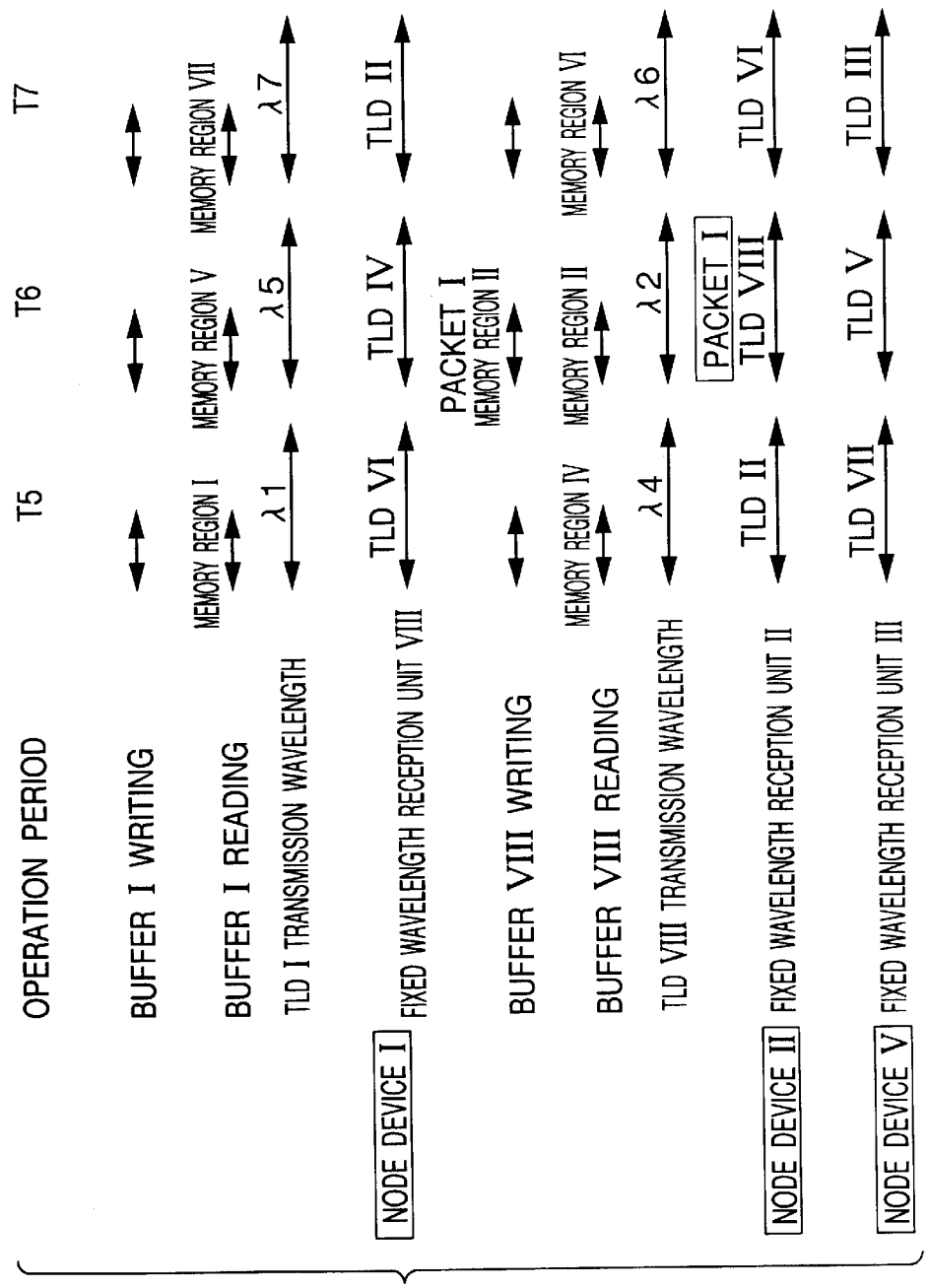

Further, the address values (synchronization signals) from the ROM counters 702 and 1602 for reading buffer control tables and wavelength control tables in the node device I 301 are assumed to be eight (8) in the operation period T1 illustrated in FIGS. 24A and 24B, for the sake of explanation. Therefore, it is assumed that address values from the ROM counters 702 and 1602 during operation periods T2, T3, . . . , T6 and T7 are respectively 9, 10, 11, 0, 1 and 2.

The communication operation of the node device I 301 will be described referring to the time chart of FIGS. 24A and 24B hereinafter. In the beginning of the operation period T1, the transmitting terminal equipment I 174 connected to the node device I 301 adds to the transmission data the address of the addressed terminal equipment II 175 connected to the node device II 302, and outputs the packet I to the separation-insertion unit I 133 of the node device I 301 through the sub-transmission line I 166.

During the operation period T1, the separation-insertion unit I 133 of the node device I 301 finds a break in the packet stream to be received by the fixed wavelength reception unit I 117, inserts into this break the packet I input through the sub-transmission line I 166 and outputs it to the buffer I 145. The decoder 401 in the buffer I 145 reads the address portion of the input packet I. The destination for receiving the packet I is the terminal equipment II 175 connected to the node device II 302, so that the decoder 401 sets such that the demultiplexer 404 outputs to the dual port memory 405 and outputs the predetermined writing start address value A8 of the packet I to the writing address counter 402. The writing address counter 402 thus starts with the writing start address value A8 of the packet I and outputs the address of the memory region VIII, in which the packet is to be written, to the dual port memory 405 in order. The predetermined writing start address value of the packet I in the dual port memory 405 is A8 because the transmission direction of the packet I is to be changed. That is, if the packet I is transmitted in the first direction, the packet is relayed and transmitted in the node devices V 305, IV 304 and III 303 and the transmission delay occurs. Therefore, it is better to change the transmission direction of the packet I. In order to change the transmission direction of the packet I, the packet only needs to be converted into the optical signal of the wavelength for reversal. In the case of the packet to be transmitted in the first direction, the packet only needs to be converted into the optical signal of the wavelength λ8. In the case of the packet to be transmitted in the second direction, the packet only needs to be converted into the optical signal of the wavelength λ7. For example, when the packet I is converted into the optical signal of the wavelength λ8 and output by the variable wavelength transmission unit I 129, this optical signal is demultiplexed from the optical signals of the wavelengths λ1, λ2, λ3, λ5 and λ7 by the demultiplexer 2302, output to the optical fiber 158 and received by the second-directional fixed wavelength reception unit VIII. Thus, the transmission direction is changed. Therefore, the packet I is stored in the memory region VIII in the dual port memory 405 of the buffer I 145 and read and converted into the optical signal of the wavelength λ8 only when the transmission wavelength of the variable wavelength transmission unit I 129 connected to the buffer I 145 is controlled to be the wavelength λ8. Thus, the transmission direction of the packet is altered.

Further, during the dual port memory reading period Td in the operation period T1, the ROM counter 702 of the wavelength control unit 165 first outputs the reading address value 8 to the wavelength control tables I, III, V and VII, and synchronously therewith the ROM counter 1602 outputs the reading address value 8 to the wavelength control tables II, IV, VI and VIII. The contents of the respective wavelength control tables are output by this address value. From the wavelength control table I 703, the control signal 1 corresponding to the wavelength λ1 is output to the variable wavelength transmission unit I 129, and the transmission wavelength of the variable wavelength transmission unit I 129 is set to the wavelength λ1. Likewise, the transmission wavelength of the variable wavelength transmission unit II 125 is set to the wavelength λ2 by the control signal 2 from the wavelength control table II 704, which corresponds to the wavelength λ2. In synchronization with the output of the reading address value from the ROM counters 702 and 1602, the reading control units 1501 and 1502 in the buffer control unit 164 output to the selector 407 the control signal of reading permission of the dual port memory 405 and reading prohibition of the FIFO 406. Based thereon, the selector 407 connects the dual port memory 405 to the variable wavelength transmission unit.

Further, the offset values in the buffer control tables I, III, V and VII are read by the reading address value 8 of the ROM counter 702 in the wavelength control unit 165, and output to the reading address counter 403 of the corresponding buffers I, III, V and VII. Each reading address counter 403 performs the loading of the offset value, and supplies the address of the memory region to the dual port memory 405 by performing an increment of the counter in due order. Each dual port memory 405 outputs the packet in the memory region designated by the address to the corresponding variable wavelength transmission unit. Similarly, the offset values in the buffer control tables II, IV, VI and VIII are read by the reading address value 8 of the ROM counter 1602 in the wavelength control unit 165, and output to the reading address counter 403 of the corresponding buffers II, IV, VI and VIII. Each reading address counter 403 performs the loading of the offset value, and supplies the address of the memory region to the dual port memory 405 by performing an increment of the counter in due order. Each dual port memory 405 outputs the packet in the memory region designated by the address to the corresponding variable wavelength transmission unit.

During the FIFO reading period Tf in the operation period T1, the reading control units 1501 and 1502 in the buffer control unit 164 output to the selector 407 the control signal of reading permission of the FIFO 406 and reading prohibition of the dual port memory 405. Based thereon, the selector 407 outputs the packet stored in the FIFO 406 to the variable wavelength transmission unit. In this embodiment, during each operation period T, the transmission wavelength of each variable wavelength transmission unit remains unchanged irrespective of the periods Tf and Td.

Similarly, in the beginning of the operation period T2, the transmitting terminal equipment I 174 adds to the transmission data the address of the addressed terminal equipment III 176 connected to the node device V 305, and outputs the packet II to the separation-insertion unit I 133 of the node device I 301 through the sub-transmission line I 166. The separation-insertion unit I 133 of the node device I 301 finds a break in the packet stream to be received by the fixed wavelength reception unit I 117, inserts into this break the packet II input through the sub-transmission line I 166 and outputs it to the buffer I 145. The decoder 401 in the buffer I 145 reads the address portion of the input packet II. The destination for receiving the packet II is the terminal equipment III 176 connected to the node device V 305 and hence the packet II passes the channel alteration unit (variable wavelength transmission unit) only one more time until reaching the destination, so that the decoder 401 sets such that the demultiplexer 404 outputs to the dual port memory 405, which stores the packet to be output with its channel being designated, and outputs the predetermined writing start address value A3 of the packet II to the writing address counter 402. The writing address counter 402 thus starts with the writing start address value A3 of the packet II and outputs the address of the memory region III, in which the packet is to be written, to the dual port memory 405 in order. The predetermined writing start address value of the packet II in the dual port memory 405 is A3 because the packet II is the packet transmitted to the terminal equipment III 176 connected to the adjacent node device V 305. Since the terminal equipment III 176 is connected to the separation-insertion unit III 134 in the node device V 305, the packet II should be converted into the optical signal of the wavelength λ3 and received by the fixed wavelength reception unit III 118 connected to the separation-insertion unit III 134 in the node device V 305 in order that the packet II reaches the terminal equipment III 176.

Reading of the packet I from the buffer I 145 and its transmission during the operation period T3 will be described. The reading address value 10 is simultaneously output to the wavelength control tables I, III, V and VII from the ROM counter 702 in the wavelength control unit 165. The contents of the wavelength control table I 703 is read by this address value, the control signal of the transmission wavelength λ8 is output to the variable wavelength transmission unit I 129 and the transmission wavelength of the variable wavelength transmission unit I 129 is controlled to be the wavelength λ8. During the dual port memory reading period Td, the reading address counter 403 in the buffer I 145 performs the loading of the offset value A8 output from the buffer control table I 601, generates the address for reading the packet written in the memory region VIII by performing an increment of the counter in due order, and outputs the address to the dual port memory 405. The packet I stored in the memory region VIII is read from the output port of the dual port memory 405 by this reading address, and packet I is converted into the optical signal of the wavelength λ8 by the variable wavelength transmission unit I 129 to be output therefrom.

During the FIFO reading period Tf in the operation period T3, the reading control units 1501 and 1502 output to the selector 407 in each buffer the control signal of reading permission of the FIFO and reading prohibition of the dual port memory. Based thereon, the selector 407 outputs the packet stored in the FIFO 406 to the variable wavelength transmission unit. The packet output to each variable wavelength transmission unit is converted into the optical signal of the transmission wavelength of this variable wavelength transmission unit to be output therefrom.

The transmission of the packet I converted into the optical signal of the wavelength λ8 in the wavelength multiplexing transmission system 191 will be described. The packet I of the optical signal of the wavelength λ8 output from the variable wavelength transmission unit I 129 to the wavelength multiplexing transmission system 191 is transmitted through the optical fiber 113, thereafter demultiplexed from the optical signals of the wavelengths λ1, λ3, λ5 and λ7 and output to the optical fiber 158. The packet I of the optical signal of the wavelength λ8 output to the optical fiber 158 is output to the fixed wavelength reception units II 121 to VIII 124 respectively connected to the optical fibers 105, 106, 107 and 108, at the 2×4 coupler 152. Since the fixed wavelength reception units II, IV, VI and VIII respectively receive only the optical signals of the wavelengths λ2, λ4, λ6 and λ8, the packet I of the optical signal of the wavelength λ8 is received by the fixed wavelength reception unit VIII 124. As a result, the optical signal of the wavelength λ8 output from each variable wavelength transmission unit connected to the wavelength multiplexing transmission system 191 in the node device I 201 is returned in the wavelength multiplexing transmission system 191 and received by the fixed wavelength reception unit VIII 124 in this node device concerned I 301.

During the operation period T4, the packet I is separated from the packet to be transmitted to the terminal equipment VIII 181, by the separation-insertion unit VIII 140, and supplied to the buffer VIII 144. The decoder 401 in the buffer VIII 144 reads the address portion of the input packet I. The destination for receiving the packet I is the terminal equipment II 175 connected to the node device II 302, so that the decoder 401 sets such that the demultiplexer 404 outputs to the dual port memory 405, and outputs the predetermined writing start address value A2 of the packet I to the writing address counter 402. The writing address counter 402 thus starts with the writing start address value A2 of the packet I and outputs the address of the memory region II, in which the packet is to be written, to the dual port memory 405 in order. The predetermined writing start address value of the packet I in the dual port memory 405 is A2 because the packet I is the packet transmitted to the terminal equipment II 175 connected to the adjacent node device II 302. Since the terminal equipment II 175 is connected to the separation-insertion unit II 137 in the node device II 302, the packet I should be converted into the optical signal of the wavelength λ2 and received by the fixed wavelength reception unit II 121 connected to the separation-insertion unit II 137 in the node device II 302 in order that the packet I reaches the terminal equipment II 175.

Reading of the packet II from the buffer I 145 and its transmission during the operation period T4 will be described. The reading address value 11 is simultaneously output to the wavelength control tables I, III, V and VII from the ROM counter 702 in the wavelength control unit 165. The contents of the wavelength control table I 703 is read by this address value, the control signal 3 of the transmission wavelength λ3 is output to the variable wavelength transmission unit I 129 and the transmission wavelength of the variable wavelength transmission unit I 129 is controlled to be the wavelength λ3.

During the dual port memory reading period Td in the operation period T4, the reading address counter 403 in the buffer I 145 performs the loading of the offset value A3 output from the buffer control table I 601, generates the address for reading the packet written in the memory region VIII by performing an increment of the counter in due order, and outputs the address to the dual port memory 405. The packet II stored in the memory region VIII is read from the output port of the dual port memory 405 by this reading address, and packet II is converted into the optical signal of the wavelength λ3 by the variable wavelength transmission unit I 129 to be output therefrom.

The packet II of the optical signal of the wavelength λ3 output from the variable wavelength transmission unit I 129 to the wavelength multiplexing transmission system 191 during the operation period T4 is transmitted through the optical fiber 113, and thereafter demultiplexed into the optical fiber 155 by the demultiplexer 2302. The packet II of the optical signal of the wavelength λ3 output to the optical fiber 155 is transmitted through the optical fiber 200 and input into the node device V 305. The packet II of the optical signal of the wavelength λ3 input into the node device V 305 is divided into the optical fibers 101, 102, 103 and 104 by the 2×4 coupler 149, and output to the fixed wavelength reception units I 117, III 118, V 119 and VII 120 respectively connected to the optical fibers 101, 102, 103 and 104. Since the fixed wavelength reception unit, which can receive the optical signal of the wavelength λ3, is the fixed wavelength reception unit III 118, the packet II of the optical signal of the wavelength λ3 is received by the fixed wavelength reception unit III 118 and output to the terminal equipment III 176 by the separation-insertion unit III 134.

Reading of the packet I from the buffer VIII 144 and its transmission during the operation period T6 will be described. The reading address value 1 is simultaneously output to the wavelength control tables II, IV, VI and VIII from the ROM counter 1602 in the wavelength control unit 165. The contents of the wavelength control table VIII 710 is read by this address value, the control signal 2 of the transmission wavelength λ2 is output to the variable wavelength transmission unit VIII 128 and the transmission wavelength of the variable wavelength transmission unit VIII 128 is controlled to be the wavelength λ2.

During the dual port memory reading period Td in the operation period T6, the reading address counter 403 in the buffer VIII 144 performs the loading of the offset value A2 output from the buffer control table VIII 608, generates the address for reading the packet written in the memory region II by performing an increment of the counter in due order, and outputs the address to the dual port memory 405. The packet I stored in the memory region II is read from the output port of the dual port memory 405 by this reading address, and packet I is converted into the optical signal of the wavelength λ2 by the variable wavelength transmission unit VIII 128 to be output therefrom.

The packet I of the optical signal of the wavelength λ2 output from the variable wavelength transmission unit VIII 128 is transmitted through the optical fiber 112, and thereafter demultiplexed into the optical fiber 154 by the demultiplexer 2301. The packet I of the optical signal of the wavelength λ2 output to the optical fiber 154 is transmitted through the optical fiber 201 and input into the node device II 302. The packet I of the optical signal of the wavelength λ2 input into the node device II 302 is divided into the optical fibers 105, 106, 107 and 108 by the 2×4 coupler 152, and output to the fixed wavelength reception units II 121, IV 122, VI 123 and VIII 124 respectively connected to the optical fibers 105, 106, 107 and 108. Since the fixed wavelength reception unit, which can receive the optical signal of the wavelength λ2, is the fixed wavelength reception unit II 121, the packet I of the optical signal of the wavelength λ2 is received by the fixed wavelength reception unit II 121 and output to the terminal equipment II 175 by the separation-insertion unit II 137.

Ninth Embodiment

Figure 25B:
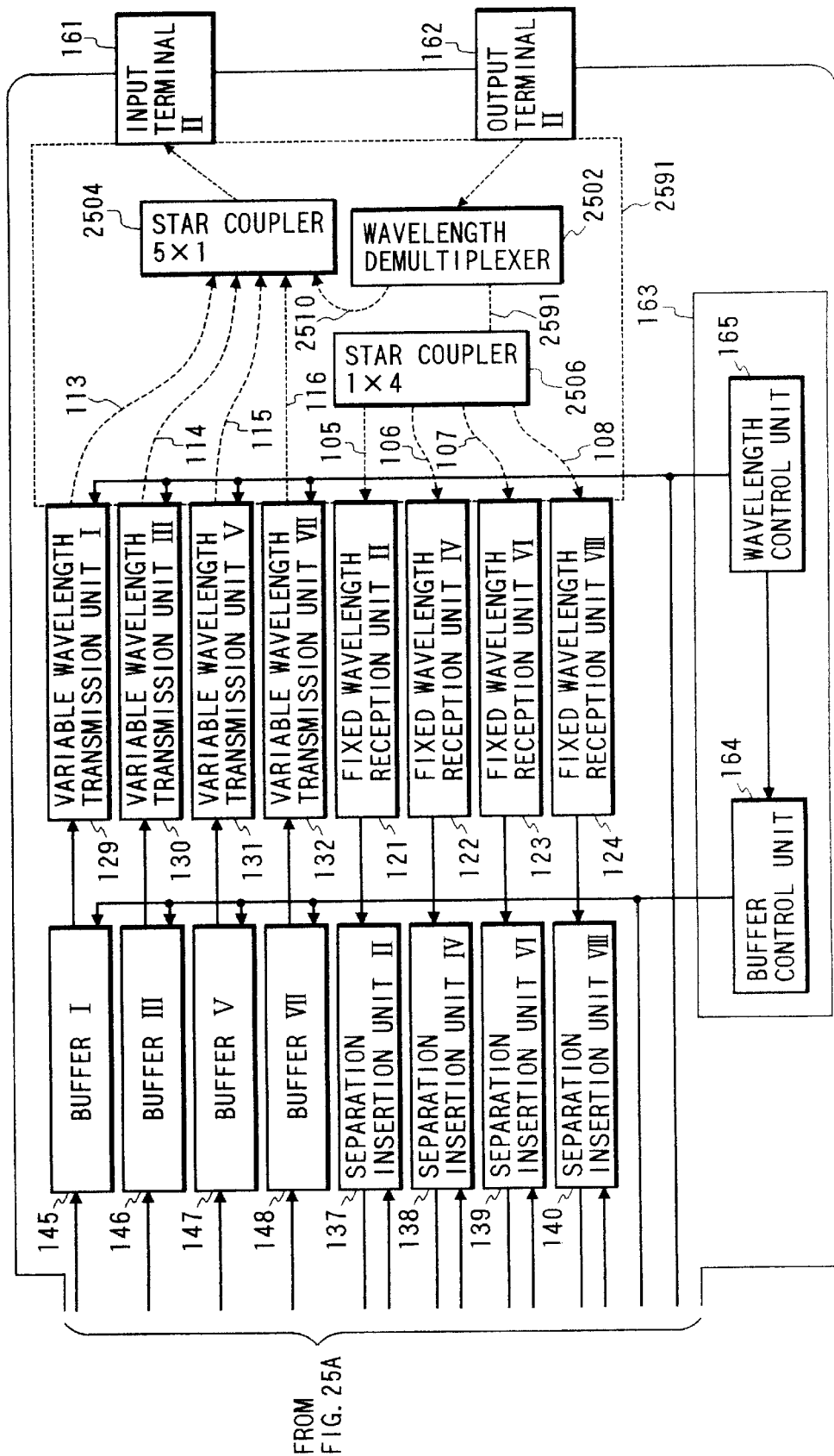
FIG. 25, which consists of FIG. 25A and FIG. 25B, is a schematic diagram of a node device illustrating a ninth embodiment according to the present invention.

FIGS. 25A and 25B show a ninth embodiment of the node device of the present invention. This embodiment is different from the eighth embodiment in the structure for reversing the packet. Functions of the fixed wavelength reception units, separation-insertion units, buffers, variable wavelength transmission units, wavelength control unit and buffer control unit in the ninth embodiment are the same as those of the eighth embodiment.

The portion for performing the reversal of the packet will be described. In the above embodiment, the transmission direction of the packet of the optical signal (for example, the wavelength λ8 in the eighth embodiment) output from the first-directional variable wavelength transmission unit in this node device and needed to be changed of its transmission direction is changed in the wavelength multiplexing transmission system in this node device concerned. The transmission direction of the optical signal of the wavelength for reversing use (for example, the wavelength λ7 in the eighth embodiment) output from the second-directional variable wavelength transmission unit is also changed in the wavelength multiplexing transmission system in this node device concerned. In the ninth embodiment, the wavelength multiplexing transmission system in the node device is constructed such that the reversal of the optical signals of the wavelength for reversing use output from the first-directional and second-directional variable wavelength transmission units is performed in the respective adjacent node devices which those signals reach. The connection configuration between the node devices is determined such that the output terminal II 161 and the input terminal II 162 in one node device are respectively connected to the input terminal I 159 and the output terminal I 160 in the other node device, similar to the eighth embodiment.

The structure of the node device in the ninth embodiment will be described.

As is known from FIGS. 25A and 25B, the group of the fixed wavelength reception units arranged for the communication in the first direction consists of the fixed wavelength reception units I 117, III 118, V 119 and VII 120 which respectively receive optical signals of the wavelengths λ1, λ3, λ5 and λ7. The group of the fixed wavelength reception units arranged for the communication in the second direction consists of the fixed wavelength reception units II 121, IV 122, VI 123 and VIII 124 which respectively receive optical signals of the wavelengths λ2, λ4, λ6 and λ8.

Reference numeral 2590 designates the wavelength multiplexing transmission system for transmitting the wavelength multiplexed optical signal input into the node device and the optical signal transmitted from the variable wavelength transmission unit in this node device concerned. In this transmission system 2590, the optical signal of the second-directional transmission wavelength of the wavelength multiplexed light output from the variable wavelength transmission units I, III, V and VII in the adjacent node device directly connected to the wavelength multiplexing transmission system 2590 is reversed and supplied again to that adjacent node device, the remaining optical signal of the first-directional transmission wavelength is divided into the fixed wavelength reception units I, III, V and VII in this node device, and the optical signal output from the variable wavelength transmission units II, IV, VI and VIII in this node device is output to the adjacent node device directly connected to the wavelength multiplexing transmission system 2590.

Reference numeral 2501 designates the wavelength demultiplexer which demultiplexes into the optical fiber 2509 the optical signal of the second-directional transmission wavelength of the wavelength multiplexed light output from the variable wavelength transmission units I, III, V and VII in the adjacent node device directly connected to the wavelength multiplexing transmission system 2590 and demultiplexes the optical signal of the first-directional transmission wavelength into the optical fiber 2507. Reference numeral 2503 designates the 5×1 star coupler which combines the wavelength multiplexed optical signal output from the variable wavelength transmission units II, IV, VI and VIII in this node device with the optical signal of the second-directional transmission wavelength demultiplexed by the wavelength demultiplexer 2501, and supplies the combined one to the adjacent node device. Reference numeral 2505 designates the 1×4 star coupler which divides the optical signal of the first-directional transmission wavelength output from the adjacent node device and demultiplexed by the wavelength demultiplexer 2501 into the fixed wavelength reception units I, III, V and VII.

Reference numeral 2591 also designates the wavelength multiplexing transmission system for transmitting the wavelength multiplexed optical signal input into the node device and the optical signal transmitted from the variable wavelength transmission unit in this node device concerned. In this transmission system 2591, the optical signal of the first-directional transmission wavelength of the wavelength multiplexed light output from the variable wavelength transmission units II, IV, VI and VIII in the adjacent node device directly connected to the wavelength multiplexing transmission system 2591 is reversed and supplied again to that adjacent node device, the remaining optical signal of the second-directional transmission wavelength is divided into the fixed wavelength reception units I, III, V and VII in this node device, and the optical signal output from the variable wavelength transmission units I, III, V and VI in this node device is output to the adjacent node device directly connected to the wavelength multiplexing transmission system 2591.

Reference numeral 2502 designates the demultiplexer which demultiplexes into the optical fiber 2510 the optical signal of the first-directional transmission wavelength of the wavelength multiplexed light output from the variable wavelength transmission units II, IV, VI and VIII in the adjacent node device directly connected to the wavelength multiplexing transmission system 2591 and demultiplexes the optical signal of the second-directional transmission wavelength into the optical fiber 2508. Reference numeral 2504 designates the 5×1 star coupler which combines the wavelength multiplexed optical signal output from the variable wavelength transmission units I, III, V and VII in this node device with the optical signal of the first-directional transmission wavelength demultiplexed by the demultiplexer 2502, and supplies the combined one to the adjacent node device. Reference numeral 2506 designates the 1×4 star coupler which divides the optical signal of the second-directional transmission wavelength output from the adjacent node device and demultiplexed by the demultiplexer 2502 into the fixed wavelength reception units II, IV, VI and VIII.

The reversal of the optical signal in the wavelength multiplexing transmission system will be described. Similar to the eighth embodiment, the first-directional wavelengths are wavelengths $\lambda 1$, $\lambda 3$, $\lambda 5$ and $\lambda 7$, the second-directional wavelengths are wavelengths $\lambda 2$, $\lambda 4$, $\lambda 6$ and $\lambda 8$, the wavelength to be used for returning the packet from the first direction to the second direction is the wavelength $\lambda 8$, and the wavelength to be used for returning the packet from the second direction to the first direction is the wavelength $\lambda 7$. For example, it is assumed that the variable wavelength transmission unit I in the node device I 301 converts the packet B into the optical signal of the wavelength $\lambda 8$ and outputs it therefrom. The packet B of the optical signal of the wavelength $\lambda 8$ output from the variable wavelength transmission unit I 129 to the wavelength multiplexing transmission system 2591 is transmitted through the optical fiber 113, thereafter combined with the optical signal output from other variable wavelength transmission unit by the 5×1 star coupler 2504, and output from the output terminal II 161 to the adjacent node device. The packet B of the optical signal of the wavelength $\lambda 8$ output to the adjacent node device is demultiplexed from the optical signals of the first-direction transmission wavelengths $\lambda 1$, $\lambda 3$, $\lambda 5$ and $\lambda 7$ by the demultiplexer 2501 in the wavelength multiplexing transmission system 2590 in the adjacent node device, and output to the 5×1 star coupler 2509. The packet B is combined with the optical signals output from the variable wavelength transmission units II, IV, VI and VIII by the 5×1 star coupler 2503, and again transmitted to the transmitting node device. The wavelength multiplexed optical signal reaching the node device, from which the packet B is output, is demultiplexed into the optical signal of $\lambda 7$ and the optical signals of the second-directional transmission wavelengths $\lambda 2$, $\lambda 4$, $\lambda 6$ and $\lambda 8$ by the demultiplexer 2502. The wavelength multiplexed optical signals of the wavelengths $\lambda 2$, $\lambda 4$, $\lambda 6$ and $\lambda 8$ $\lambda$ are divided into four equal portions by the 1×4 star coupler 2506, and the equally-divided wavelength multiplexed optical signals are output to the fixed wavelength reception units. However, since each fixed wavelength reception unit only receives the optical signal of the predetermined wavelength, the packet B of the optical signal of $\lambda 8$ is received by the fixed wavelength reception unit VIII 124. Thus, the transmission direction of the optical signal of $\lambda 8$ output from the first-directional variable wavelength transmission units I, III, V, VII is changed in the wavelength multiplexing transmission system 2590 in the adjacent node device, and the optical signal is returned to the transmitting node device.

Similarly, the transmission direction of the optical signal of the wavelength $\lambda 7$ output from the second-directional variable wavelength transmission units II, IV, VI and VII is changed by the wavelength multiplexing transmission system 2591 in the adjacent node device. The eighth and ninth embodiments are different from each other only in that the returning place of the signal is located in the transmitting node device or the adjacent node device, so that the control of the wavelength, reading of the packet from the buffer and control of the packet transmission are the same therebetween.

Tenth Embodiment

In the above embodiments, light of different wavelengths is used as the distinguishable channels. The present invention is, however, not limited to this example. In the tenth embodiment, different transmission lines are used as the distinguishable channels.

Figure 26B:
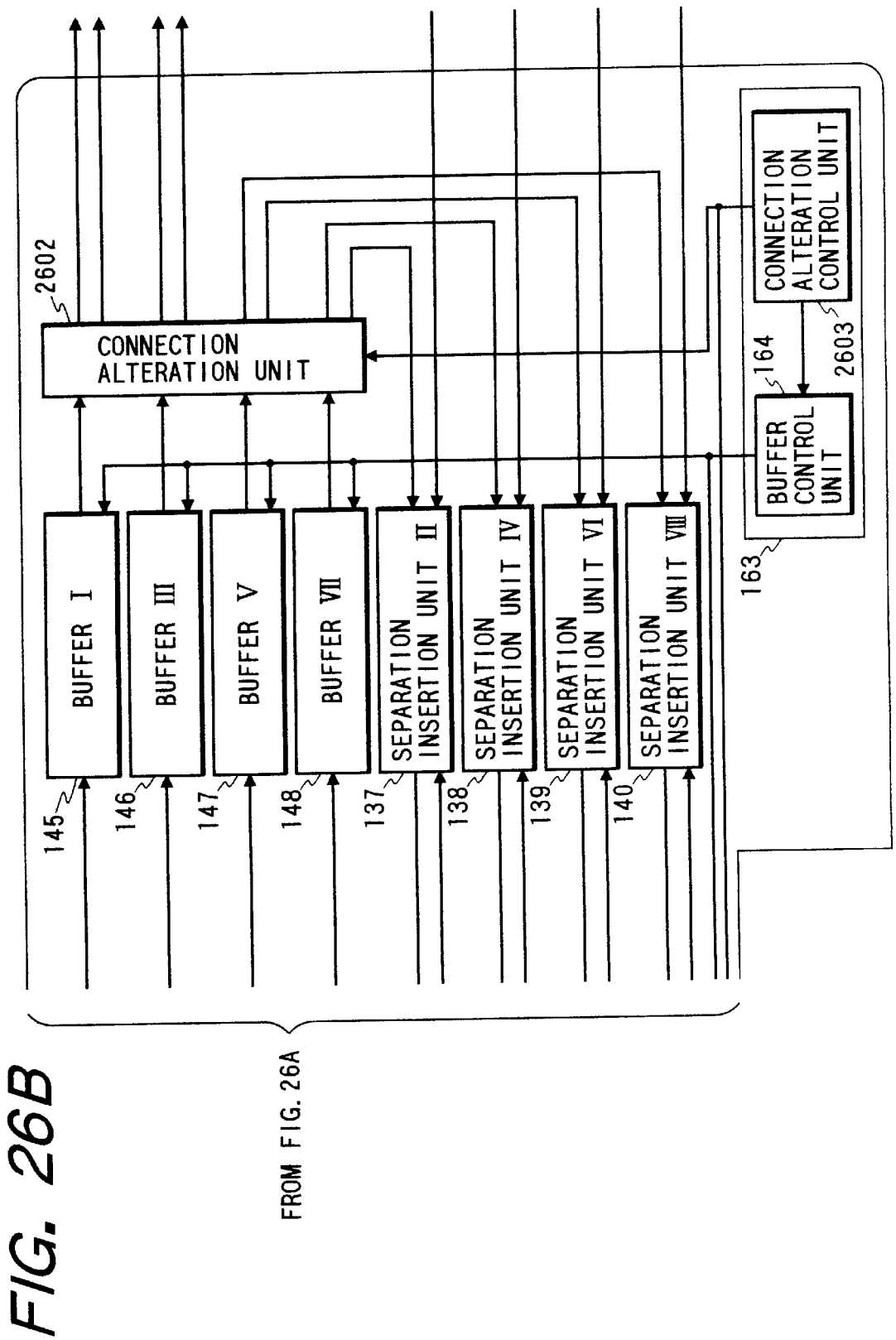
FIG. 26, which consists of FIG. 26A and FIG. 26B, is a schematic diagram of a node device illustrating a tenth embodiment according to the present invention.
Figure 27:
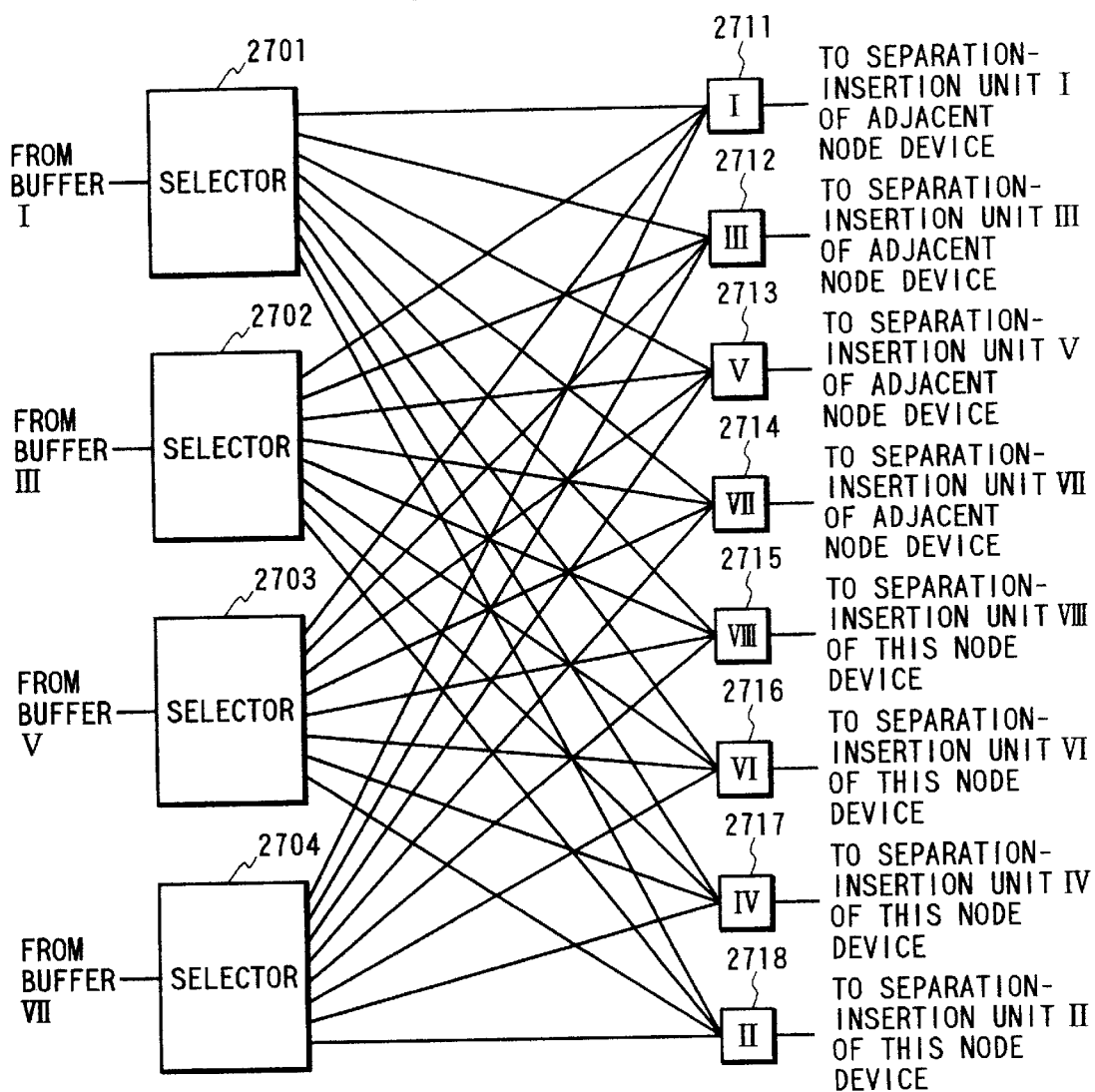
FIG. 27 is a block diagram of a connection alteration unit illustrating the tenth embodiment according to the present invention.
Figure 28:
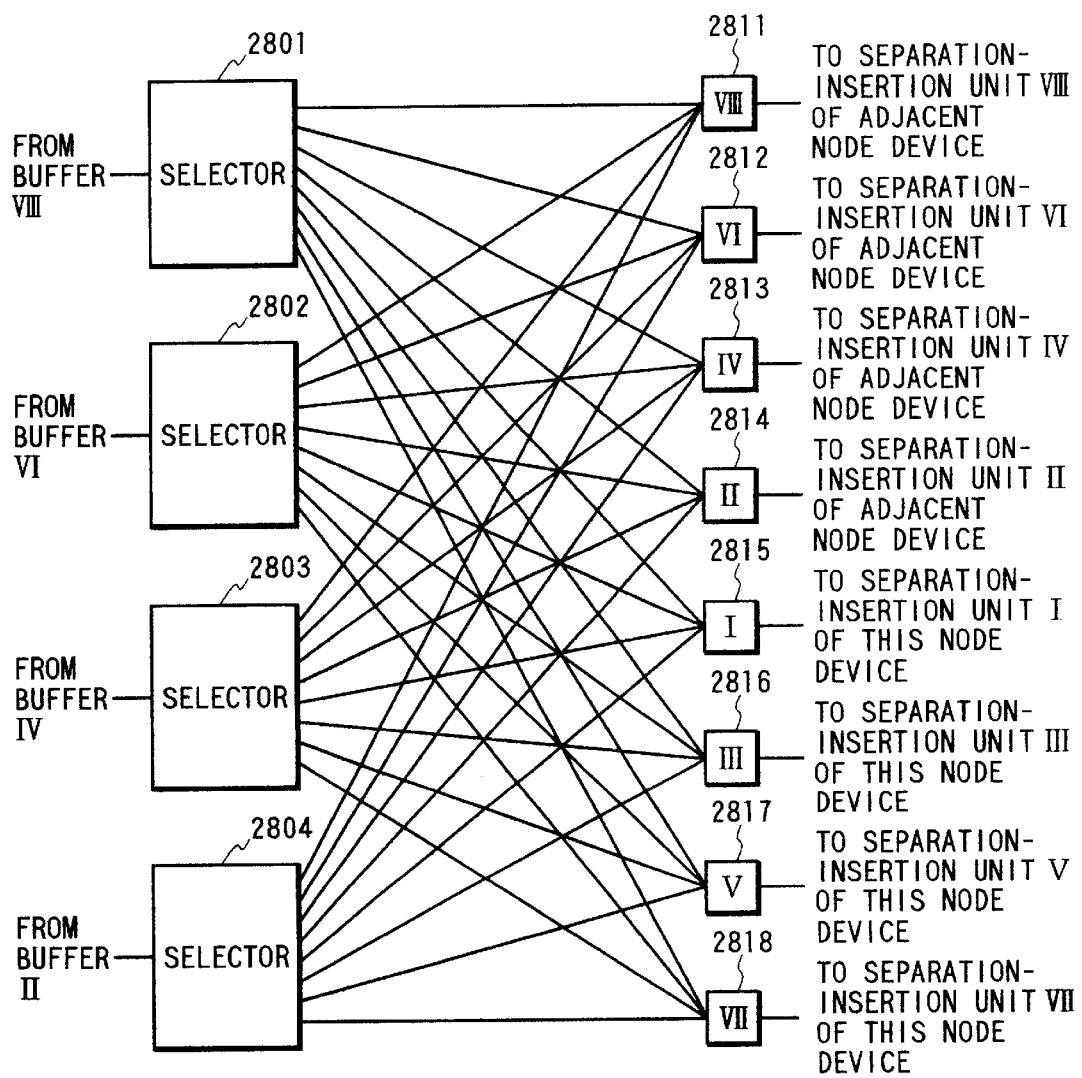
FIG. 28 is a block diagram of a connection alteration unit illustrating the tenth embodiment according to the present invention.

FIGS. 26A and 26B illustrate the structure of the node device used in this embodiment. Optical transmission is not used in this embodiment. In the structure of FIGS. 1A and 1B, the variable wavelength transmission units corresponding to respective buffers are provided as the channel alteration unit. In this embodiment, however, a connection alteration unit is provided as the channel alteration unit. The connection alteration unit 2602 performs the same operation as the variable wavelength transmission units I, III, V and VII of the first embodiment, and the connection alteration unit 2601 performs the same operation as the variable wavelength transmission units II, IV, VI and VIII of the first embodiment. The connection alteration unit is provided with four input ports and eight output ports.

In the connection alteration unit 2602, the four input ports are respectively supplied with signals from the buffers I 145, III 146, V 147 and VII 148, and output the input signals to either of the output terminals I 2711, III 2712, V 2713 and VII 2714, which respectively output signals to the separation-insertion units I, III, V and VII in the adjacent node device, or the output terminals VIII 2715, VI 2716, IV 2717 and II 2718, which respectively output signals to the separation-insertion units VIII, VI, IV and II in this node device concerned. In the first embodiment, the transmission wavelengths of the variable wavelength transmission units are respectively caused to transfer pursuant to the predetermined patterns such that the variable wavelength transmission units do not output the same wavelength simultaneously. Similar thereto, the selection of the output terminals by the selectors 2701 to 2704 is performed pursuant to predetermined patterns such that the selectors concurrently select mutually-different output ports. Thus, the output ports to be used for outputting the signals are decided.

In the connection alteration unit 2601, the four input ports are respectively supplied with signals from the buffers VIII 144, VI 143, IV 142 and II 141, and output the input signals to either of the output terminals VIII 2811, VI 2812, IV 2813 and II 2814, which respectively output signals to the separation-insertion units VIII, VI, IV and II in the adjacent node device, or the output terminals I 2815, III 2816, V 2817 and VII 2818, which respectively output signals to the separation-insertion units I, III, V and VII in this node device concerned. In the first embodiment, the transmission wavelengths of the variable wavelength transmission units are respectively caused to transfer pursuant to the predetermined patterns such that the variable wavelength transmission units do not output the same wavelength simultaneously. Similar thereto, the selection of the output terminals by the selectors 2801 to 2804 is performed pursuant to predetermined patterns such that the selectors concurrently select mutually-different output ports. Thus, the output ports to be used for outputting the signals are decided.

Also in this embodiment, the connection alteration units in this node device concerned and the adjacent node device commonly use the same channel (in this embodiment, the same channel is composed of two transmission lines input into the separation-insertion unit of a signal processing means, for example), hence collision of the signal occurs if the same channel is simultaneously used thereby. Therefore, those node devices are synchronized with each other such that the channels, to which the connection alteration units output the signals, are controlled. This is also the same with the first embodiment.

Since the connection alteration unit is used in this embodiment, a connection control unit 2603 is provided in place of the wavelength control unit. The operations thereof are the same, and the connection relationship between the input ports and the output ports is controlled pursuant to connection control tables which will be described later.

In this embodiment, the output from the connection alteration unit 2602 in this node device and the output from the connection alteration unit 2601 in the adjacent node device are guided to the separation-insertion unit II 137, for example. However, the signal is actually input thereinto from one of the two connection alteration units since the control is made as described above such that the connection alteration unit in the adjacent node device do not concurrently output the signal to the same channel as the connection alteration unit in this node device (in this embodiment, the signals input into the same separation-insertion unit are treated as being input through the same channel).

In the connection alteration unit of the channel alteration unit of this embodiment, there is no need to try to minimize a wavelength transition amount as in the case where the wavelength changeable light source is used. Therefore, it is possible to more freely select the pattern for altering the connection between input and output ports (pattern for altering the output channel connected to each buffer, or altering the output terminal selected by the selector). However, the same pattern as used in the first embodiment is used in this embodiment, for the sake of simplifying the description.

Table 11 shows connection control tables provided in the connection control unit for controlling the connection alteration unit, in place of the wavelength control tables used in the first embodiment. Numbers of the tables correspond to numbers of the corresponding output terminals. For example, the connection control table I for controlling the selector 2701 at the input terminal of the connection alteration unit 2602, to which the buffer I 145 is connected, selects the output port I 2711 when the address of the selector is zero (0). As the address is changed in sequence, the output terminal III, V, VII, VIII, VI, IV and II are selected in this order. Since the reading control of the buffer is performed pursuant to Table 2, the packet to be transmitted through the connected channel is read from the buffer in synchronization with the alteration of the output terminal selected by the selector.

TABLE 11

| Table name | Address | | | | | | | |
|---|---|---|---|---|---|---|---|---|
| | 0 | 1 | 2 | 3 | 4 | 5 | 6 | 7 |
| Connection control table I | 1 | 3 | 5 | 7 | 8 | 6 | 4 | 2 |
| Connection control table II | 3 | 5 | 7 | 8 | 6 | 4 | 2 | 1 |
| Connection control table III | 5 | 7 | 8 | 6 | 4 | 2 | 1 | 3 |
| Connection control table IV | 7 | 8 | 6 | 4 | 2 | 1 | 3 | 5 |
| Connection control table V | 8 | 6 | 4 | 2 | 1 | 3 | 5 | 7 |
| Connection control table VI | 6 | 4 | 2 | 1 | 3 | 5 | 7 | 8 |
| Connection control table VII | 4 | 2 | 1 | 3 | 5 | 7 | 8 | 6 |

TABLE 11-continued

| Table name | Address | | | | | | | |
|---|---|---|---|---|---|---|---|---|
| | 0 | 1 | 2 | 3 | 4 | 5 | 6 | 7 |
| Connection control table VIII | 2 | 1 | 3 | 5 | 7 | 8 | 6 | 4 |

In this embodiment, the connection alteration unit is used to perform the same communication as described in the above embodiment, in place of the variable wavelength transmission units corresponding to the buffers which are used in the above embodiment to alter the channel. That is, the following points are the same between this embodiment and the above embodiment: The packet to be reversed or returned in each buffer is read and returned when the buffer is connected to the returning channel, i.e., when the buffer is connected to the channel connected to the separation-insertion unit in this node device concerned. Further, in the corresponding connection alteration units in the mutually-adjacent node devices (i.e., the connection alteration unit 2602 in a node device (the first node device) and the connection alteration unit 2601, which outputs the packet to the first node device, out of the connection alteration units in the adjacent node devices to which the connection alteration unit 2602 in the first node device outputs the packet), when there occurs the state in which the output from the buffer to the channel used by one connection alteration unit for the returning is possible, each does not output the packet to the other node device using that channel. Further, the packet, which passes the connection alteration unit of the channel alteration unit only once until reaching the addressed destination, is output by using the channel connected to the addressed destination.

Although no optical transmission is performed in this embodiment, the output of the connection alteration unit, especially the channel guided to the adjacent node device, may be E(electro-)/O(opto-)-converted and optical transmission may be used between the node devices. In this case, where wavelengths of light output to the adjacent node device are made different from each other, the wavelength multiplexing transmission can be executed, similar to the first embodiment. When no wavelength multiplexing transmission is performed, separate transmission lines may be used for transmission. At this time, routing of the transmission lines becomes easier by using a bundle of optical fibers or ribbon fiber. Further, even where no optical transmission is performed, the type of the signal may be converted by using the driver when a state suited for the signal processing in the node device is different from a state suited for the signal processing between the node devices.

In this embodiment, the connection alteration unit is provided with the selectors corresponding to the respective buffers, but the structure of the connection alteration unit may be modified in various ways. Especially, the arrangement of the switches may be varied in many ways, and constructed according to the specification of change-over speed, for example.

In this embodiment, a plurality of transmission lines are provided as channels. Namely, the channel in the present invention means the output path selected by the channel alteration unit for selecting the output destination of the buffer (for example, the variable wavelength transmission unit and the connection alteration unit), and the plural channels should be distinguished from each other. The method of this distinction is various. This can be attained by using different wavelengths or by transmission through different locations (for example, different transmission lines and different signal paths). Further, the distinction can be achieved by using two optical transmission directions of the same wavelength.

Further, there is a possibility that the packet, whose channel is not designated, is output to the channel for returning use. Thus, there is a possibility of unexpected returning. Where such situation can not be permitted, the reading from the FIFO only needs to be banned in the state in which the packet from the buffer is output to the channel for the returning use. That is, the supply of the packet, whose channel need not be designated, to the returning channel only needs to be prohibited. Specifically, this can be readily achieved by controlling the selector of the buffer by the buffer control unit.

What is claimed is:

1. A node unit for transmitting signals via a plurality of channels, the node unit coupled to a first node and a second node, said node unit comprising:

a connecting unit adapted to connect a plurality of communication terminals;

a receiving unit adapted to receive a transmitted signal from the first node; and a sending unit adapted to select a channel via which a signal is sent, under a predetermined pattern and to send the signal via the selected channel, wherein according to a destination of a signal received via said connection unit, said sending unit sends the signal received via said connection unit in a channel which is used to send a signal to the second node or in a channel which is used to receive a signal from the first node, and wherein the predetermined pattern changes channels according to a timing in selection for channels to send the signal to the first node and a timing in selection of channels to send the signal to the second node.

2. A method of controlling a node unit for transmitting signals via a plurality of channels, the node unit coupled to a first node and a second node and provided with a connection unit for connecting a plurality of communication terminals, the method comprising:

a receiving step for receiving a transmitted signal from the first node; and a sending step for selecting a channel via which a signal is sent under a predetermined pattern and sending the signal via the selected channel, wherein according to a destination of a signal received via said connection unit, the signal received via said connection unit is sent in a channel which is used to send a signal to the second node or in a channel which is used to receive a signal from the first node, and wherein the predetermined pattern is changed according to a timing in selection for channels to send the signal to the first node and a timing in selection for channels to send the signal to the second node.

3. A method of controlling a node unit for transmitting signals via a plurality of channels, the node unit coupled to a first node and a second node and provided with a connection unit for connecting a plurality of communication terminals, the method comprising:

a receiving step for receiving a transmitted signal from the first node; and a sending step for selecting a channel via which a signal is sent under a predetermined pattern and sending the signal via the selected channel, wherein according to a destination of a signal received via said connection unit, the signal received via said connection unit is sent in a channel which is used to send a signal to the second node or in a channel which is used to receive a signal from the first node, and wherein the timing of selecting the channel according to the predetermined pattern is synchronized at least with the timing of receiving the signal from the second node.

4. A node which couples a bidirection transmission line with a communication terminal, the bidirection transmission line carrying channel signals in a first channel group including at least one channel and a second channel group including at least one channel, the node comprising:

a first receiving unit, adapted to receive a channel signal in the first channel group;

a first sending unit, adapted to input data of the channel signal from said first receiving unit and to output a channel signal of the input data in a channel selected from the first and second channel groups according to a destination of the input data;

a second receiving unit, adapted to receive a channel signal in the second channel group; and a first connection unit, adapted to direct the channel signal output from said first sending unit to a first node coupled to said node through the bidirection transmission line and to direct the channel signal transmitted from the first node to said second receiving unit, wherein said first connection unit turns the channel signal output from said first sending unit to said second receiving unit when the channel of the channel signal output from said first sending unit corresponds to one of the second channel group, and said second receiving unit provides said communication terminal with data of the turn channel signal.

5. The node according to claim 4, further comprising:

a second sending unit, adapted to input data of the channel signal from said second receiving unit and to output a channel signal of the input data in a channel selected from the first and second channel groups according to a destination of the input data; and a second connection unit, adapted to direct the channel signal transmitted from a second node coupled to said node through the bidirection transmission line and to direct the channel signal output from said second unit to said node, wherein said second connection unit turns the channel signal output from said second sending unit to said first receiving unit when the channel of the channel signal output from said second sending unit corresponds to one of the first channel group, and said first receiving unit is connected to a first group of communication terminals which receive data of the channel signal transmitted in the first channel group, and said second receiving unit is connected to a second group of communication terminals which receive data of the channel signal transmitted in the second group.

6. The node unit according to claim 5, wherein said first and second sending units select a channel via which the channel signal is sent under a predetermined pattern and the predetermined pattern is changed according to a timing in selection for channels to send the channel signal to the first node and a timing in selection of channels to send the signal to the second node.

7. The node unit according to claim 6, wherein the timing of selecting the channel according to the predetermined pattern is synchronized at least with the timing of receiving the channel signal transmitted from the first or second node.

8. The node unit according to claim 6, wherein said first sending unit outputs simultaneously a plurality of signals through a plurality of channels, and said predetermined pattern is a pattern under which the output signals are not applied simultaneously to the same channel.

9. The node unit according to claim 4, further comprising a determination unit adapted to determine whether the signal received by the receiving unit is sent to one of the communication terminals or to the first node, wherein said first sending unit sends the channel signal in a channel which depends on the determination made by said determination unit.

10. The node unit according to claim 4, wherein the bidirection transmission line is made by a multiplex line including a plurality of different wavelength channels.

11. The node unit according to claim 4, wherein the bidirection transmission line is made by a multiplex line including a plurality of different communication paths.

12. The node unit according to claim 4, wherein said first sending unit comprises a plurality of senders respectively corresponding to a plurality of channels, and said predetermined pattern is a pattern under which respective senders do not select simultaneously the same channel with other senders.

13. A node which couples a bidirection transmission line with a communication terminal, the bidirection transmission line carrying signals in a first channel group including at least one channel and a second channel group including at least one channel, the node comprising:

a first receiving unit, adapted to receive a channel signal in the first channel group;

a first sending unit, adapted to input data of the channel signal from said first receiving unit and to output a channel signal of the input data in a channel selected from the first and second channel groups according to a destination of the input data;

a second receiving unit, adapted to receive a channel signal in the second channel group; and a second sending unit, adapted to input data of the channel signal from said second receiving unit and to output a channel signal of the input data in a channel selected from the first and second channel groups according to a destination of the input data; and a connection unit, adapted to direct the channel signal transmitted from a first node coupled to said node through the bidirection transmission line and to direct the channel signal output from said second unit to the first node, wherein said connection unit turns the channel signal transmitted from the first node back to the first node when the channel of the channel signal transmitted from the first node corresponds to one of the second channel group, and said second receiving unit provides said communication terminal with data of the received channel signal when a destination of the received channel signal is said communication terminal.

14. The node according to claim 13, wherein said first and second sending units select a channel via a channel signal is sent, under a predetermined pattern and the predetermined pattern is changed according to a timing in selection of channels to send the channel signal to the first node and a timing in selection of channels to send the signal to the second node, and the timing of selecting the channel according to the predetermined pattern is synchronized at least with the timing of receiving the signal from the second node.

15. The node according to claim 13, further comprising a determination unit adapted to determine whether the signal received by the receiving unit is sent to one of the communication terminals or to the first node, wherein said first sending unit sends the channel signal in a channel which depends on the determination of said determination unit.

16. The node according to claim 13, wherein the bidirection transmission line is made by a multiplex line including a plurality of different wavelength channels.

17. The node according to claim 13, wherein the bidirection transmission line is made by a multiplex line including a plurality of different communication paths.

18. The node according to claim 13, wherein said first sending unit comprises a plurality of senders respectively corresponding to a plurality of channels, and said predetermined pattern is a pattern under which respective senders do not select simultaneously the same channel with other senders.

19. The node according to claim 13, wherein said first sending unit outputs simultaneously a plurality of signals through a plurality of channels, and said predetermined pattern is a pattern under which the output signals are not applied simultaneously to the same channel.

* * * * *

UNITED STATES PATENT AND TRADEMARK OFFICE
CERTIFICATE OF CORRECTION

PATENT NO. : 6,493,350 B2
DATED : December 10, 2002
INVENTOR(S) : Kazuhiko Houjou et al.

It is certified that error appears in the above-identified patent and that said Letters Patent is hereby corrected as shown below:

Title page,
Item [12], "Hojo et al." should read -- Houjou et al. --; and
Item [75], Inventors, "Kazuhiko Hojo," should read -- Kazuhiko Houjou --;

Column 1,
Line 37, "invention is,." should read -- invention, --.

Column 9,
Line 56, "the all" should read -- all --.

Column 11,
Line 6, "unit," should read -- unit --.

Column 13,
Line 2, "of signals" should read -- of signal --.

Column 25,
Line 40, "is" should read -- are --.

Column 29,
Line 37, "other" should read -- others --.

Column 52,
Line 46, "device" should read -- devices --.

Column 61,
Line 35, "number" should read -- numbers --.

Column 73,
Line 43, "$\lambda 8\ \lambda$" should read -- $\lambda 8$ --.

UNITED STATES PATENT AND TRADEMARK OFFICE
CERTIFICATE OF CORRECTION

PATENT NO. : 6,493,350 B2
DATED : December 10, 2002
INVENTOR(S) : Kazuhiko Houjou et al.

It is certified that error appears in the above-identified patent and that said Letters Patent is hereby corrected as shown below:

Column 79,
Line 29, "signals" should read -- channel signals --.

Signed and Sealed this

Ninth Day of March, 2004

JON W. DUDAS
*Acting Director of the United States Patent and Trademark Office*